United States Patent
Bollas et al.

(10) Patent No.: US 10,670,262 B2
(45) Date of Patent: Jun. 2, 2020

(54) REACTOR FOR CHEMICAL-LOOPING COMBUSTION

(71) Applicant: University of Connecticut, Farmington, CT (US)

(72) Inventors: George M. Bollas, Tolland, CT (US); Lu Han, Ashford, CT (US); Brian Baillie, Emmaus, PA (US)

(73) Assignee: University of Connecticut, Farmington, CT (US)

( * ) Notice: Subject to any disclaimer, the term of this patent is extended or adjusted under 35 U.S.C. 154(b) by 729 days.

(21) Appl. No.: 14/631,032

(22) Filed: Feb. 25, 2015

(65) Prior Publication Data

US 2015/0241056 A1    Aug. 27, 2015

Related U.S. Application Data

(60) Provisional application No. 61/945,017, filed on Feb. 26, 2014.

(51) Int. Cl.
*F23C 99/00*    (2006.01)

(52) U.S. Cl.
CPC .. *F23C 99/006* (2013.01); *F23C 2900/99008* (2013.01); *Y02E 20/346* (2013.01)

(58) Field of Classification Search
CPC ......... F23C 2900/99008; F23C 99/006; Y02E 20/346
See application file for complete search history.

(56) References Cited

U.S. PATENT DOCUMENTS

| | | | | |
|---|---|---|---|---|
| 2,131,102 A | * | 9/1938 | Frankl | B01J 3/04 423/345 |
| 2,564,985 A | * | 8/1951 | Mayland | B01J 23/94 502/53 |
| 2,825,721 A | * | 3/1958 | Hogan | B01J 23/16 260/DIG. 25 |
| 3,870,474 A | * | 3/1975 | Houston | B01D 53/34 110/243 |
| 4,449,991 A | * | 5/1984 | Brannon | B01D 53/04 210/681 |

(Continued)

OTHER PUBLICATIONS

Corbella, Beatriz M., et al; "Performance in a fixed-bed reactor of titania-supported nickel oxide as oxygen carriers for the chemical-looping combustion of methan in multicycle tests"; 2006; Ind. Eng. Chem. Res.; vol. 45; pp. 157-165.*

(Continued)

*Primary Examiner* — Jorge A Pereiro
*Assistant Examiner* — Logan P Jones
(74) *Attorney, Agent, or Firm* — McCarter & English, LLP

(57) ABSTRACT

Systems and methods are provided for enhancement of gaseous CLC in a fixed-bed process, marked by an increase in $CO_2$ capture efficiency and oxygen carrier utilization, while reducing disadvantages of a conventional fixed-bed operation. The disclosed systems/methods provide a CLC fixed-bed reactor design in which the direction of the fuel gas is intermittently reversed during a single fuel oxidation step. In this reverse-flow mode, oxygen carrier reduction reactions are displaced over the ends of the reactor, which increases contact between fuel and oxidized solids and alleviates and/or mitigates problems of carbon deposition encountered by most oxygen carriers.

12 Claims, 31 Drawing Sheets

(56) References Cited

U.S. PATENT DOCUMENTS

| | | | | | |
|---|---|---|---|---|---|
| 5,989,010 | A | * | 11/1999 | Martin | F23C 99/006 431/170 |
| 9,259,707 | B2 | * | 2/2016 | Dubois | B01J 8/065 |
| 2010/0292523 | A1 | * | 11/2010 | Hershkowitz | C04B 35/486 585/648 |
| 2012/0214106 | A1 | * | 8/2012 | Sit | F23C 10/01 431/7 |
| 2013/0125462 | A1 | * | 5/2013 | Greiner | F23C 10/005 48/61 |
| 2014/0070144 | A1 | * | 3/2014 | Chalabi | B01J 23/72 252/373 |

OTHER PUBLICATIONS

Sapundzhiev, C., et al; "Catalytic combustion of natural gas in a fixed bed reactor with flow reversal"; Oct. 29, 2007; Chemical Engineering Communications; vol. 125; pp. 171-186.*

Ortiz, Maria, et al; "Hydrogen production by auto-thermal chemical-looping reforming in a pressurized fluidized bed reactor using Ni-based oxygen carriers"; 2010; International Journal of Hydrogen Energy; vol. 35; pp. 151-160.*

Subramaniam, B. et al., Reaction Kinetics on a Commercial Three-way Catalyst: the Carbon Monoxide-Nitrogen Monoxide-Oxygen-Water System, Ind. Eng. Chem. Prod. Res. Dev. 24 (1985) 512-516.

Beld, B.et al., Removal of Volatile Organic Compounds from Polluted Air in a Reverse Flow Reactor: An Experimental Study, Ind. Eng. Chem. Res. 33 (1994) 2946-2956.

Chaouki, J. et al., Combustion of Methane in a Cyclic Catalytic Reactor, Ind. Eng. Chem. Res. 33 (1994) 2957-2963.

Ishida, M. et al., A Fundamental Study of a New Kind of Medium Material for Chemical-Looping Combustion, Energy & Fuels. 10 (1996) 958-963.

Züfle, H. et al., Catalytic Combustion in a Reactor with Periodic Flow Reversal . Part 1. Experimental results, Chem. Eng. Process. 36 (1997) 327-340.

Xiao, W. et al., An $SO_2$ Converter with Flow Reversal and Interstage Heat Removal: From Laboratory to Industry, Chem. Eng. Sci. 54 (1999) 1307-1311.

Duduković et al., Multiphase Catalytic Reactors: A Perspective on Current Knowledge and Future Trends, Catalysis Reviews, 44(1), pp. 123-246, (2002).

Kushwaha, A. et al., Effect of Reactor Internal Properties on the Performance of a Flow reversal catalytic Reactor for Methane Combustion, Chem. Eng. Sci. 59 (2004) 4081-4093.

Wolf, J. et al., Comparison of Nickel- and Iron-Based Oxygen carriers in Chemical Looping Combustion for $CO_2$ Capture in Power Generation, Fuel. 84 (2005) 993-1006.

Wolf, J. et al., Parametric Study of Chemical Looping Combustion for Tri-Generation of Hydrogen, Heat, and Electrical Power with $CO_2$ Capture, Int. J. Energy Res. 29 (2005) 739-753.

Abad, A. et al., Chemical-Looping Combustion in a 300 W Continuously Operating Reactor System Using a Manganese-Based Oxygen Carrier, Fuel. 85 (2006) 1174-1185.

Johansson, E. et al., A 300W laboratory reactor system for chemical-looping combustion with particle circulation, Fuel. 85 (2006) 1428-1438.

Keskitalo, T.J. et al., Kinetic Modeling of Coke Oxidation of a Ferrierite Catalyst, Ind. Eng. Chem. Res. 45 (2006) 6458-6467.

Mattisson, T. et al., Chemical-looping combustion using syngas as fuel, Int. J. Greenh. Gas Control. 1 (2007) 158-169.

Noorman, S. et al., Packed Bed Reactor Technology for Chemical-Looping Combustion, Ind. Eng. Chem. Res. 46 (2007) 4212-4220.

Li, F. et al., Clean coal conversion processes—progress and challenges, Energy Environ. Sci. 1 (2008) 248-267.

Rydén, M. et al., Chemical-looping combustion and chemical-looping reforming in a circulating fluidized-bed reactor using Ni-based oxygen carriers, Energy and Fuels. 22 (2008) 2585-2597.

Rydén, M. et al., Novel oxygen-carrier materials for chemical-looping combustion and chemical-looping reforming; $La_xSR_{1-x}Fe_yCo_{1-y}O_{3-\delta}$ perovskites and mixed-metal oxides of NiO, $Fe_2O_3$ and $Mn_3O_4$, Int. J. Greenh. Gas Control. 2 (2008) 21-36.

Dudukovic, M.P., Frontiers in reactor engineering., Science. 325 (2009) 698-701.

Glöckler, B. et al., A Heat-Integrated Reverse-Flow Reactor Concept for Endothermic High-Temperature Syntheses. Part I: Fundamentals—Short-Cut Theory and Experimental Verification of a Traveling Endothermic Reaction Zone, Chem. Eng. Technol. 32 (2009) 1339-1347.

Iliuta, I. et al., Chemical-looping combustion process: Kinetics and mathematical modeling, AIChE J. 56 (2010) 1063-1079.

Håkonsen, S.F. et al., Chemical looping combustion in a rotating bed reactor-Finding Optimal Process Conditions for Prototype Reactor., Environ. Sci. Technol. 45 (2011) 9619-9626.

Adanez, J. et al., Progress in chemical-looping combustion and reforming technologies, Prog. Energy Combust. Sci. 38 (2012) 215-282.

Sridhar, D. et al., Syngas Chemical Looping Process: Design and Construction of a 25 $kW_{th}$ Subpilot Unit, Energy & Fuels. 26 (2012) 2292-2302.

Han, L. et al., Heterogeneous modeling of chemical-looping combustion. Part 1: Reactor model, Chem. Eng. Sci. 104 (2013) 233-249.

Zhou, Z. et al., Model-based analysis of bench-scale fixed-bed units for chemical-looping combustion, Chem. Eng. J. 233 (2013) 331-348.

Zhao, Z. et al., Rotary Bed Reactor for Chemical-Looping Combustion with Carbon Capture. Part 1: Reactor Design and Model Development, Energy & Fuels. 27 (2013) 327-343.

Hamers, H.P. et al., Comparison on process efficiency for CLC of syngas operated in packed bed and fluidized bed reactors, Int. J. Greenh. Gas Control. 28 (2014) 65-78.

Han, L. et al., Heterogeneous modeling of chemical-looping combustion. Part 2: Particle model, Chem. Eng. Sci. 113 (2014) 116-128.

Zhou, Z. et al., Kinetics of NiO reduction by $H_2$ and Ni oxidation at conditions relevant to chemical-looping combustion and reforming, Int. J. Hydrogen Energy. 39 (2014) 8535-8556.

Zhou, Z. et al., Overview of Chemical-Looping Reduction in Fixed Bed and Fluidized Bed Reactors Focused on Oxygen Carrier Utilization and Reactor Efficiency, Aerosol Air Qual. Res. 14 (2014) 559-571.

Zhou, Z. et al., Continuous regime of chemical-looping combustion (CLC) and chemical-looping with oxygen uncoupling (CLOU) reactivity of CuO oxygen carriers, Applied Catalysis B: Environmental 166-167, (2015) pp. 132-144.

Zhou, Z. et al., Model-assisted analysis of fluidized bed chemical-looping reactors, Chemical Engineering Science 134, (2015) pp. 619-631.

U.S. Appl. No. 61/945,017, filed Feb. 26, 2014.

* cited by examiner

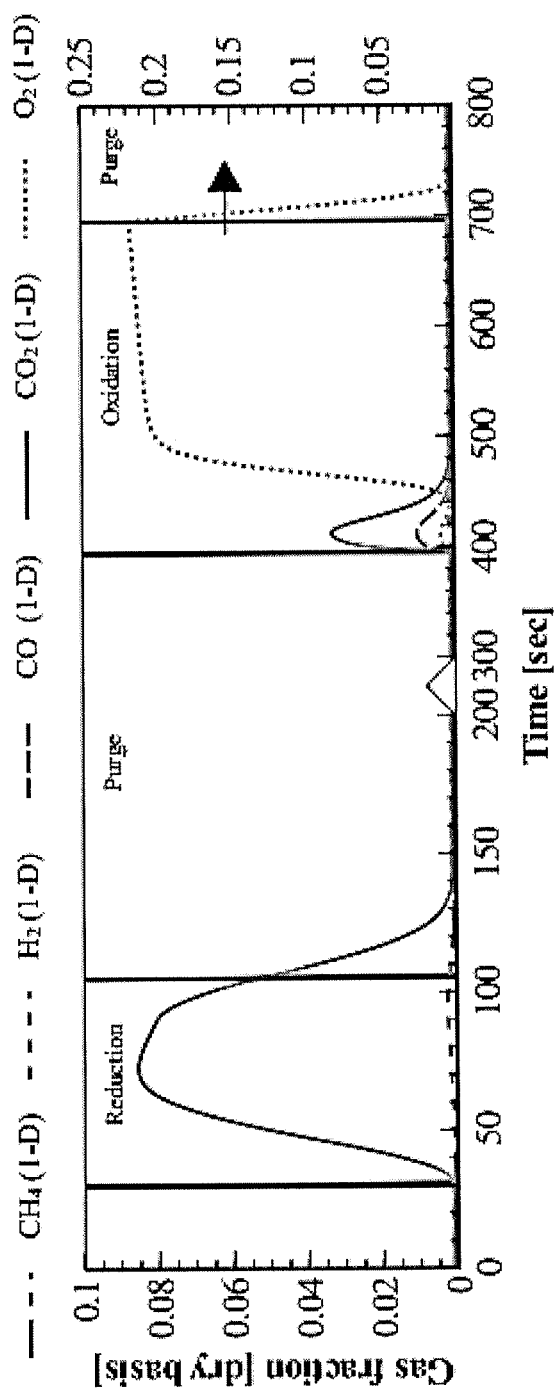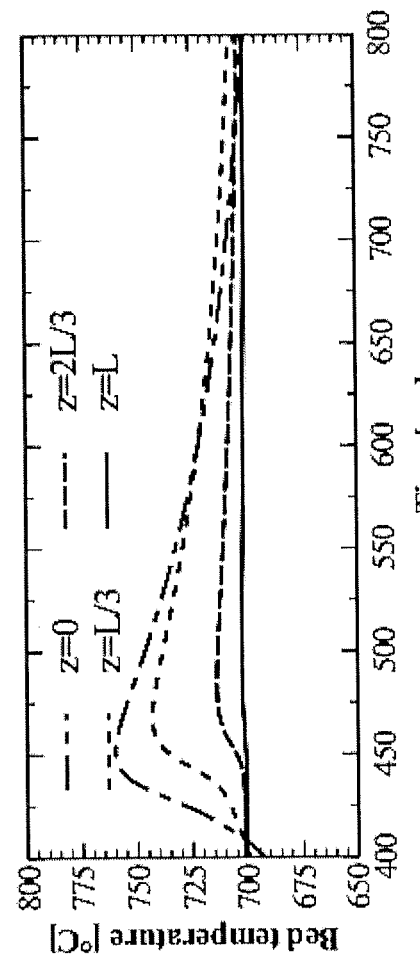
FIGURE 7(a)
FIGURE 7(b)

REACTOR FOR CHEMICAL-LOOPING COMBUSTION

CROSS-REFERENCE TO RELATED APPLICATION

The present application claims priority benefit to a provisional patent application entitled "Reactor for Chemical-Looping Combustion," which was filed on Feb. 26, 2014, and assigned Ser. No. 61/945,017. The entire content of the foregoing provisional patent application is incorporated herein by reference.

STATEMENT OF GOVERNMENT SUPPORT

This invention was made with government support under Grant #1054718 awarded by the National Science Foundation. The government has certain rights in the invention.

BACKGROUND

1. Technical Field

The present disclosure is generally directed to improved reactor design for combustion, reforming or other reactions of gaseous materials and reactants and, more specifically, to designs of reverse-flow reactors for chemical-looping combustion and reforming of gaseous fuels.

2. Background Art

The increasing rate of $CO_2$ emissions from fossil fuel combustion draws urgency to address its impact on climate change. Fossil fuels are anticipated to remain the world's predominant source of energy in the foreseeable future, and a potentially practical solution to reduce anthropogenic $CO_2$ emissions is to deploy carbon capture and storage (CCS) strategies. Chemical-looping combustion (CLC) has emerged as a promising, low-cost CCS technology [1a-3a], with the potential to reduce the cost of $CO_2$ capture by 50% [4a].

In CLC, a metal/metal oxide is used as an oxygen carrier that oxidizes a gaseous fuel, usually methane or natural gas. While there is no enthalpy difference between the overall CLC reaction and conventional combustion, the energy expenditure for $CO_2$ separation is significantly decreased in the CLC process. Thus, an overall higher thermal and electrical efficiency can be obtained compared to alternative CCS options [2, 3]. Comprehensive reviews covering the development of CLC are found in Adánez et al. [1], Hossain and de Lasa [2], and Lyngfelt et al. [3].

Existing $CO_2$ capture technologies are generally based on physical and chemical separation of $CO_2$, including absorption, adsorption, cryogenics and membrane technologies. Absorption processes generally use a suitable solvent to separate $CO_2$ from the flue gas stream. Alkanolamines, such as monoethanolamine (MEA) and diethanolamine (DMEA), are typically used in chemical absorption, while methanol, dimethylether polyethylene glycol and sulfolane are frequently employed in physical absorption. Adsorption processes are generally based on selective adsorption of $CO_2$ on a solid adsorbent, such as zeolites, alumina molecular sieve and activated carbon. These processes require a subsequent step to regenerate the adsorbent, which is energy intensive.

Membrane gas separation generally relies on semi-selective active layers to allow passage of certain molecules based on their relative molecular sizes. Various types of permeable membrane materials are available, including polymers, metals and rubber composites. Low gas throughputs are the main disadvantages with membrane separation, requiring multistage operation or stream recycling.

It is well known that adoption of current $CO_2$ separation technologies decreases overall plant efficiency and incurs high costs to the end user. It has been estimated that the energy consumption using amine scrubbing can reduce the power generated from an entire plant by 42%. Indeed, the adsorption processes require 15-22% of the total energy generated in the plant. The overall energy penalty for the chilled ammonia process, a solvent-based process using ammonia carbonates and bicarbonate slurries, is lower than 16%.

Chemical-looping combustion (CLC) is a technology that offers a potential solution to the problem of gas separation in power generation. CLC processes may eliminate the energy required to capture $CO_2$ because the fuel and air streams are un-mixed, thus providing a higher overall thermal and electrical efficiency as compared to alternative options [2, 3]. To date, CLC technology has been heavily investigated in academic and research settings, but has yet to be commercially applied.

In gaseous CLC, a hydrocarbon fuel reacts with an oxidized metal oxygen carrier, forming a pure stream of $CO_2$ after condensing the $H_2O$. The reduced metal oxygen carrier is regenerated by subsequent oxidation in air, and the effluents ($N_2$ and lean $O_2$) are emitted to the atmosphere. For most oxygen carriers, the reactions with fuel are mildly endothermic while the regeneration step is strongly exothermic; thus, the overall reaction enthalpy reverts to conventional gas combustion. A dual-step approach compartmentalizes $CO_2$ capture to the fuel reducer reactor and power generation to the oxidizer reactor.

Chemical-looping has been realized in fluidized-bed reactors, fixed-bed reactors, transport reactors, moving bed reactors and rotating or rotary bed reactors, of which the former is the most widely recognized with successful pilot-scale demonstration utilizing different gaseous feedstocks and oxygen carriers. Fluidization permits good contact between gas and solids, uniform temperature profiles, small pressure drop, and continuous operation [4, 5]. Thus, the conversion of $CH_4$ to $H_2O$ and $CO_2$ is always high and carbon deposition is marginal.

Fluidized-bed reactors are, in general, commercially available and well-established in the petroleum refining industry. However, a dual-reactor configuration encounters various technical and operational issues. For example, circulation of solids between the two reactors requires energy-intensive cyclones and particle loop seals to prevent gas leakage, which is more problematic at elevated pressures [6, 7]. Fragmentation and attrition of the oxygen carrier create fines that need to be filtered [8], while fresh oxygen carrier needs to be continually added to the system [9, 10]. These issues drastically increase process operation costs, if an expensive oxygen carrier, such as Ni or Cu, is used. Moreover, these issues impact the environmental benignity of the CLC process, especially if harmful poisonous metals (e.g., Ni) are to be emitted to the atmosphere in the form of fines.

Fixed-bed reactors have several advantages over alternative designs, of which the most important may be the elimination of particle attrition and need for gas-solid separation [6, 7, 11-13]. A fixed-bed configuration generally consists of a stationary bed with alternating flows between reducing and oxidizing environments. Thereby, attrition is not an issue because gas-solid separation is intrinsically avoided in fixed-beds. By the simplicity of this design, fixed-beds are easier to scale-up, pressurize and operate, and flexible to handle a wide particle size distribution and flow regimes. This design is also more compact than a fluidized-bed reactor, which allows for a reduced reactor size, lower capital cost, and smaller process footprint.

However, a fundamental challenge of the fixed-bed reactor lies in the poor gas-solid mixing, contributing to low oxygen carrier utilization, enhancement of catalytic reactions at intermediate oxygen carrier conversions, low $CO_2$ selectivity and lack of bed isothermality [14]. These undesirable effects of a fixed-bed reactor penalizes the process efficiency in terms of $CO_2$ capture and power generation.

Implementation of CLC in the fixed-bed reactor solves the problem of attrition, but at the expense of losing the high performance of the fluidized-bed. From thermodynamic analysis, a system of multiple fixed-bed reactors operating CLC in synchrony could achieve the same level of process efficiency as the interconnected fluidized-bed in an integrated gasification CLC plant [15, 16]. Thus, the operability benefits and cost savings attained with the fixed-bed make it a lucrative and potentially rivaling process to the well-established fluidized-bed.

Reverse-flow reactors are not new, and were historically used to couple endothermic (e.g., methane steam reforming) with exothermic reactions (e.g., methane combustion) [44-50], for superior heat integration and higher thermal efficiency [51, 52]. Commercial applications of reverse-flow processes are vast. In these processes, the principal advantages of flow reversal include improved heat transfer at the inlet and exit of the bed and formation of a hot zone in the middle section of the reactor [72]. The maximum temperature rise in the bed exceeds that of traditional fixed-beds, which permits higher exit conversions [50, 73].

Despite efforts to date, a need remains for improved reactor designs and processes for combustion, reforming or other reactions of gaseous materials and reactants. In addition, a need remains for improved reactor designs and processes for use in chemical-looping combustion and reforming of gaseous fuels. These and other needs are satisfied by the apparatus, systems and methods of the present disclosure.

SUMMARY

According to exemplary embodiments of the present disclosure, reverse-flow fixed-bed reactors are applied to chemical-looping combustion (CLC) and/or reforming (CLR) processes, e.g., for power generation or $H_2$ production with inherent capture of $CO_2$. In exemplary implementations, chemical-looping accomplishes $O_2$ separation by a dual-step approach in which a hydrocarbon fuel (e.g., natural gas) is oxidized by a metal oxygen carrier that is then regenerated by air oxidation. In a CLC process, a pure stream of $CO_2$ can be separated after condensing the water vapor. In the CLR process, autothermal reforming is feasible without the need for $O_2$ or $CO_2$ separation.

Various active metals in oxygen carriers impose thermodynamic limitations on the fuel combustion efficiency, producing partial combustion products (CO, $H_2$) and solid carbon, which reduce the $CO_2$ capture of the process. The disclosed reverse-flow reactor advantageously address such limitations by, inter alia, switching the direction of the fuel gas flow intermittently during the fuel oxidation step. Process advantages of reverse-flow operations according to the present disclosure include:
(1) improved oxygen carrier utilization,
(2) higher $CO_2$ capture efficiency,
(3) resistance to carbon deposition,
(4) mitigation of cold zones, and
(5) elimination and/or reduction of gas-solids separation steps.

Advantages relevant to the oxygen carrier used in chemical-looping (as compared to existing or other proposed process configurations) include:
(1) elimination and/or reduction of attrition,
(2) elimination and/or reduction of need for oxygen carrier fluidizability,
(3) elimination and/or reduction of toxic solid fines effluents, and
(4) elimination and/or reduction of need for oxygen carrier addition.

The systems and methods of the present disclosure provide enhancement of gaseous CLC in a fixed-bed process, marked by an increase in $CO_2$ capture efficiency and oxygen carrier utilization, while reducing disadvantages of a conventional fixed-bed operation. In particular, the disclosed systems/methods provide a CLC fixed-bed reactor design in which the direction of the fuel gas is intermittently reversed during a single fuel oxidation step. In this reverse-flow mode, oxygen carrier reduction reactions are displaced over the ends of the reactor, which increases contact between fuel and oxidized solids and alleviates and/or mitigates problems of carbon deposition encountered by most oxygen carriers based on nickel, iron and copper.

The benefits of the reverse-flow operation compared to the one-direction mode thus include (i) an increase in $CO_2$ capture efficiency, (ii) mitigation of temperature changes during reduction and oxidation, and (iii) resistance to carbon formation. The performance achievable in the disclosed reverse-flow reactor is found to be on the same level as an existing fluidized-bed reactor. Therefore, the disclosed systems and methods uphold the simple operation of a standard fixed-bed, but perform at an exceptional level for a fluidized-bed system without the problem of particle attrition and gas-solid separation.

According to the present disclosure, process benefits that can be attained from reverse-flow operation of CLC fixed-bed reactors are described. Periodic flow reversal utilizing a variable switching frequency is described with reference to the reduction stage in bench- and industrial-scale fixed-bed reactors. The superior performance of the disclosed reverse-flow reactor is demonstrated herein and compared to that of the state-of-the-art fixed-bed and fluidized-bed systems.

Additional features, functions and benefits of the disclosed systems and methods will be apparent from the detailed description which follows, particularly when read in conjunction with the appended figures.

BRIEF DESCRIPTION OF THE FIGURES

To assist those of skill in the art in making and using the disclosed systems and methods, reference is made to the appended figures, wherein:

FIGS. 7(a)-7(f) are simulations of outlet gas fractions and axial reactor temperatures for an exemplary bench-scale reactor. FIGS. 7(a) and 7(b) are plots for a one-directional reactor (1-D) to meet $\eta_{CO_2}$=90%; FIGS. 7(c) and 7(d) are plots for a reverse-flow (RF) reactor with 1-D reactor, over the same timescale for 1-D to satisfy $\eta_{CO_2}$=90%; and FIGS. 7(e) and 7(f) are plots for an RF reactor with 1-D reactor, both at $\eta_{CO_2}$=90%.

FIG. 12(a) shows NiO conversion without flow reversal, whereas FIG. 12(b) shows NiO conversion with flow reversal according to the present disclosure.

DESCRIPTION OF EXEMPLARY EMBODIMENT(S)

As described herein, the present disclosure provides advantageous reverse-flow reactor systems and methods wherein, inter alia, the direction of the fuel gas flow is intermittently switched during the fuel oxidation step. Numerous advantages are achieved according to the present disclosure, including (i) improved oxygen carrier utilization, (ii) higher $CO_2$ capture efficiency, (iii) resistance to carbon deposition, (iv) mitigation of cold zones, and/or (v) elimination and/or reduction of gas-solids separation steps.

In addition, implementations of the disclosed systems and methods deliver advantages to an oxygen carrier used in a chemical-looping process that include (i) elimination and/or reduction of attrition, (ii) elimination and/or reduction of need for oxygen carrier fluidizability, (iii) elimination and/or reduction of toxic solid fines effluents, and/or (iv) elimination and/or reduction of need for oxygen carrier addition.

The systems and methods of the present disclosure provide enhancement of gaseous CLC in a fixed-bed process, marked by an increase in $CO_2$ capture efficiency and oxygen carrier utilization, while reducing disadvantages of a conventional fixed-bed operation. In particular, the disclosed systems/methods provide a CLC fixed-bed reactor design in which the direction of the fuel gas is intermittently reversed during a single fuel oxidation step. In this reverse-flow mode, oxygen carrier reduction reactions are displaced over the ends of the reactor, which increases contact between fuel and oxidized solids and alleviates and/or mitigates problems of carbon deposition encountered by most oxygen carriers based on nickel, iron and copper.

The benefits of the reverse-flow operation compared to the one-direction mode thus include (i) an increase in $CO_2$ capture efficiency, (ii) mitigation of temperature changes during reduction and oxidation, and (iii) resistance to carbon formation. The performance achievable in the disclosed reverse-flow reactor is found to be on the same level as an existing fluidized-bed reactor. Therefore, the disclosed systems and methods uphold the simple operation of a standard fixed-bed, but perform at an exceptional level for a fluidized-bed system without the problem of particle attrition and gas-solid separation.

Figure 1A:
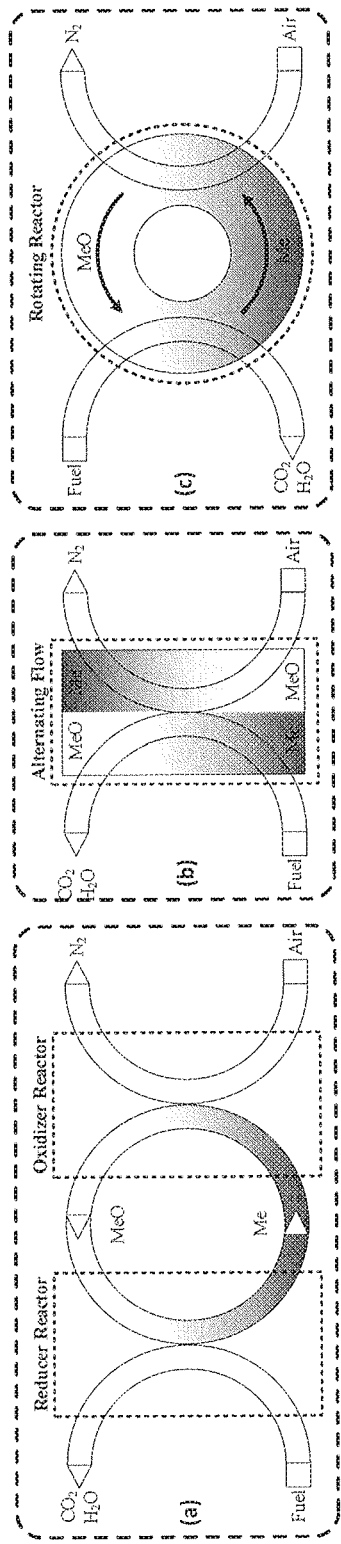
FIG. 1(a) is a schematic depiction of reactor options for CLC systems and methods according to the present disclosure, including (a) a circulating fluidized-bed, (b) a rotating reactor, and (c) an alternating flow over a fixed-bed.
Figure 1B:
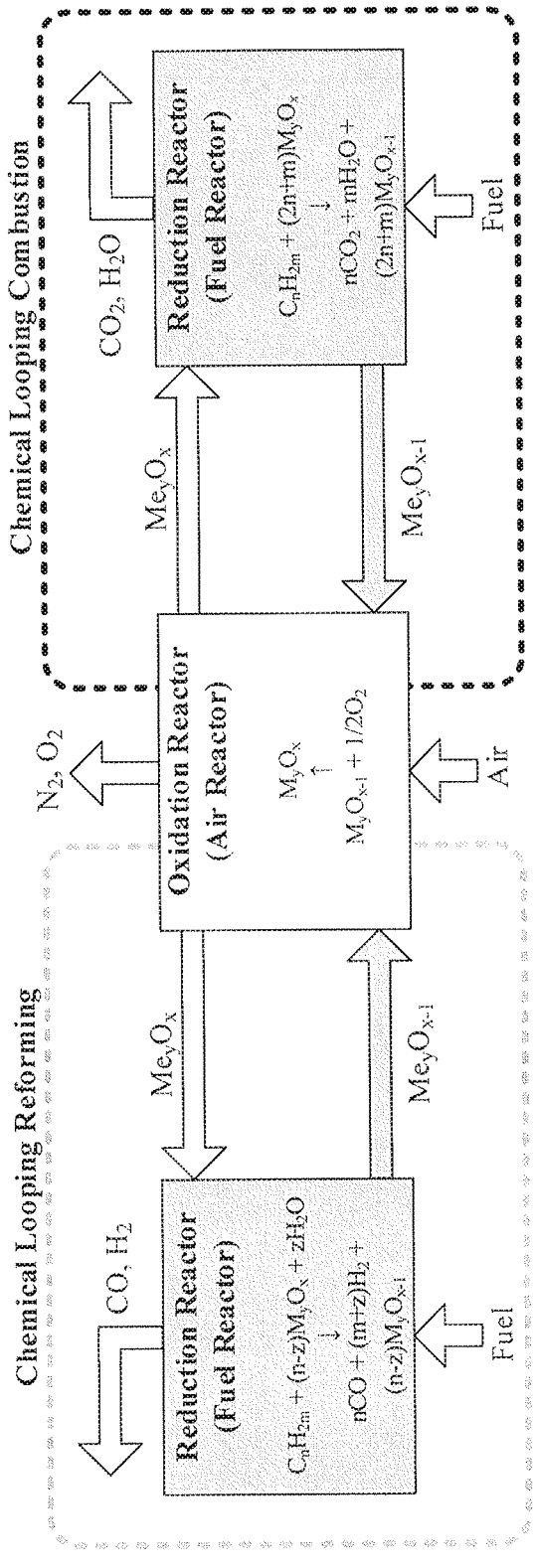
FIG. 1(b) is a schematic overview of CLC and CLR processes.

The desired qualities of the disclosed CLC reactor system generally include (i) effective mixing between fuel and solids, (ii) uniform distribution of temperature within the reactor, (iii) continuous operation, (iv) simplicity of scale-up, (v) low pressure drop, (vi) limited attrition and creation of fines, and negligible leakage of fuel. The corresponding process options can be categorized as circulating fluidized-bed reactors, rotating reactors, and alternating flow reactors, as schematically depicted in FIG. 1(a), wherein Me/MeO denotes the metal oxygen carrier in the reduced and oxidized form. A further schematic depiction of a combined chemical looping reforming and chemical looping combustion operation is provided in FIG. 1(b), i.e., an overview of CLC and CLR processes. A widely used reactor technology is based on an interconnected fluidized-bed design.

Fluidization enables good contact between gas and solids, uniform temperature profiles, small pressure drop, and continuous operation. Thus, conversion of $CH_4$ to $H_2O$ and $CO_2$ is always high and carbon deposition is marginal. Fluidized-bed reactors are, in general, commercially available and well-established in the petroleum refining industry. However, the dual-reactor configuration encounters various technical and operational issues. The circulation of solids between the two reactors requires energy-intensive cyclones and particle loop seals to prevent gas leakage, which is more problematic at elevated pressures.

Fragmentation and attrition of the oxygen carrier create fines that need to be filtered, while fresh oxygen carrier needs to be continually added to the system. These issues drastically increase process operation costs, if an expensive oxygen carrier, such as Ni or Cu, is used. Moreover, they impact the environmental benignity of the CLC process, especially if harmful poisonous metals (e.g., Ni) are to be emitted to the atmosphere in the form of fines.

A moving bed reactor was proposed by Li and Fan for chemical looping reduction of Fe-based oxygen carriers with syngas [F. Li, L.-S. Fan, Clean coal conversion processes— progress and challenges, Energy Environ. Sci. 1 (2008) 248.]. Higher conversions can be obtained in the moving bed than in fluidized-beds thanks to the multiple oxidation states of Fe, while reducing the solid circulation rate and minimizing the reactor volume. The concept was demonstrated in a 2.5 kW bench-scale unit for a combined operation of over 300 h, operating at 100% $CO_2$ capture efficiency with syngas and $CH_4$ fuel [D. Sridhar, A. Tong, H. Kim, L. Zeng, F. Li, L. Fan, Syngas Chemical Looping Process: Design and Construction of a 25 kWth Subpilot Unit, Energy & Fuels. 26 (2012) 2292-2302; A. Tong, D. Sridhar, Z. Sun, H. R. Kim, L. Zeng, F. Wang, et al., Continuous high purity hydrogen generation from a syngas chemical looping 25 kWth sub-pilot unit with 100% carbon capture, Fuel. 103 (2013) 495-505; Q. Zhou, L. Zeng, L. Fan, M. Reducer, Syngas Chemical Looping Process: Dynamic Modeling of a Moving-Bed Reducer, AIChE J. 59 (2013) 3432-3443.]. Similar technical issues such as attrition and gas leakage arise in the moving bed design due to the continuous circulation of solids between reactors. The use of large oxygen carrier particles ($d_p$=4 mm) is needed in the moving bed in order to resist fluidization, thereby potentially making reaction rates diffusion-limited.

Fixed-bed reactors have several advantages over alternative designs, of which the most important is the elimination of particle attrition and need for gas-solid separation. By the simplicity of this design, fixed-beds are easier to scale-up, pressurize and operate, and can handle a relatively wide range of particle sizes. This design is also more compact than the fluidized-bed and moving bed reactor, which allows for better utilization of the oxygen carrier, lower capital cost, and smaller process footprint. CLC performance in a fixed-bed reactor was compared to an equivalent fluidized-bed in previous work and the results revealed a significant performance gap in terms of low $CO_2$ selectivity, severe temperature fluctuations, and high carbon formation [Z. Zhou, L. Han, G. M. Bollas, Overview of chemical-looping reduction in fixed-bed and fluidized-bed reactors focused on oxygen carrier utilization and reactor efficiency, Aerosol Air Qual. Res. 14 (2014) 559-571]. Also, periodic operation can be undesirable because it requires the use of a high temperature, high gas flow switching system. Nonetheless, with proper management of the cycle strategies, the fixed-bed process can produce a continuous high temperature exhaust stream suitable for power generation.

In rotating bed reactors, an annulus fixed-bed is rotating between different sectors, where air and fuel are fed. Advantages of the rotating reactor design include compactness of design, continuous operation, limited energy for circulation, and feasibility of scale-up and commercialization, but the system is limited by the low $CO_2$ purity, mostly due to gas leakage and mixing between fuel and air streams. Simulations of the rotating reactor revealed that reducing the angular dispersion can increase the $CO_2$ purity [S. F. Håkonsen, C. A. Grande, R. Blom, Rotating bed reactor for CLC: Bed characteristics dependencies on internal gas mixing, Appl. Energy. 113 (2014) 1952-1957].

In Zhao et al. [Z. Zhao, T. Chen, A. F. Ghoniem, Rotary Bed Reactor for Chemical-Looping Combustion with Carbon Capture. Part 1: Reactor Design and Model Development, Energy & Fuels. 27 (2013) 327-343; Z. Zhao, T. Chen, A. F. Ghoniem, Rotary Bed Reactor for Chemical-looping Combustion with Carbon Capture. Part II: Base Case and Sensitivity Analysis, Energy & Fuels. 27 (2012) 344-359], a rotary-bed reactor was explored as an alternative to the rotating reactor design. The rotary-bed reactor consists of a rotary solid wheel, with micro-channels coated with oxygen carrier that rotates through reducing and oxidizing environments. With this design, mixing between air and fuel can be avoided with an efficient sealing system. Potential drawbacks include high temperature fluctuations, thermal distortion and carbon deposition.

Given the process options for CLC, a fixed-bed reactor is an appealing option, but significant improvements are needed to close the performance gap with existing higher-performing reactors. A major drawback of fixed-bed reactors for CLC lies in their poor mixing patterns, which results in low oxygen carrier utilization, enhancement of catalytic reactions at intermediate oxygen carrier conversions, low $CO_2$ selectivity and lack of bed isothermality.

The inherent advantages of operating fixed-bed reactors in reverse-flow mode are exploited for improved operation of CLC fixed-bed reactors according to the present disclosure.

In particular, the superior gas-solids mixing and the improvement of bed isothermality in reverse-flow fixed-bed reactors result in superior $CO_2$ capture efficiency and oxygen carrier utilization for the CLC reduction step. Furthermore, the capability to control the reaction front by flow reversal positively influences the subsequent heat generation cycle of CLC. A model-assisted approach is presented herein that uses validated models for CLC of $CH_4$ with $NiO/Al_2O_3$, to theoretically derive comparisons between one-directional fixed-beds, reverse-flow, and fluidized-bed CLC reactors. A performance analysis of existing CLC reactors, the effects of flow reversal on the reactor system, and the ability of the disclosed reactor systems and methods to resolve fundamental challenges limiting CLC technology commercialization are demonstrated herein.

Figure 2:
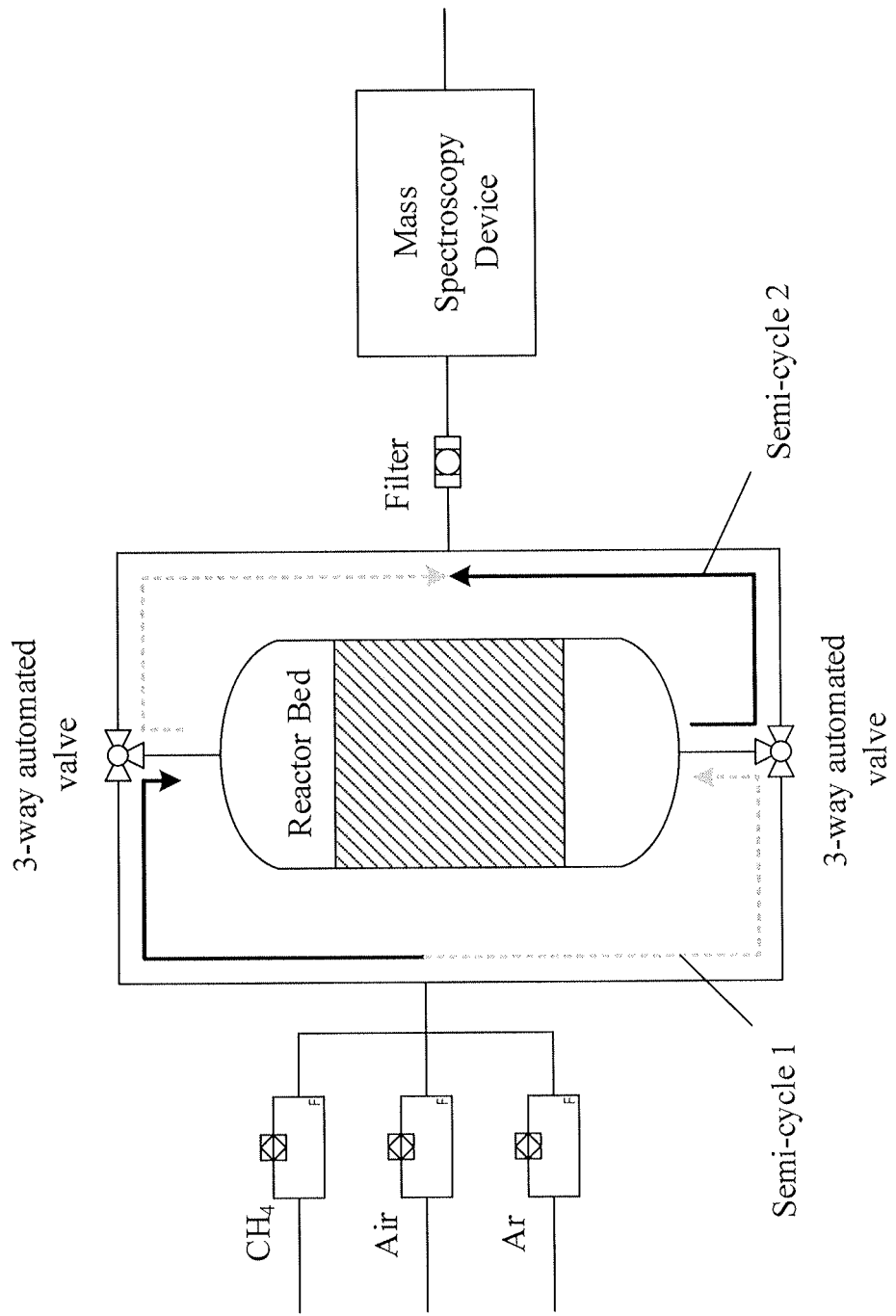
FIG. 2 is a schematic depiction of an exemplary reverse-flow fixed-bed reactor according to the present disclosure.

FIG. 2 provides a schematic depiction of an exemplary reverse-flow fixed-bed reactor according to the present disclosure. Operation of the reactor of FIG. 2 is controlled by two valves, set to switch flow direction periodically. For the first semi-cycle, the reactant gas flows through the top of the fixed-bed (gray, dotted line). The flow is reversed in the second semi-cycle where the reactant gas flows through the bottom of the fixed-bed (black, solid line). To operate in normal-flow conditions, only one direction of flow is utilized.

Figure 3:
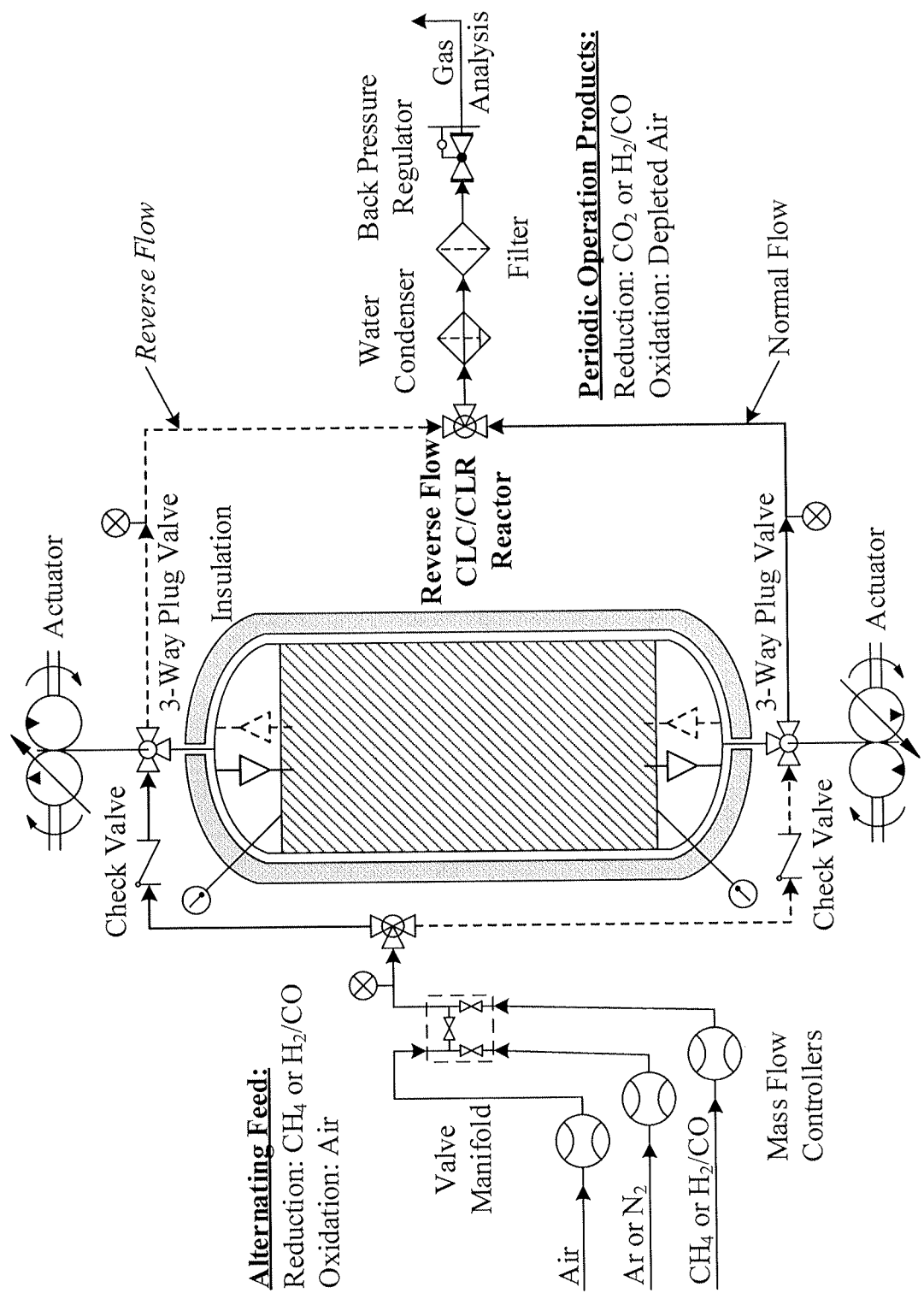
FIG. 3 is a schematic depiction of an exemplary bench-scale reverse-flow chemical-looping apparatus of the present disclosure.

A process schematic of an exemplary system design according to the present disclosure is provided in FIG. 3. In particular, FIG. 3 provides a schematic of an exemplary bench-scale reverse-flow chemical-looping apparatus. As disclosed therein, alternating feed may include a reduction agent (e.g., $CH_4$ or $H_2/C$) and/or an oxidation agent (e.g., air). An appropriate valving manifold is provided on the feed side of the reactor. Actuators are provided to control 3-way valves to control flow of process streams, thereby effectuating "normal flow" and "reverse flow" as disclosed herein. Periodic operation products are generated by the disclosed system, e.g., reduction products such as $CO_2$ or $H_2/CO$, and oxidation products such as depleted air. Thus, in an exemplary embodiment of the present disclosure, power and/or hydrogen may be provided to end users/customers, with a separate concentrated carbon dioxide stream ready for sequestration.

EXAMPLES

1. Mathematical Model and Validation

Kinetic and reactor models for CLC applications in TGA, fixed-bed, and fluidized-bed reactors have developed and validated in prior work [14, 36, 37, 74-76]. A heterogeneous model reported in Han et al. [36, 37] was successfully used to predict the experimental data from various CLC units in the literature (Table 1) using a universal CLC reaction scheme Table 2) for a Ni-based oxygen carrier and $CH_4$ reducing fuel [14, 74, 76].

TABLE 1

Operating conditions of the studied CL fixed-bed units.

| | Jin and Ishida (2002) [83] | Iliuta et al. (2010) [84] | Z. Zhou et al (2013b) [74] | Rydén et al. (2008b) [79] |
|---|---|---|---|---|
| L [mm] | 250 | 7.65 | 21.7 | 5.66 |
| D [mm] | 16 | 4 | 9.9 | 15 |
| Q [ml min$^{-1}$] | 900 | 100 | 100 | 60 |
| Reducing gas | 33% $CH_4/H_2O$ | 10% $CH_4$/Ar | 10% $CH_4$/Ar | 25% $CH_4$/Ar |

TABLE 1-continued

Operating conditions of the studied CL fixed-bed units.

| | Jin and Ishida (2002) [83] | Iliuta et al. (2010) [84] | Z. Zhou et al (2013b) [74] | Rydén et al. (2008b) [79] |
|---|---|---|---|---|
| Oxidizing gas | Air | 21% $O_2$/Ar | 10% $O_2$/Ar | Air |
| T [° C.] | 600 | 900 | 850 | 900 |
| Fr | 0.34 | 6.3 | 0.055 | 0.0039 |
| L/D | 15.6 | 1.9 | 2.2 | 0.38 |
| $Re_p$ | 10 | 0.5 | 0.07 | 0.02 |
| $d_p$ [μm] | 3300* | 140 | 100 | 120 |

*Volume-average equivalent diameter

TABLE 2

Chemical-looping reduction reactions with NiO and $CH_4$ [74].

| NiO reduction reactions | Partial $CH_4$ oxidation | $CH_4 + 2NiO \rightarrow 2Ni + CO_2 + 2H_2$ |
|---|---|---|
| | $H_2$ oxidation | $H_2 + NiO \rightarrow Ni + H_2O$ |
| | CO oxidation | $CO + NiO \rightarrow Ni + CO_2$ |
| | Partial $CH_4$ oxidation | $CH_4 + NiO \rightarrow Ni + 2H_2 + CO$ |
| Ni-catalyzed reactions | Steam $CH_4$ reforming | $CH_4 + H_2O \leftrightarrow 3H_2 + CO$ |
| | Water gas shift | $CO + H_2O \leftrightarrow H_2 + CO_2$ |
| | Dry reforming | $CH_4 + CO_2 \leftrightarrow 2CO + 2H_2$ |
| | Methane decomposition | $CH_4 \leftrightarrow 2H_2 + C$ |
| | C gasification by $H_2O$ | $C + H_2O \leftrightarrow CO + H_2$ |
| | C gasification by $CO_2$ | $C + CO_2 \leftrightarrow 2CO$ |

Based on a review of known solid-state reaction models in the literature and their applicability to characterize the Ni-based oxygen carrier reduction and oxidation behavior, it has been concluded that for supported NiO oxygen carriers, reduction by $CH_4$, $H_2$, and CO can be satisfactorily represented by the nucleation and nuclei growth model, and oxidation by $O_2$ using the geometrical contraction models [75]. This model is augmented here with relevant Ni and carbon oxidation reactions, using the kinetics supplied from the literature (Table 3) [75, 77, 78].

TABLE 3

Chemical-looping oxidation reactions with Ni, carbon and $O_2$.

| Ni oxidation | $O_2 + 2Ni \rightarrow 2NiO$ | Zhou et al. (2014a) [75] |
|---|---|---|
| Carbon combustion reactions | $O_2 + C \rightarrow CO_2$ | Keskitalo et al. (2006) [77] |
| | $O_2 + 2C \rightarrow 2CO$ | Keskitalo et al. (2006) [77] |
| | $O_2 + 2CO \rightarrow 2CO_2$ | Subramaniam and Varma (1985) [78] |

Figure 4B:
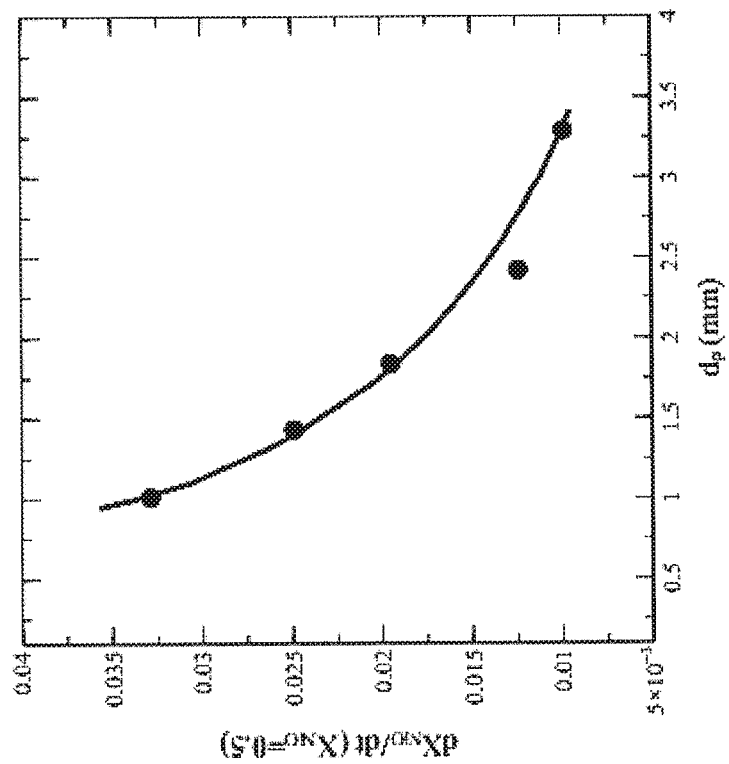
FIGS. 4(a), 4(b), 4(c) and 4(d) are plots of model predictions of CLC experimental data performed in fixed-bed (FIGS. 4(a) and 4(c)), TGA studies FIG. 4(b), and fluidized-bed FIG. 4(d). For specific information on testing conditions, reference is made to Rydén et al. (2008b) [79], Ishida et al. (1996) [80], Han et al. (2014) [36-37], and Chandel et al. (2009) [81].
Figure 4A:
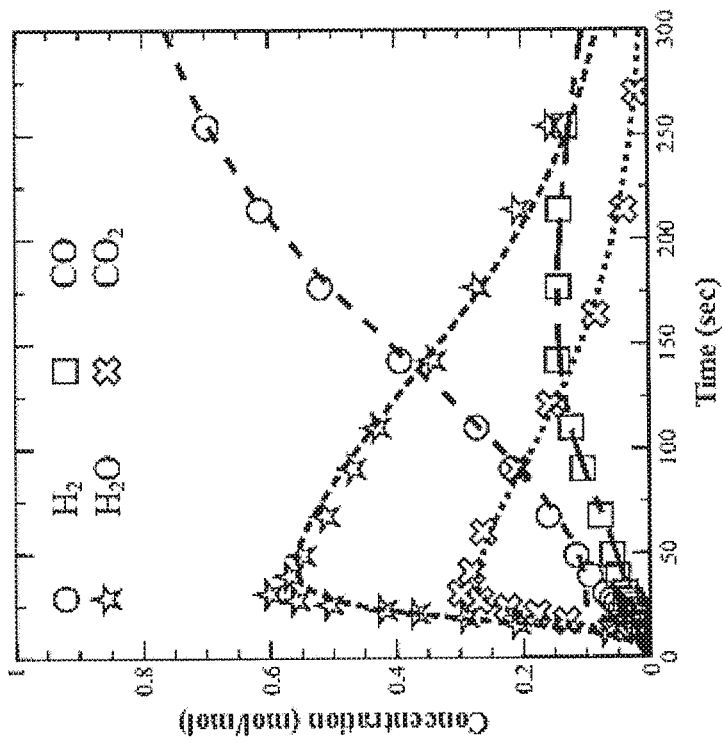
Figure 4D:
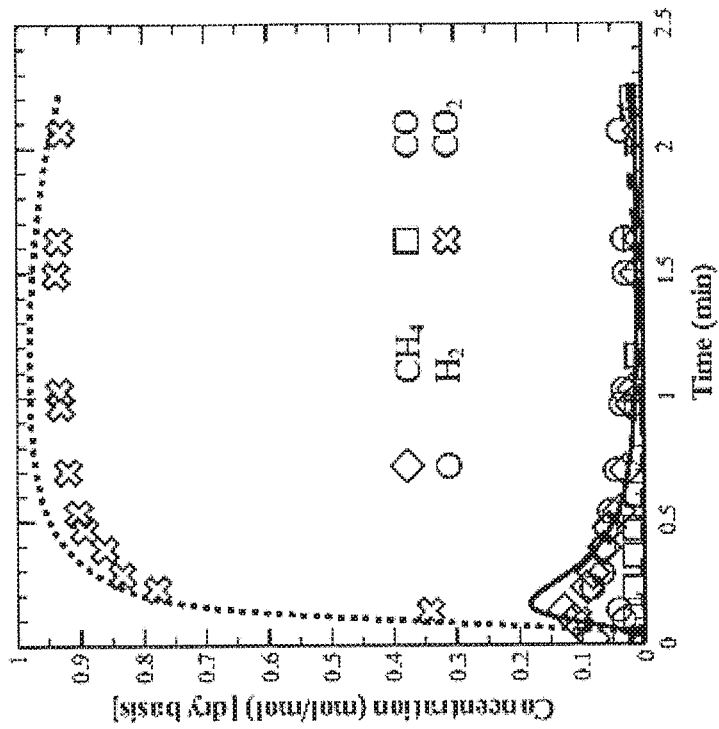
Figure 4C:
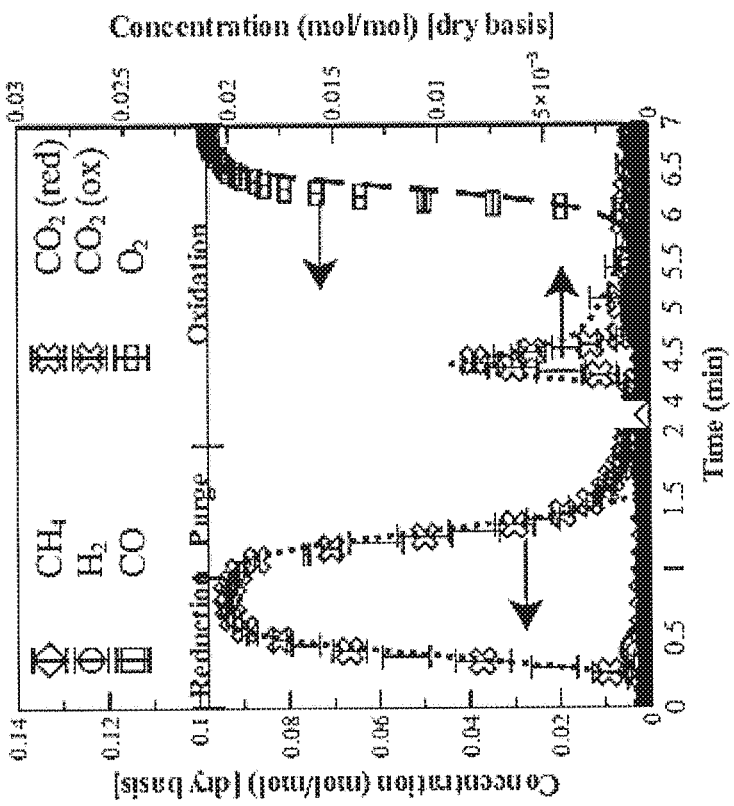

FIGS. 4(a) to 4(d) demonstrate the adequacy of the developed kinetics of Tables 2-3 and reactor/particle models to match experimental data from fixed-bed, TGA, and fluidized-bed studies in reducing and oxidizing environments operating under different temperatures, hydrodynamic regimes and particle sizes. Specifically, FIG. 4(a) shows the reaction scheme and kinetics presented previously are accurate for the prediction of real data of CLC reduction of NiO by $CH_4$ in a fixed-bed reactor [79]. The significance of varying particle sizes on the observed oxygen carrier reactivity was studied using a particle model of the internal and external diffusion effects and validated against data collected from the TGA (see FIG. 4(b)) [80]. In addition, the model is sufficient to predict a complete, nearly isothermal CLC reduction/purge/oxidation sequence collected from the laboratory scale fixed-bed reactor (FIG. 4(c)) [36, 37]. The applicability of the reaction kinetics of Table 2 to predict the reduction of NiO with $CH_4$ in a fluidized-bed reactor is demonstrated in FIG. 4(d) [81].

In summary, the models developed previously provide a sufficient level of accuracy and can be used with confidence for reactor analysis and process efficiency studies. The dynamic fixed-bed and fluidized-bed models described herein, were implemented and solved in gPROMS 4.0.0 [82]. The finite difference method was used to discretize the partial differential equations along the axial bed direction and the radial particle direction.

2. Fixed-Bed Reactor Model

Heterogeneous modelling frameworks that have been previously developed [36, 37] may be refined to accommodate concentrated $CH_4$ flows and simulate the reverse-flow reactor performance, using the dusty-gas model (see Appendix A). The reactor model assumes an axially dispersed plug flow for the bulk transport of mass and heat. The reactor is assumed to be operated adiabatically, to match industrial reactors. The appropriate boundary conditions for the reactor equations under one-directional flow and reverse-flow are shown in Appendix A.

3. Fluidized-Bed Reactor Model

The fluidized-bed reactor is described by a three-phase (bubble, emulsion and wake) hydrodynamic model (see Appendix B), considering the conservation equations of mass, energy and momentum [76].

4. Quantification of Value Proposition of Disclosed Systems/Methods

To explore the advantages of reverse-flow reactors for CLC, two conceptual reactors are simulated herein: (a) a bench-scale reactor, designed to represent a conceptual "average" of the fixed-bed experimental setups reported in the literature; and (b) a scaled-up version to match the capacity of an existing fluidized-bed reactor. A $CH_4$-fed system with a Ni-based oxygen carrier is studied, for which existing models were validated above (see FIG. 4(a)-FIG. 4(d)) and in the literature [14, 36, 37, 74, 76]. Demonstration of the performance of the reverse-flow CLC system with Ni is valuable, because the process constraints imposed by fluidized-bed reactors (e.g., attrition, cost, pollution) are so severe that they invalidate this otherwise excellent oxygen carrier. Therefore, the applicability of the disclosed reverse-flow process is exploited as a potential method to alleviate the challenges of the fixed-bed reactor technology. In the present analysis, the disclosed reverse-flow technique is applied only to the reduction step; however, this can very well be extended in the analysis of the remaining steps. The performance of the reverse-flow reactor is compared to traditional reactors, where any differences in the gas, bed temperature or conversion profiles are attributed only to flow reversal performed during reduction (i.e., all other process conditions are kept identical).

5. Bench-Scale Reactor Prototype Design and Performance

A bench-scale reactor is designed to serve as a benchmark for the quantification of the advantages of the disclosed reverse-flow operation. The reactor dimensions for the bench-scale design are chosen in accord with a prototype reactor designed for demonstration of the disclosed reverse-flow CLC technology. The reactor dimensions and gas flows are reported in Table 4.

TABLE 4

Design and operating conditions for disclosed bench-scale fixed-bed reactor.

| | |
|---|---|
| L [m] | 0.2 |
| D [m] | 0.021 |
| Fr (red) | 0.035 |
| L/D | 10 |
| $Re_p$ | 0.07 |
| $\Delta P$ [bar] | 1.5 |
| Inlet T [° C.] | 700 |
| Q (L $min^{-1}$) | 1 |
| Inlet $x_i$ | 21% $O_2$ in Ar (oxidation) |
| | 10% $CH_4$ in Ar (reduction) |
| | 100% Ar (purge) |

Because most industrial-scale reactors operate almost adiabatically, it is ideal to closely approach adiabatic operating conditions in the bench-scale reactor. Insulation is applied around the bench-scale reactor to suppress radial heat loss, and heat tapes are used to provide additional compensatory heating. However, experimental work on the bench-scale reactor reveals unavoidable heat losses impacting the axial temperature profiles. Use of an evacuated jacket can reduce the radial heat loss, but a better way to approach adiabatic conditions would be to increase the reactor diameter to industrial size.

For this exemplary bench-scale setup, the large influences of radial heat losses were accepted and should be accounted for. The extent of heat loss is studied separately via conducting experiments with preheated inert gas and without periodic flow reversals. The temperature profiles are well-captured by the model by incorporating a heat loss term to the environment and estimating an overall heat transfer coefficient. Therefore, the reactor is operated as described above and simulated using the equations provided in Appendix A. Experiments with the same oxygen carrier and feed were performed in another bench-scale prototype that is operated in isothermal mode and serves for estimation and validation of the reaction kinetics of the oxygen carrier developed for this analysis. The oxygen carrier used in this analysis is a NiO supported on $\gamma$-$Al_2O_3$ with the properties shown in Table 5.

TABLE 5

Properties of the $NiO/Al_2O_3$ oxygen carriers studied.

| Case Study | Small bench-scale reactor | Exemplary reverse flow reactor | Fluidized-bed reactor |
|---|---|---|---|
| Reference | Zhou et al. [36] | Present Disclosure | Chandel et al. [81] |
| Surface area [$m^2$/g] | 68 | 100 | 7 |
| NiO [wt %] | 20 | 18 | 60 |
| Bulk density [kg/$m^3$] | 1190 | 900 | 2200 |
| Porosity | 0.37 | 0.37 | 0.37 |
| Diameter [µm] | 100 | 300 | 171 |

6. Scale-Up to Match Capacity of a Fluidized-Bed

A comparison between the reverse-flow reactor and fluidized-bed reactor is carried out to demonstrate the CLC performance with $CH_4$ fuel and NiO oxygen carrier. Here, the pilot-scale unit by Chandel et al. [81] is selected as a representation of a fluidized-bed reactor system, because it operates with a large inventory of oxygen carrier with a high gas flow rate of pure $CH_4$. This system was simulated successfully by Zhou et al. [14, 76] using the model equations listed in Appendix B. A conceptual "equivalent" fixed-bed reactor was designed to match the capacity of the fluidized-bed unit by Chandel et al. [81], through a model-based scale-up approach [14]. Table 5 (above) and Table 6 (below) summarize the oxygen carrier properties and operating conditions, respectively, used in the simulation of CLC reduction in the fixed-bed and fluidized-bed reactors that are equivalent in terms of their fuel and solids inventory. Adiabatic conditions and undiluted $CH_4$ are simulated for each reactor type. Thus, consistency and relevancy with the conditions of a conceptual large-scale process are maintained.

TABLE 6

Geometries and operating conditions to compare 'equivalent' fixed-bed and fluidized-bed reactors [14].

| Operating conditions | Fluidized-bed unit | Fixed-bed unit |
| --- | --- | --- |
| Inlet T [° C.] | 950 | 950 |
| Solid loading [kg] | 2.5 | 2.5 |
| Q [m$^3$/s] | 2.78E−4 | 2.78E−4 |
| Inlet x$_i$ | $CH_4$: 1 | $CH_4$: 1 |
| D [mm] | 96 | 60 |
| L [m] | 0.4 | 0.223 |
| Bed porosity | 0.65-0.7 | 0.37 |
| Bulk density [kg/m$^3$] | 2200 | 2200 |

Figure 5:
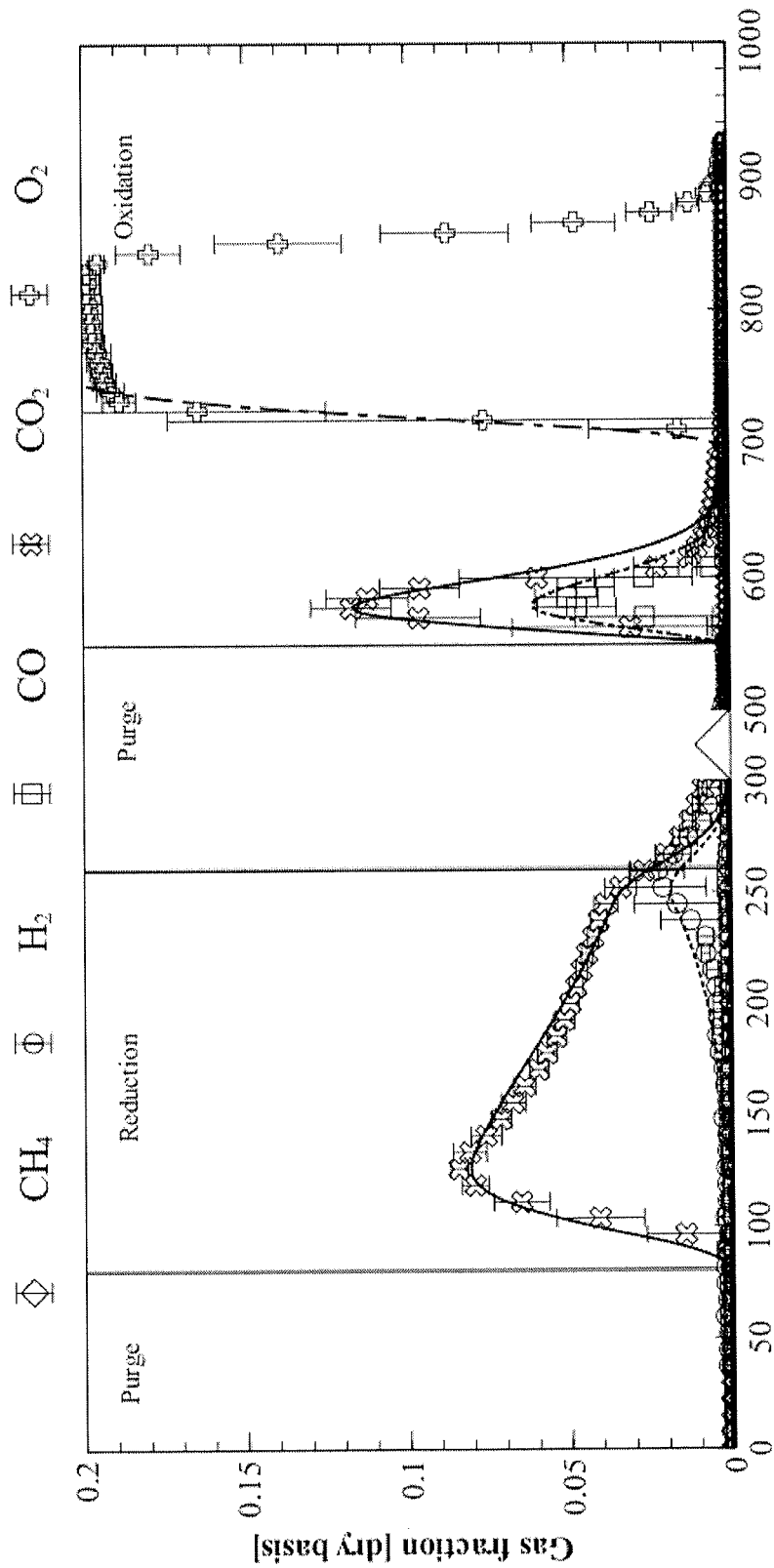
FIG. 5 is a plot of experimental (markers) and model-predicted (lines) of gas concentrations during oxidation in 20% $O_2$ in Ar and reduction in 10% $CH_4$ in Ar at 700-750° C. in an exemplary bench-scale reactor.

7. Reverse Flow Reactor Advantages Over Fixed and Fluidized Bed CLC Configurations One-directional experiments in the exemplary bench-scale reactor were performed first to analyze reactor performance and test the adequacy of the developed kinetics (Tables 2-3) and reactor model (Appendix A). FIG. 5 shows a comparison of the experimental data of a typical purge/reduction/purge/oxidation sequence with the model-predicted gas profiles in standard one-directional operation mode. During reduction of the NiO by $CH_4$, partial and complete combustion products (CO, $CO_2$, $H_2$, and $H_2O$) are generated that subsequently participate in the reforming, water-gas shift, and carbon formation reactions. The syngas is oxidized to $CO_2$ and $H_2O$ via the reduction reactions with the downstream oxidized oxygen carrier. However, as reduction proceeds, NiO becomes progressively depleted, diminishing the $CH_4$ conversion to $CO_2$ and favoring carbon deposition reactions. The formation of solid carbon is very unfavorable because in the subsequent oxidation cycle, solid carbon is oxidized to $CO_2$ and CO, as shown in FIG. 5, and leaves the reactor uncaptured. In the experiment of FIG. 5, the resulting $CO_2$ capture efficiency is too low for practical CLC applications (60%), but nonetheless useful to validate the appropriateness of the developed model to represent the bench-scale reactor.

Figure 6:
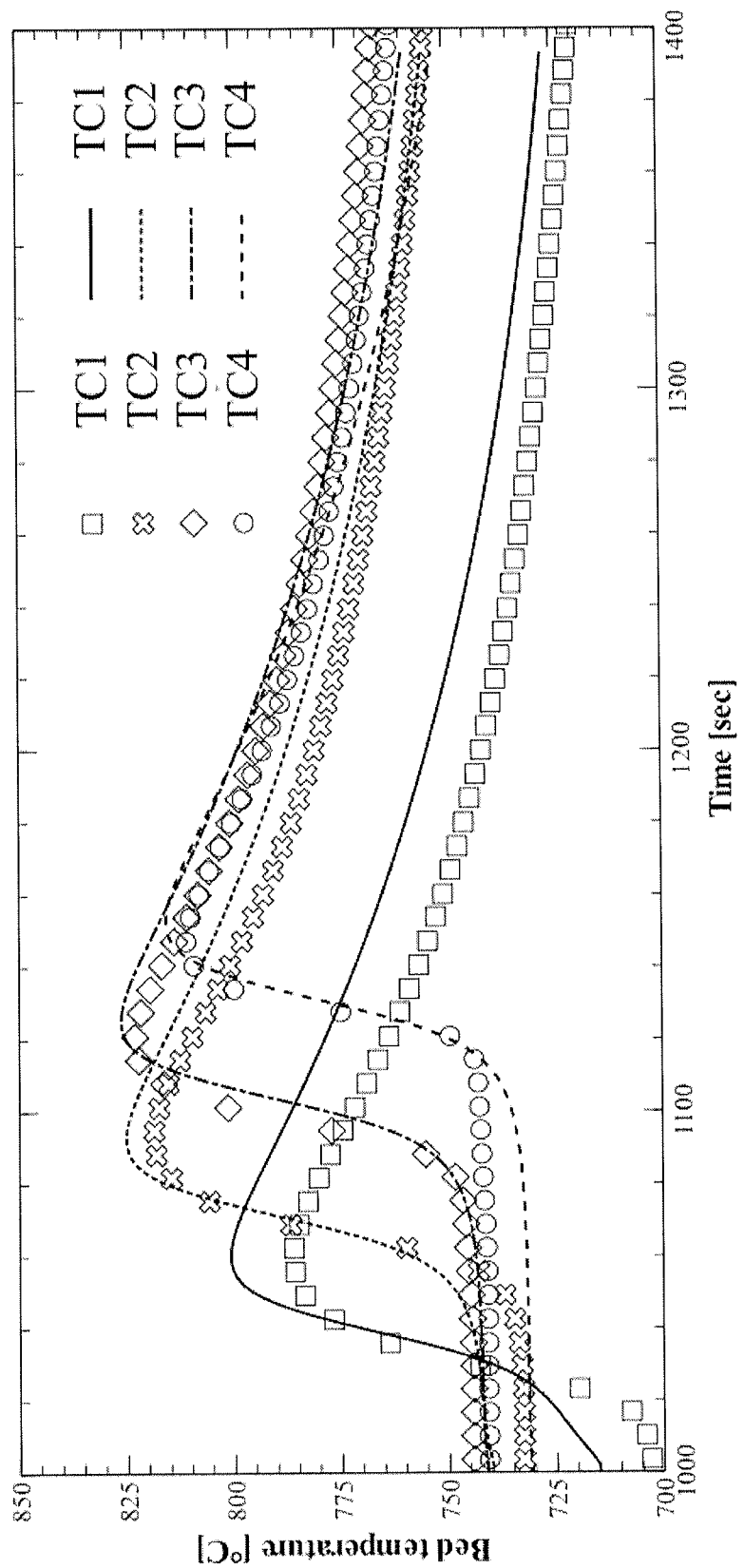
FIG. 6 is a plot of experimental (markers) and model-predicted (lines) of temperature rise experienced for oxidation in 20% $O_2$ in Ar after reduction in 10% $H_2$ in Ar at 700-750° C. in an exemplary bench-scale reactor. Four thermocouples (TC1-TC4) are evenly spaced axially through the bed, where TC1 is at the bed entrance and TC4 at the bed exit.

In addition, a one-directional experiment with reduction by $H_2$ was carried out to study the temperature and reaction fronts observed in the oxidation step over a bed of fully reduced oxygen carrier. This study was valuable to provide validation of the energy balance (and heat loss term) of the model and avoids the complication of carbon combustion reactions, which can significantly convolute the temperature behavior. The resulting oxidation temperature profiles are shown in FIG. 6, complemented with four thermocouple readings, axially spaced throughout the bed (thermocouples (TC1-TC4) were evenly spaced axially through the bed, where TC1 is at the bed entrance and TC4 at the bed exit). Similar to reduction, the one-directional flow produces a conversion front that moves axially through the bed. The temperature front follows the conversion front, exhibiting a temperature rise from the exothermic oxidation reactions. The model is able to capture the axial heat profile with sufficient accuracy (FIG. 6). This calculation takes into account the heat loss of the bench-scale reactor, due the small size of this setup.

In view of the model validation described herein and shown in FIGS. 4-6, the model can be used with confidence to simulate realistic CLC case studies that meet a $CO_2$ capture efficiency of 90% [6] in the bench-scale reactor. The $CO_2$ capture efficiency is calculated in terms of the cycle-averaged $CO_2$ and $CH_4$ flow rates as follows in Eq. (1):

$$\eta_{CO_2} = \frac{\int_0^t F_{CO_2}\big|_{z=L} dt}{\int_0^t F_{CH_4}\big|_{z=0} dt}. \tag{1}$$

Figure 7C:
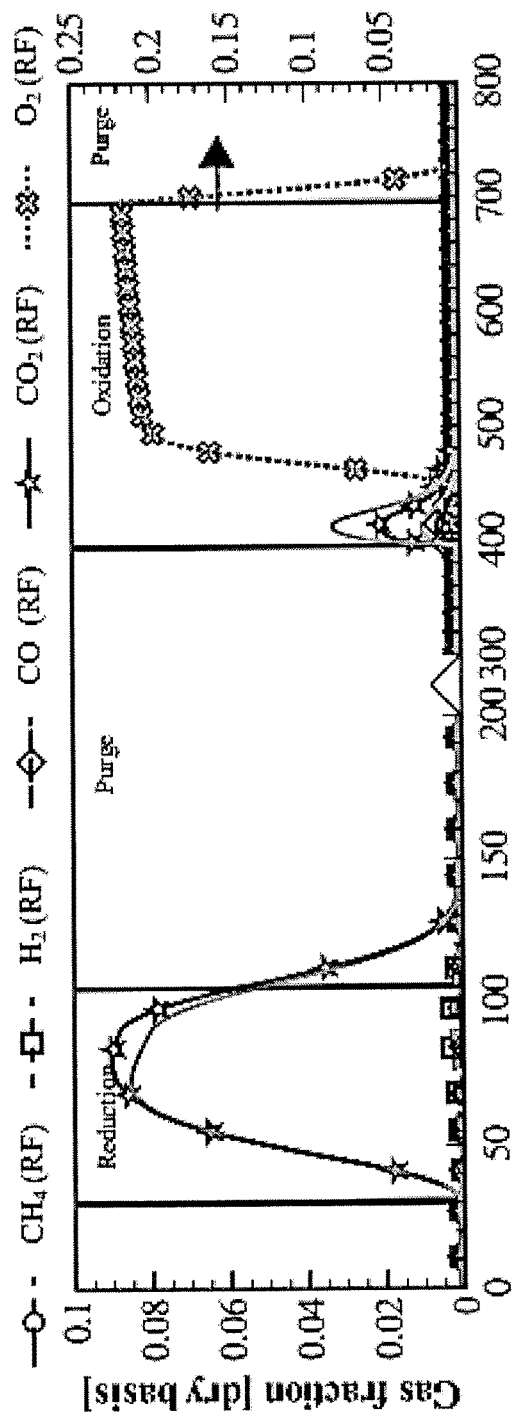
Figure 7D:
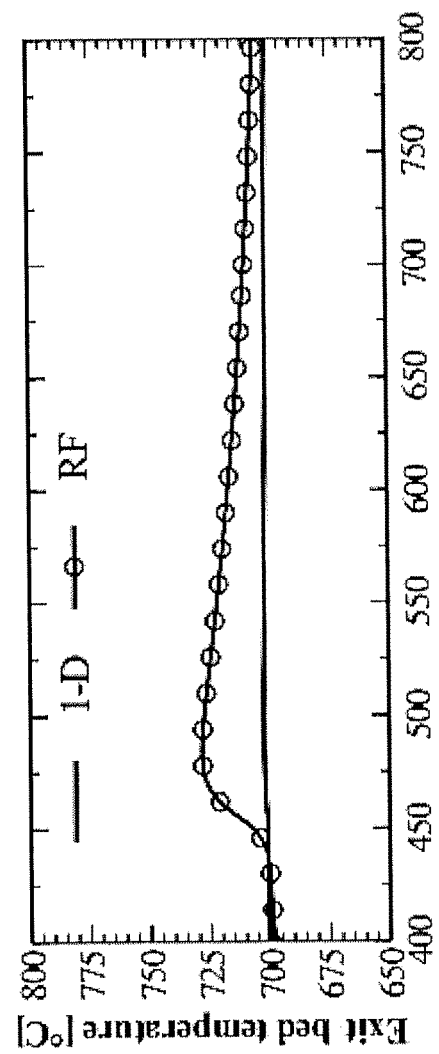
Figure 7E:
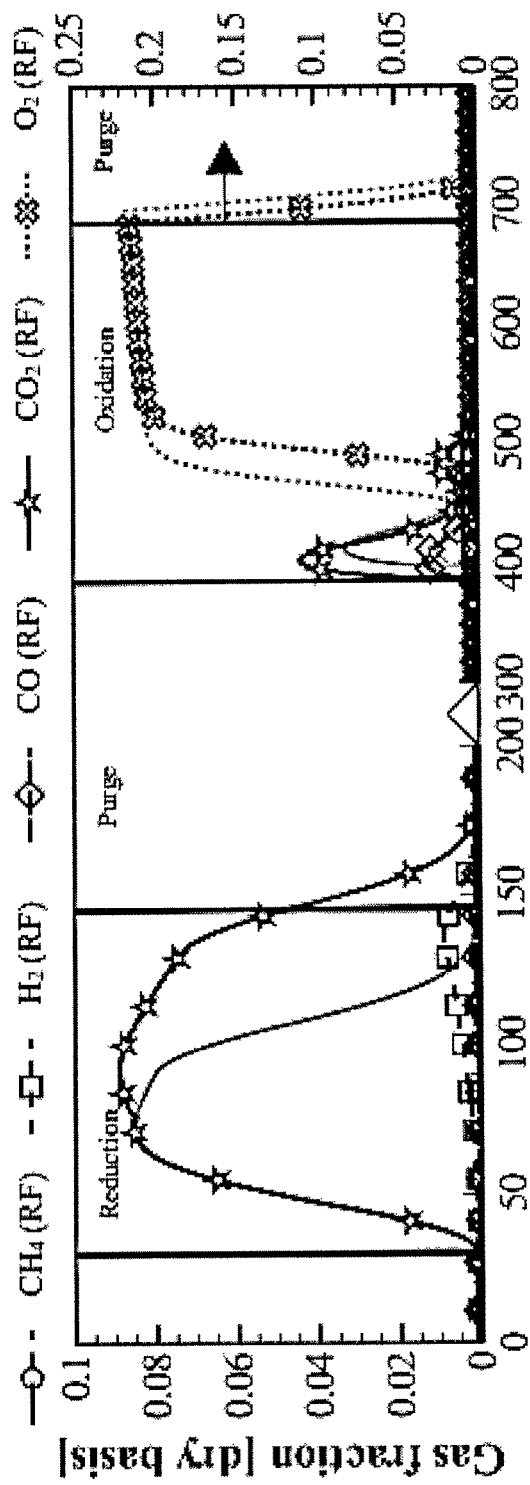
Figure 7F:
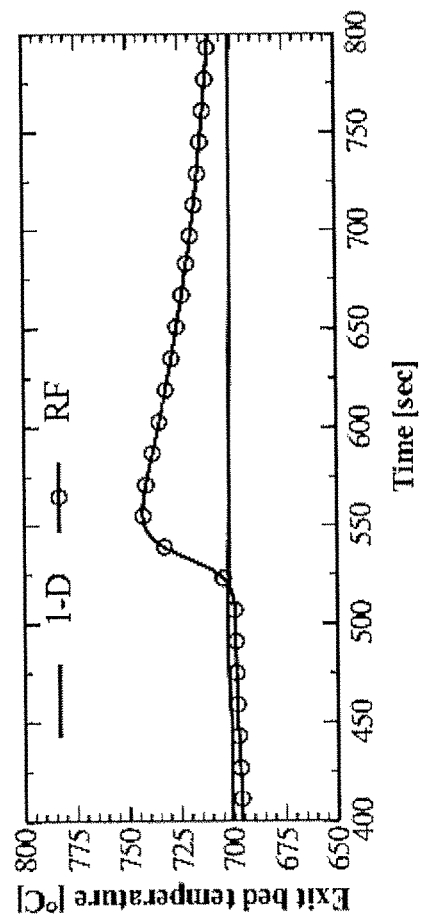
Figures 8A, 8B:
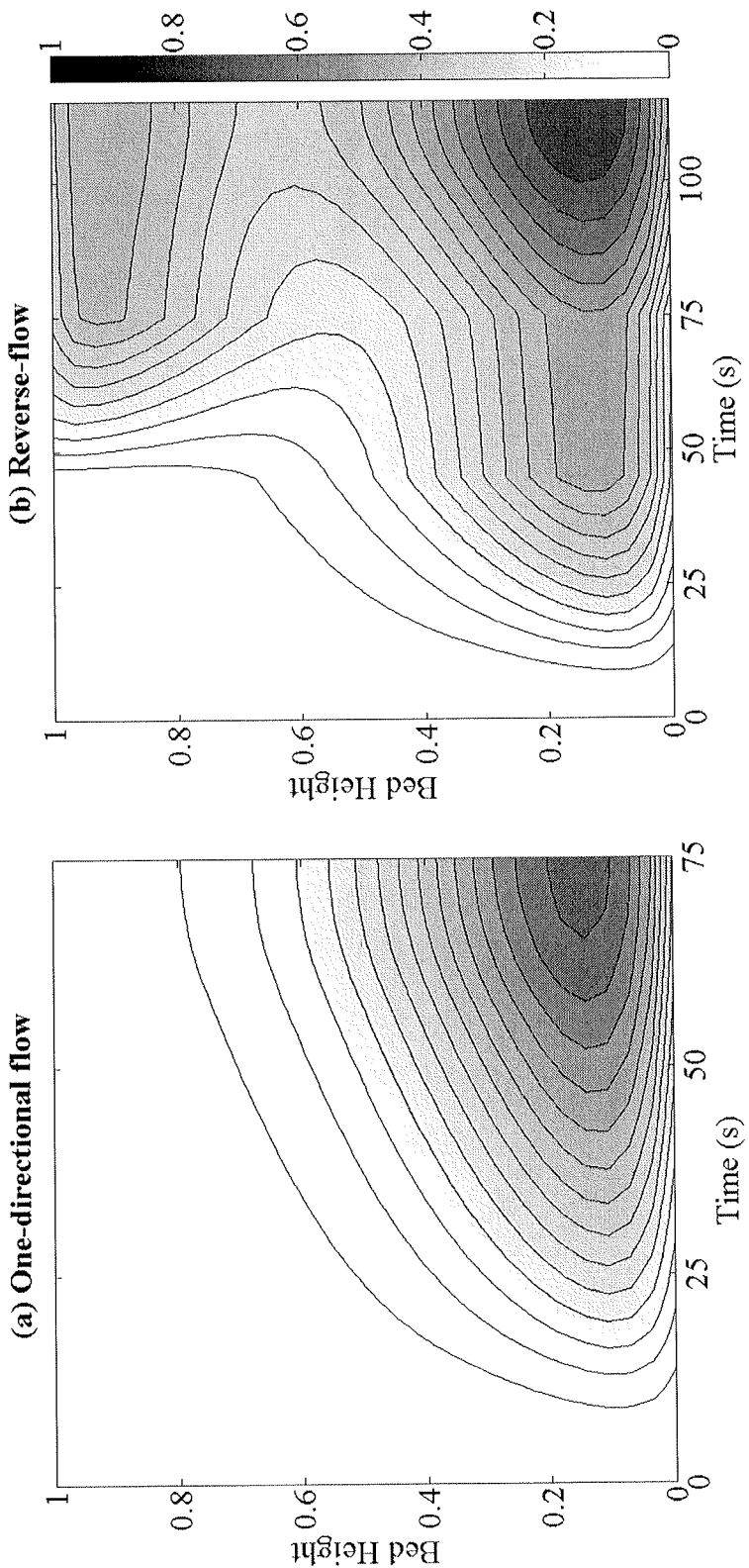
FIGS. 8(a)-8(d) provide analysis of transient profiles of the NiO conversion (top) and bed temperature (bottom) during the reduction cycle. The left column (FIGS. 8(a) and 8(c)) corresponds to conversion and temperature profiles under one-directional flow and the right column (FIGS. 8(b) and 8(d)) the respective profiles in reverse-flow operation.
Figure 8D:
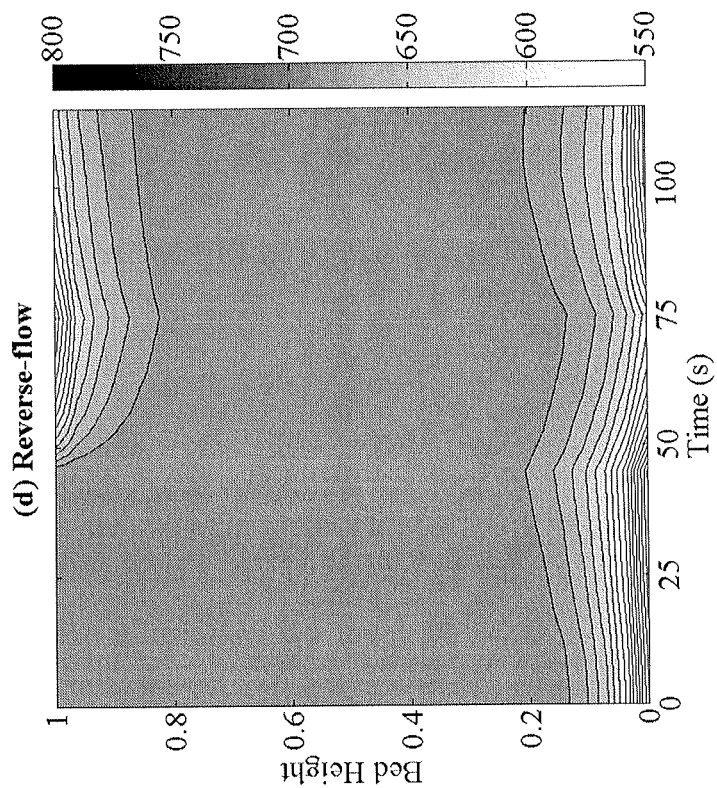
Figure 8C:
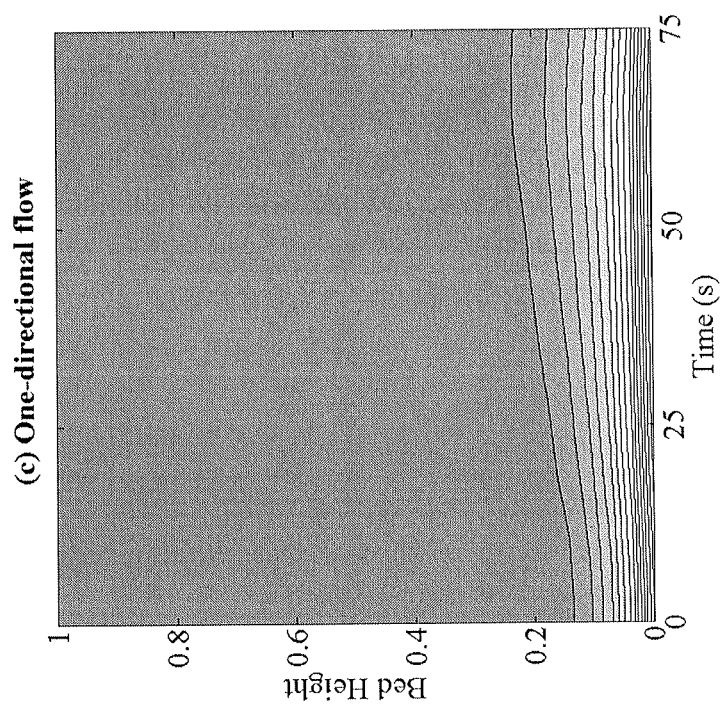
Figure 9B:
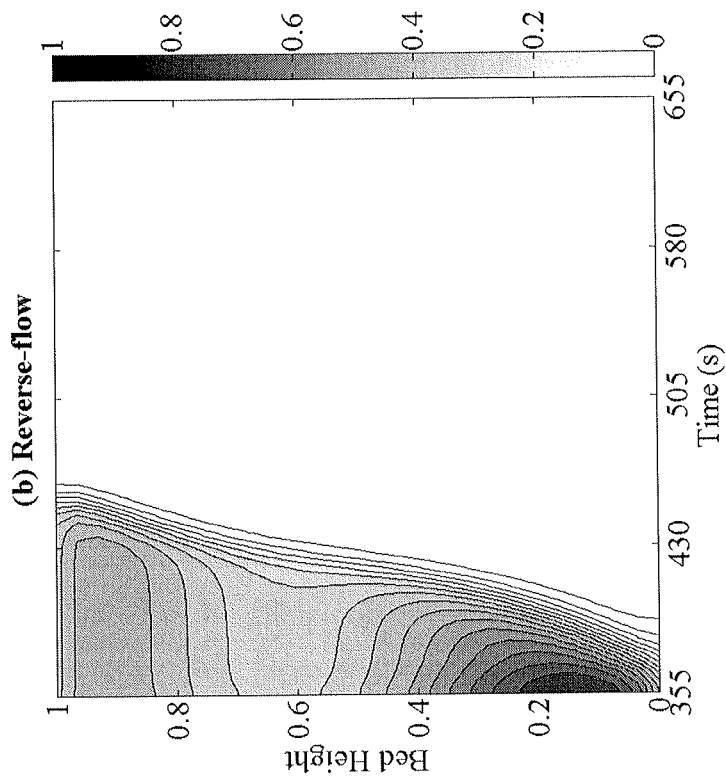
FIGS. 9(a)-9(d) provide analysis of transient profiles of the Ni conversion (top) and bed temperature (bottom) during the oxidation cycle. The left column (FIGS. 9(a) and 9(c)) corresponds to conversion and temperature profiles under one-directional flow and the right column (FIGS. 9(b) and 9(d)) the respective profiles in reverse-flow operation.
Figure 9A:
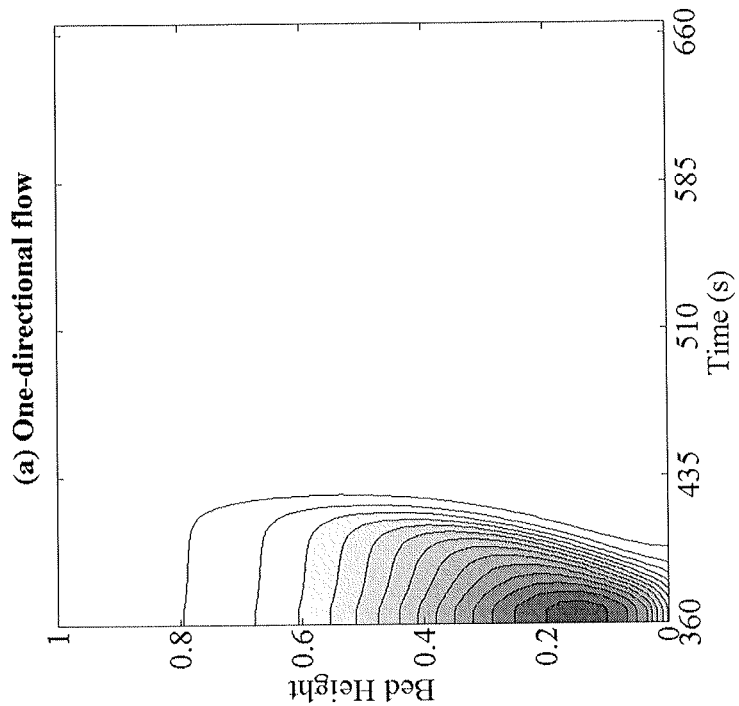
Figures 9C, 9D:
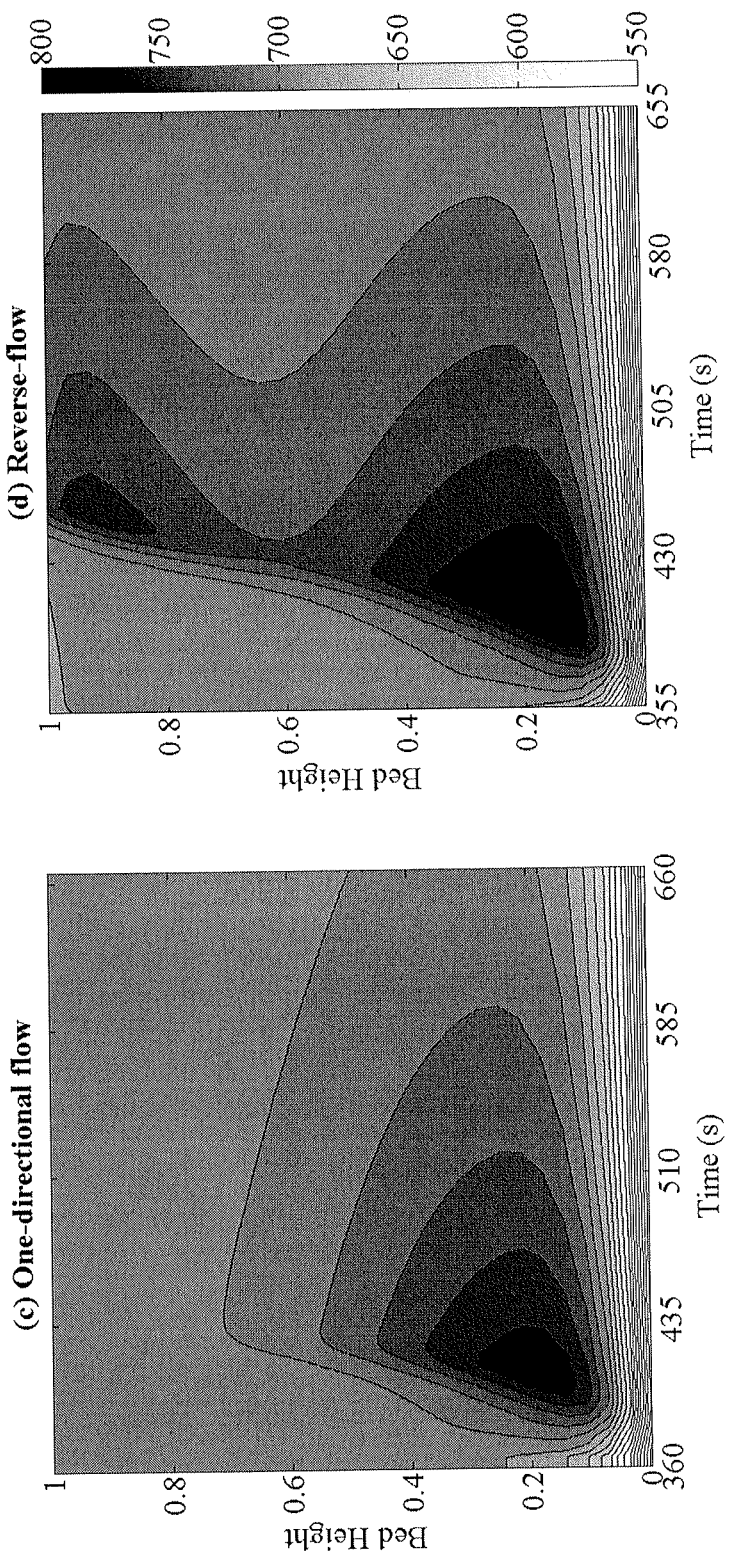

Correspondingly, three scenarios are explored in FIGS. 7(a)-7(f). FIGS. 7(a) and 7(b) illustrate the performance of a standard one-directional fixed-bed reactor in operation that satisfies the 90% $CO_2$ capture efficiency as imposed in Eq. (1). FIGS. 7(c) and 7(d) illustrate the performance of a reverse-flow fixed-bed reactor, with only one flow reversal at operating conditions (feed rate, composition, oxygen carrier loading and oxidation/purge/reduction times) identical to those of the one-directional fixed-bed presented in FIGS. 7(a) and 7(b). This serves as an illustration of the advantages of reversing the flow in terms of $CO_2$ capture efficiency. FIGS. 7(c) and 7(d) illustrate the performance of the reverse flow reactor that satisfies the 90% $CO_2$ capture efficiency as imposed in Eq. (1), and compares it to a corresponding 1-D reactor performance at identical conditions. This analysis illustrates the extrema of the benefit of reversing the flow during reduction for this reactor configuration and conditions (Table 4).

For satisfaction of $\eta_{CO_2}$=90% in the one-directional flow bench-scale reactor, the flow of $CH_4$ must be terminated within 75 s of reduction (FIG. 7(a)), because of significant solid carbon buildup at the reactor entrance. The degree of conversion in the bed is ~30% by the end of the reduction period. As a result, the temperature rise during the subsequent oxidation cycle is mainly exhibited in the first third region of the bed, but it is not evident at the reactor exit due to the heat losses of the bench-scale reactor (FIG. 7(b)). Some of the heat generated travels axially through the bed, but the majority is lost radially to the environment. These effects are not expected to be as severe in larger-scale adiabatic reactors.

In FIG. 7(c), the $CH_4$ flow is reversed once (midway during reduction). As a result, the oxygen carrier is reduced from both sides of the reactor, $CH_4$ is in contact with more fresh NiO, the extent of catalytic reactions is decreased, and deposited carbon is more readily gasified by the combustion products ($H_2O$, $CO_2$). Application of reverse-flow during the reduction step improves the $CO_2$ selectivity of the process, as compared to the one-directional configuration shown in FIG. 7(a).

The process benefits due to reverse-flow according to the present disclosure are also evidenced in the subsequent oxidation step, where a high-temperature front is formed at the bed exit. This temperature rise for the reverse-flow reactor (FIG. 7(d)) is mainly attributed to the reaction enthalpy when $O_2$ reacts with the reduced Ni and solid carbon nearing the reactor exit. From a power generation perspective, the reverse-flow reactor is more advantageous because more heat can be extracted from the oxidation cycle.

The reverse-flow results of FIGS. 7(c) and 7(d) show an enhancement in the $CO_2$ capture efficiency over the one-directional flow. Thus, the reverse-flow reactor is examined in operation in which the reduction step is continued until meeting the required 90% $CO_2$ capture efficiency (without exceeding it, which was the case in FIGS. 7(c) and 7(d)). For simplicity, flow reversal of $CH_4$ is performed three (3) times, with a constant-time switch of 30 s. Alternative time intervals for flow reversal and numbers of flow reversals may be employed, as will be readily apparent to persons skilled in the art. However, under the test procedure for flow reversal described herein, the reduction period is extended to 115 s (FIG. 7(e)) and the oxygen carrier utilization is increased to above 50%. The exhaust gas during oxidation is elevated to higher temperatures, which improves the oxidation cycle efficiency.

In summary, application of reverse-flow in an exemplary bench-scale reactor according to the present disclosure provides better oxygen carrier utilization, higher $CO_2$ capture efficiency, greater flexibility for heat removal, and an overall more efficient mode of conducting CLC in fixed-bed reactors. The reverse-flow process is estimated to improve the performance of the one-directional reactor. Due to only flow reversal, the bed utilization is doubled at >50% (as compared to <30% oxygen carrier reduction for an equivalent one-directional reactor configuration that satisfies the 90% $CO_2$ capture efficiency) and the reduction time is increased to 85 sec (again as compared to the one-directional fixed-bed).

By increasing the conversion in the bed, a higher temperature rise during oxidation is produced. This high temperature region prevails at both ends of the bed, making the removal of heat from the reactor easier and more effective. The effect of flow reversal on the conversion and temperature axial profiles over time is shown in FIGS. 8(a)-8(d) for the reduction and oxidation cycles. Flow reversal during reduction creates a more axially uniform bed conversion, while shifting the endothermic cold spots across both ends. Subsequently, during the oxidation cycle, high bed temperatures are achieved nearing the reactor inlet and exit regions. It is important to note that in FIGS. 8(a)-8(d), the two fixed-bed reactors operate at the same $CO_2$ capture efficiency; however the reverse-flow reactor is able to provide a greater utilization of the bed, longer reduction time, and more prominent oxidation temperature rise.

As demonstrated herein—both theoretically and experimentally—the disclosed system/method provides significant benefits which include: (1) improved oxygen carrier utilization (FIGS. 7(a)-7(f)), (2) higher $CO_2$ capture efficiency (FIGS. 7(a)-7(f)), (3) resistance to carbon deposition (FIGS. 7(a)-7(f)), (4) mitigation of cold zones (FIGS. 8(a)-8(d)), and (5) elimination of gas-solids separation steps.

In the following discussion, additional benefits associated with the present disclosure are quantified and compared to an existing fluidized bed CLC reactor configuration.

8. Comparison with an Existing Pilot Plant Fluidized-Bed CLC Reactor

Figure 10B:
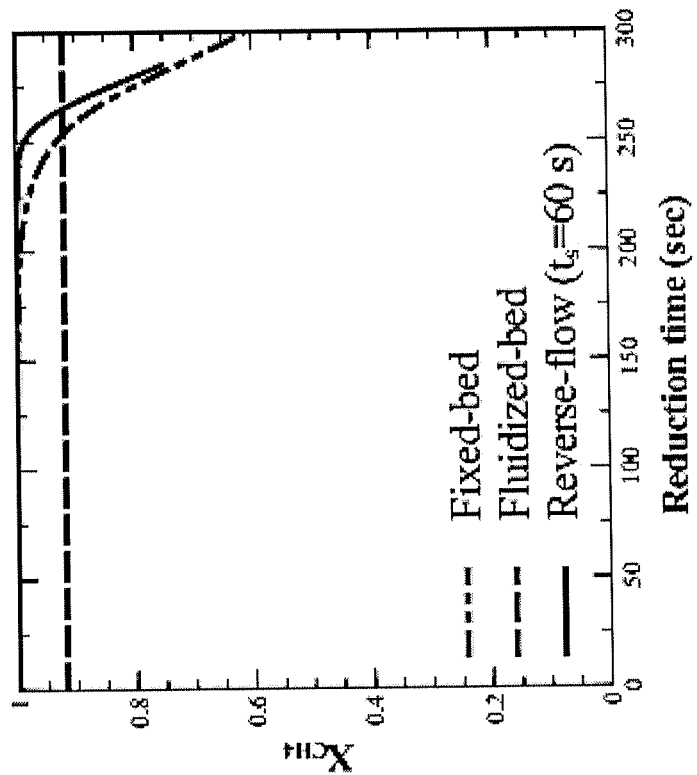
FIGS. 10(a), 10(b) and 10(c) provide comparisons of the transient $CO_2$ selectivity (FIG. 10(a)), $CH_4$ conversion (FIG. 10(b)), and accumulated solid carbon (FIG. 10(c)) for a reverse-flow reactor against one-directional fixed-bed and fluidized-bed reactors.
Figure 10A:
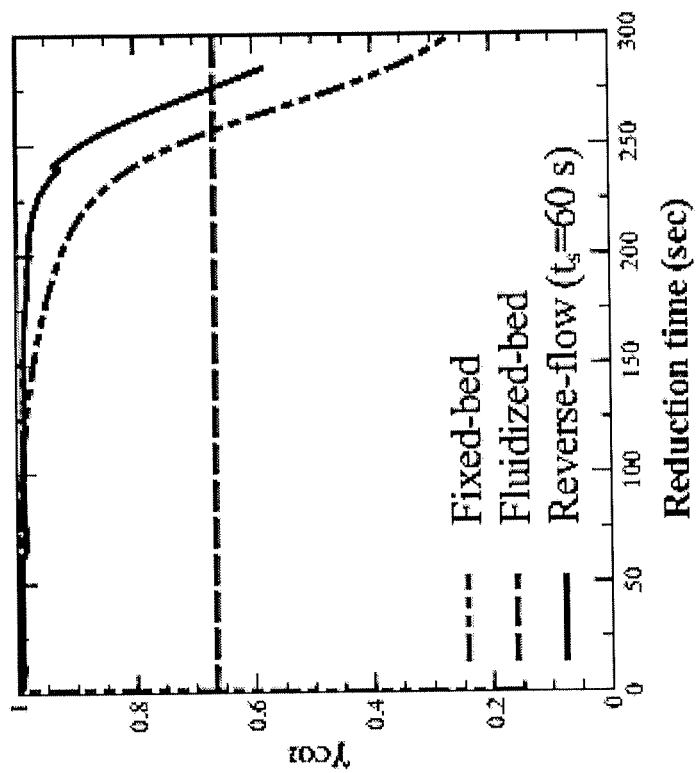
Figures 10C, 10D:
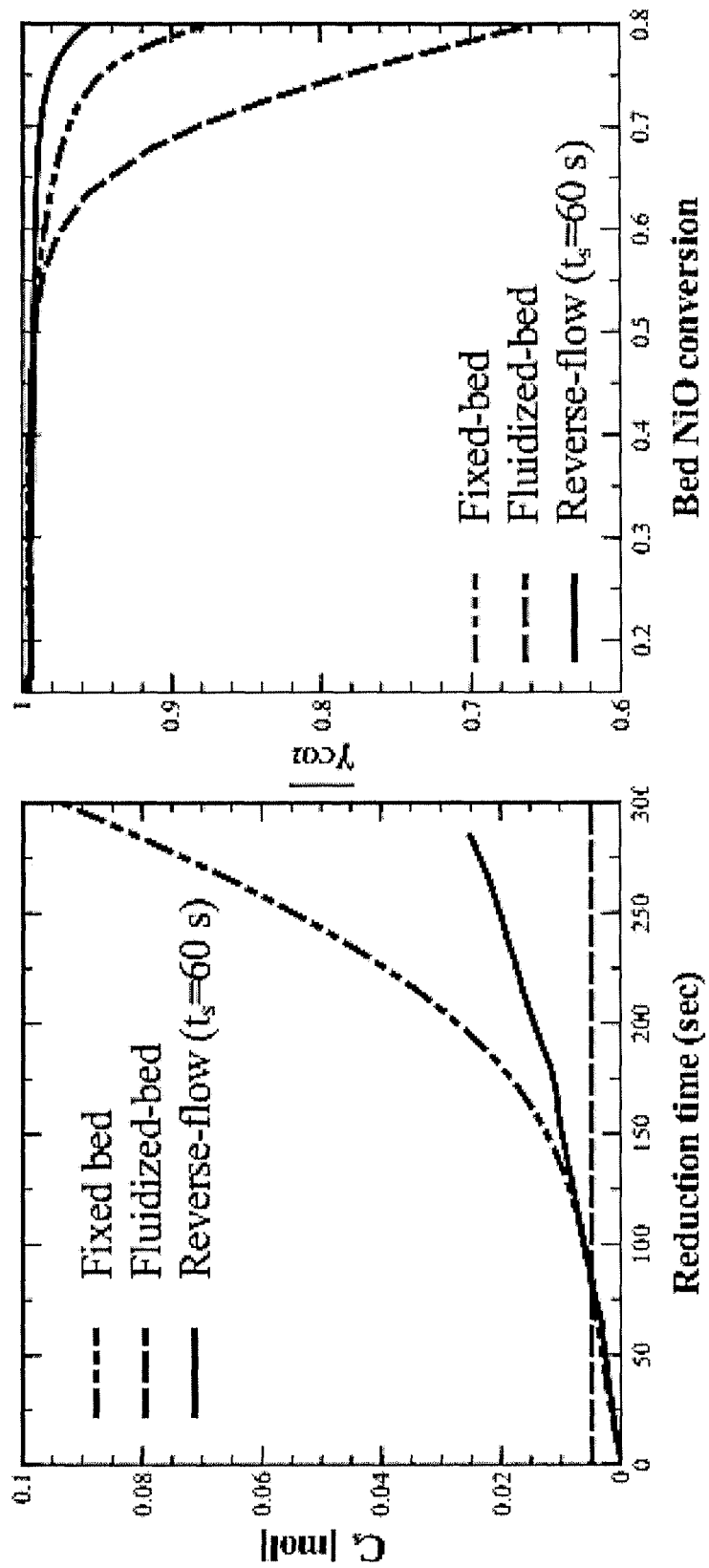
FIGS. 10(d), 10(e) and 10(f) provide comparisons of the cycle-averaged $CO_2$ selectivity (FIG. 10(d)), $CH_4$ conversion (FIG. 10(e)), and selectivity to solid carbon (FIG. 10(f)) for a reverse-flow fixed-bed reactor against one-directional fixed-bed and fluidized-bed reactors.

The reduction performance with $CH_4$ fuel and NiO was investigated for continuous fluidized-bed, one-directional fixed-bed, and reverse-flow fixed-bed reactors, which are equivalent in terms of their solid loading, fuel flow, and oxygen carrier. The fixed-bed and fluidized-bed reactors were compared in terms of fuel conversion and $CO_2$ selectivity exhibited over the same oxygen carrier conversion spans. FIGS. 10(a)-10(c) show the calculated gas and solid selectivities achieved in the one-directional fixed-bed, reverse-flow and fluidized-bed reactors over the same oxygen carrier conversion span ($\Delta X$) of 0.65.

The one-directional fixed-bed initially exhibits close to 100% $CO_2$ selectivity and $CH_4$ conversion, which drops over the course of the reduction period. At the end of the reduction period, gas selectivity is poor and carbon deposition becomes dominant. By employing a flow reversal strategy using a selected constant-switch time interval, the high $CO_2$ selectivity and $CH_4$ conversion can be maintained for a longer reduction time, as compared to the one-directional fixed-bed. The amount of solid carbon is also lower.

In comparison, the fluidized-bed operates at a lower $CO_2$ selectivity, $CH_4$ conversion, and accumulated solid carbon compared to the fixed-beds. Favorable mixing patterns in the fluidized-bed allow the gaseous fuels to gasify any deposited carbon, but leads to the appearance of syngas in the exhaust. Typically, the fluidized-bed is operated at a lower oxygen carrier conversion span (<0.5) to favor fuel conversion [85, 86]. Nevertheless, in direct comparison, FIGS. 10(a)-10(c) illustrate that if the fluidized-bed is operating under the same conditions as the fixed-bed, the fixed-bed achieves on average superior combustion and $CO_2$ capture efficiencies.

The reverse flow reactor configuration of the present disclosure is shown to outperform all other reactor configurations when fuel conversion, $CO_2$ selectivity and carbon formation are all taken into consideration.

Figure 10F:
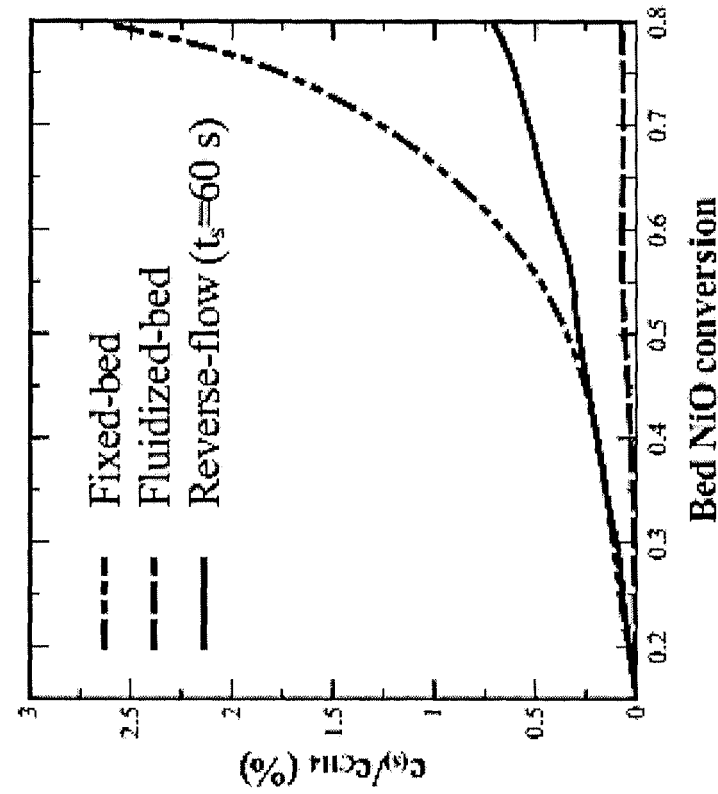
Figure 10E:
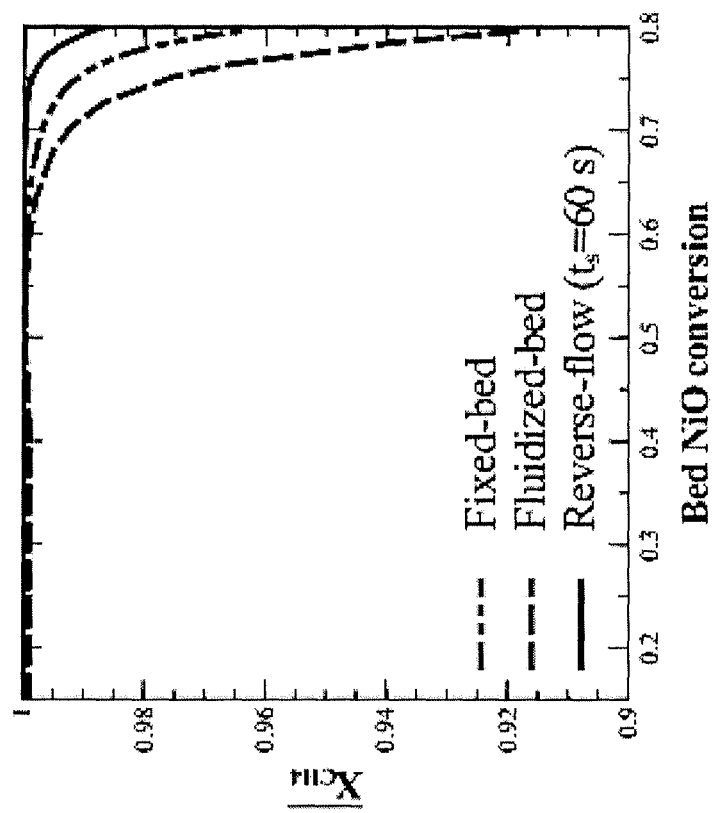

FIGS. 10(d)-10(f) illustrate a realistic case study of the fluidized-bed, where multiple steady-state simulations are performed to investigate the reactor performance under different values of $\Delta X$. For the same conversion spans, the cycle-averaged results of the fixed-bed and reverse-flow reactors are also depicted. At bed conversion $\Delta X<0.5$, all three reactor configurations deliver ~100% $CH_4$ conversion to $CO_2$. This is in agreement with the operational experience of fluidized-bed reactors, where a low oxygen carrier conversion span is required to maintain adequate fuel conversion and $CO_2$ capture efficiencies. At higher NiO conversions [0.5-0.8], the fixed-bed achieves a higher cycle-averaged $CO_2$ selectivity and fuel conversion than the fluidized-bed. The solid carbon selectivity for the entire reduction cycle is higher for the fixed-bed, but still <3%. Application of flow reversal in the fixed-bed reactor improves upon the benefits of the fixed-bed, while addressing the carbon formation issue of the one-directional fixed-bed reactor configuration. Flow reversal during the reduction cycle permits the fixed-bed to operate at an even higher cycle-averaged $CO_2$ selectivity and close to 100% $CH_4$ conversion (FIGS. 10(d)-10(f)). With the reverse-flow process, ~95% $CO_2$ capture efficiency is now possible.

The oxygen carrier-to-fuel ratio ($\phi$) is an important parameter that impacts upon and/or controls the capacity at which the CLC system can operate. In fluidized-bed processes, $\phi$ is defined by Eq. (2):

$$\phi = \frac{F_{NiO}}{v \times F_{CH_4,in}}, \quad (2)$$

where F is the molar flow rates of NiO and $CH_4$ into the reactor and v is the stoichiometric NiO amount needed for full conversion to $CO_2$ and $H_2O$. In batch processes, such as the fixed-bed reactor, the equivalent of is expressed by Eq. (3):

$$\phi = \frac{N_{NiO}}{v \int_0^{t_{red}} F_{CH_4,in} dt}, \quad (3)$$

where $N_{NiO}$ is the molar quantity of NiO in the bed and the molar flow rate of $CH_4$ is integrated over the reduction time. The corresponding changes in ϕ are simulated differently depending on the reactor, but in both cases the $F_{CH_4,in}$ is unchanged. In the fluidized-bed, a higher or lower solids flow rate is used to change the value of ϕ. In the fixed-bed process, is calculated by integrating the inlet fuel flow over the different reduction times, $t_{red}$.

Figures 11A, 11B:
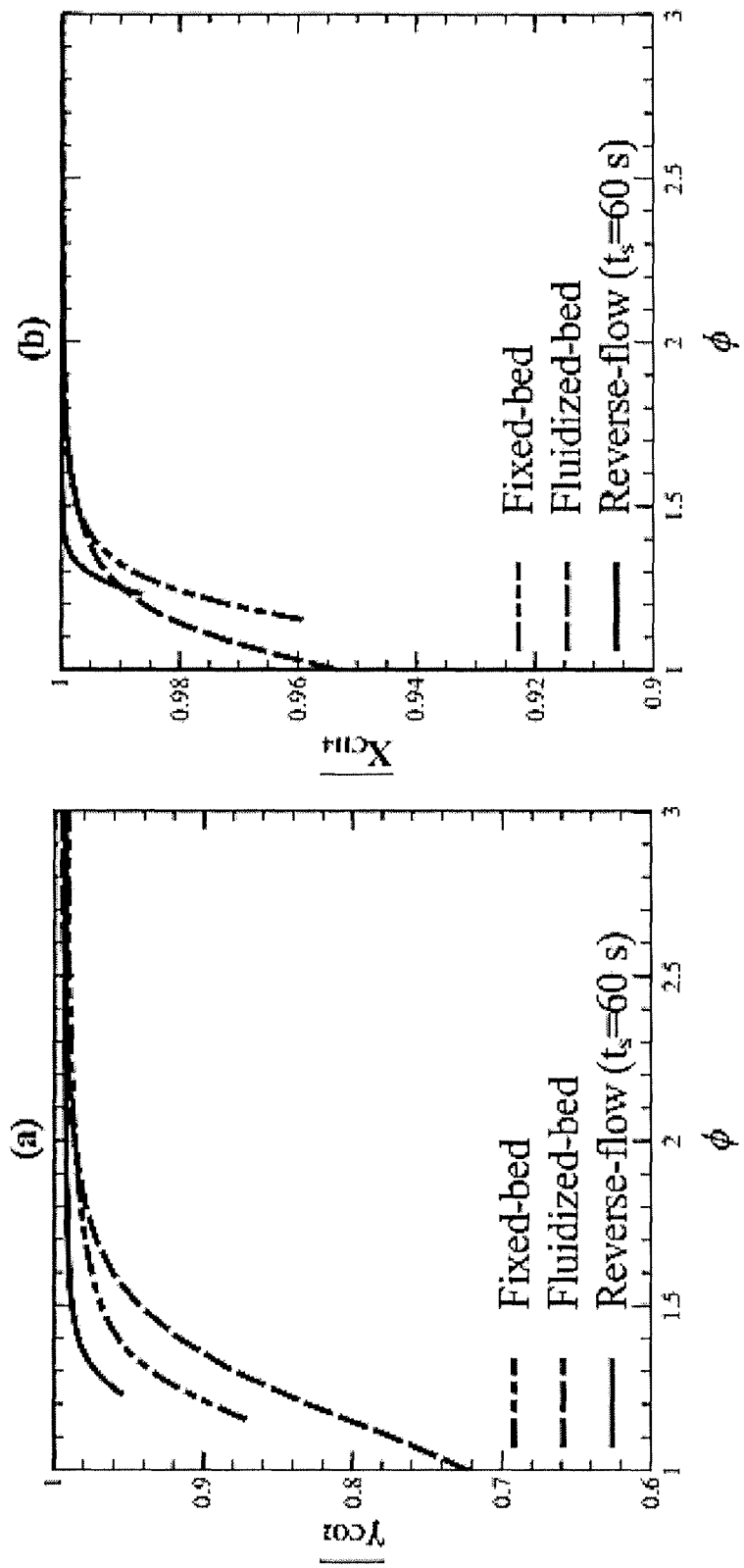
FIGS. 11(a) and 11(b) are plots of the effect of oxygen carrier-to-fuel ratio $\phi$ on the cycle-averaged $CO_2$ selectivity (FIG. 11(a)) and $CH_4$ conversion (FIG. 11(b)) for a fixed-bed reactor with and without flow reversal and a fluidized-bed reactor.

FIGS. 11(a) and 11(b) show the effects of ϕ on the cycle-averaged $CO_2$ selectivity and $CH_4$ conversion for fixed-bed, fluidized-bed, and reverse-flow reactors. The performance of all reactors increases with larger ϕ as more NiO is available to oxidize the fuel. The fixed-bed and reverse-flow reactors do not reach a stoichiometric mixture of ϕ due to the imposed simulation stopping constraints. Nonetheless, it is evident from the results of FIGS. 11(a) and 11(b) that the reverse-flow reactor achieves the highest $CO_2$ selectivity and an equally high $CH_4$ conversion as the fluidized-bed over the same ϕ's. The reverse-flow process enhances the reactivity of the Ni oxygen carrier to favor complete combustion by lifting the thermodynamic constraints observed in the conventional fixed-bed reactor. In order to meet $\eta_{CO_2}$=90%, the fixed-bed must operate at ϕ>1.2 and the fluidized-bed at ϕ>1.4. As can be deduced from FIGS. 11(a) and 11(b), the reverse-flow reactor can provide the same level of performance at the lowest ϕ.

As demonstrated herein, implementation of CLC in a reverse-flow fixed-bed reactor according to the present disclosure is superior in terms of delivering a high $CO_2$ capture efficiency, superior oxygen carrier utilization, and preserving the structural integrity of the oxygen carrier. Exemplary benefits achieved according to the disclosed systems and methods include: (1) improved oxygen carrier utilization, (2) higher $CO_2$ capture efficiency, (3) resistance to carbon deposition, (5) elimination and/or reduction/mitigation of gas-solids separation steps, (6) elimination and/or reduction/mitigation of attrition (e.g., due to the static nature of a fixed-bed reactor), (7) elimination and/or reduction/mitigation of need for oxygen carrier fluidizability (e.g., due to the static nature of a fixed-bed reactor), (8) elimination and/or reduction/mitigation of toxic solid fines effluents, and (9) elimination and/or reduction/mitigation of need for oxygen carrier addition.

The performance of CLC in reverse-flow fixed-bed reactors according to the present disclosure was evaluated by way of a bench-scale reactor and a scaled-up equivalent of an existing fluidized-bed unit, using previously validated reactor models and CLC kinetics. The traditional CLC fixed-bed reactor with $CH_4$ fuel and NiO oxygen carrier was challenged by issues related to the poor mixing, limiting $CO_2$ selectivity. According to the present disclosure, it has been found that periodic reversal of the gas flow during CLC reduction leads to significant improvement in $CO_2$ capture efficiency and bed utilization.

By scaling-up the bench-scale reactor, it was also shown that the reverse-flow advantages could be exploited at a larger scale, rivaling that of existing pilot-scale fluidized-bed reactors. This fixed-bed design avoids the issue of attrition and gas-solid separation which is inevitable for circulating processes. Furthermore, the simplicity of the process makes it easily applicable to existing bench-scale units without considerably complicated equipment, for which scale-up does not entail significant challenges. The technical challenges associated in reversing the direction of the flow can be addressed, e.g., with the use of a high-temperature switching system operated with an optimal selection of switch times. Thus, the disclosed systems and methods have wide ranging and beneficial applicability to a host of applications, including specifically CLC applications.

9. Additional Results for Exemplary Bench-Scale Implementation

As noted herein, reverse-flow operation is capable of promoting complete combustion of $CH_4$ with Ni-based oxygen carriers. With an exemplary bench-scale reactor, adiabatic conditions are simulated for multiple redox cycles until a cyclic steady-state is reached. Initially, the bed is fully reduced and a lean air mixture is delivered to generate NiO. The oxidation cycle is terminated when the reactor-averaged conversion of Ni in the bed is >90%. Complete conversion of the Ni is avoided so that some Ni is present during the reduction to minimize unreacted fuel slip. During the course of oxidation, the reaction heat is removed via gas convection, for which the exhaust gas is envisioned to be sent to a downstream gas turbine for power generation. After oxidation (and heat removal), the gas feed is intermediately switched to purging gas and then to pure $CH_4$ to commence the reduction step. Simulation of the entire reduction cycle has shown that the onset of significant carbon deposition occurs when the space-averaged NiO conversion approaches 80% [14]. Here, the reduction cycle is stopped when NiO conversion reaches 80%, in an effort to maintain a reasonable $CO_2$ capture efficiency. After reduction, the reactor is briefly purged and the next sequence of CLC cycles is initiated. A summary of the simulation parameters used in this strategy is provided in Table 7, although the cycle strategy of Table 7 is likely to be sub-optimal and further optimization of the CLC cycles and their parameters will require additional research and development.

TABLE 7

Cycle strategies for the exemplary bench-scale reactor, dimensions reported in Table 4.

| Reduction | |
| --- | --- |
| Q (L min$^{-1}$) | 0.6 |
| Inlet $x_i$ | $CH_4$: 1 |
| Inlet T [° C.] | 700 |
| Purge | |
| Q (L min$^{-1}$) | 6 |
| Inlet $x_i$ | $N_2$: 1 |
| Inlet T [° C.] | 700 |
| Oxidation/Heat removal | |
| Q (L min$^{-1}$) | 24 |
| Inlet $x_i$ | $O_2$: 0.03, $N_2$: 0.97 |
| Inlet T [° C.] | 700 |

Figures 12A, 12B:
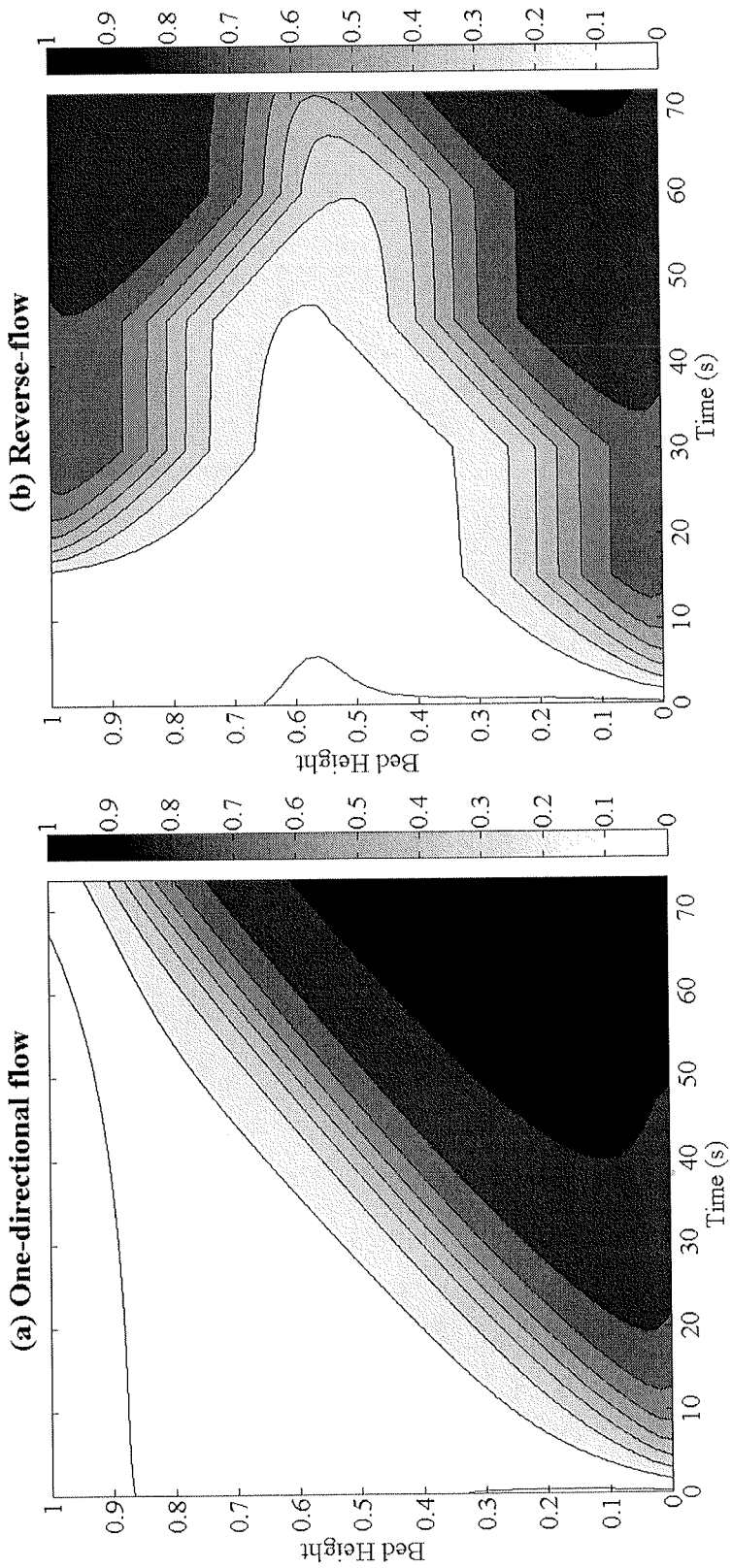
FIGS. 12(a) and 12(b) show NiO conversion profiles during reduction for an exemplary bench-scale fixed-bed reactor.

During the reduction step, the one-directional fixed-bed process exhibits an axial conversion front (FIG. 12(a)). As the oxygen supply in the bed becomes progressively depleted over time, reforming and methane decomposition reactions become significant, resulting in diminishing fuel conversion to $CO_2$. Reverse-flow implementation can be used to enhance the contact between fuel and fresh NiO, to effectively lower syngas and solid carbon concentrations. The conversion profile with the reverse-flow process (FIG. 12(b)), exhibits two conversion fronts that uniformly move toward the center of the bed.

Figure 13A:
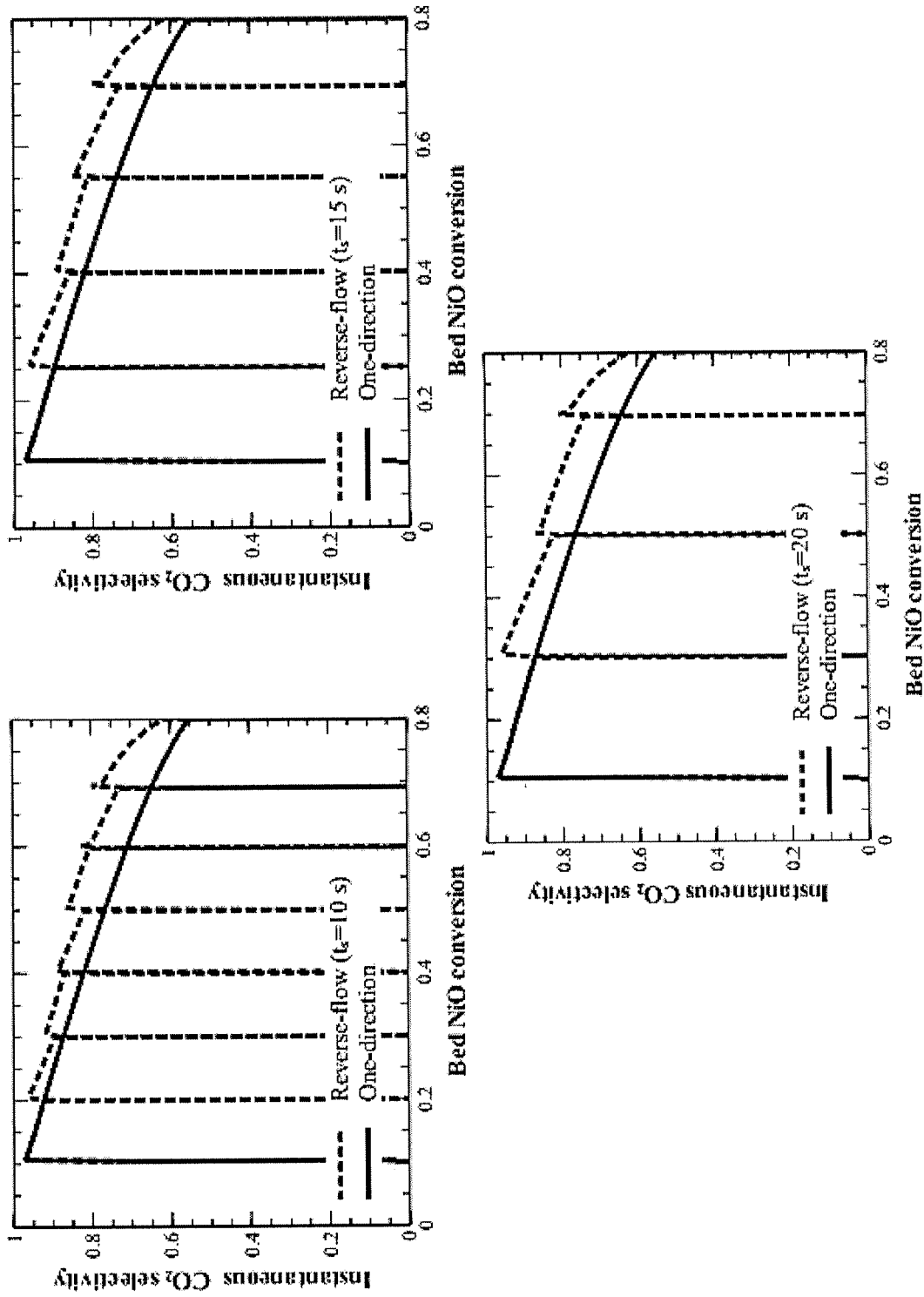
FIG. 13(a) shows the effect of flow reversal on $CO_2$ selectivity during reduction for an exemplary bench-scale fixed-bed reactor at different switch intervals.
Figure 13B:
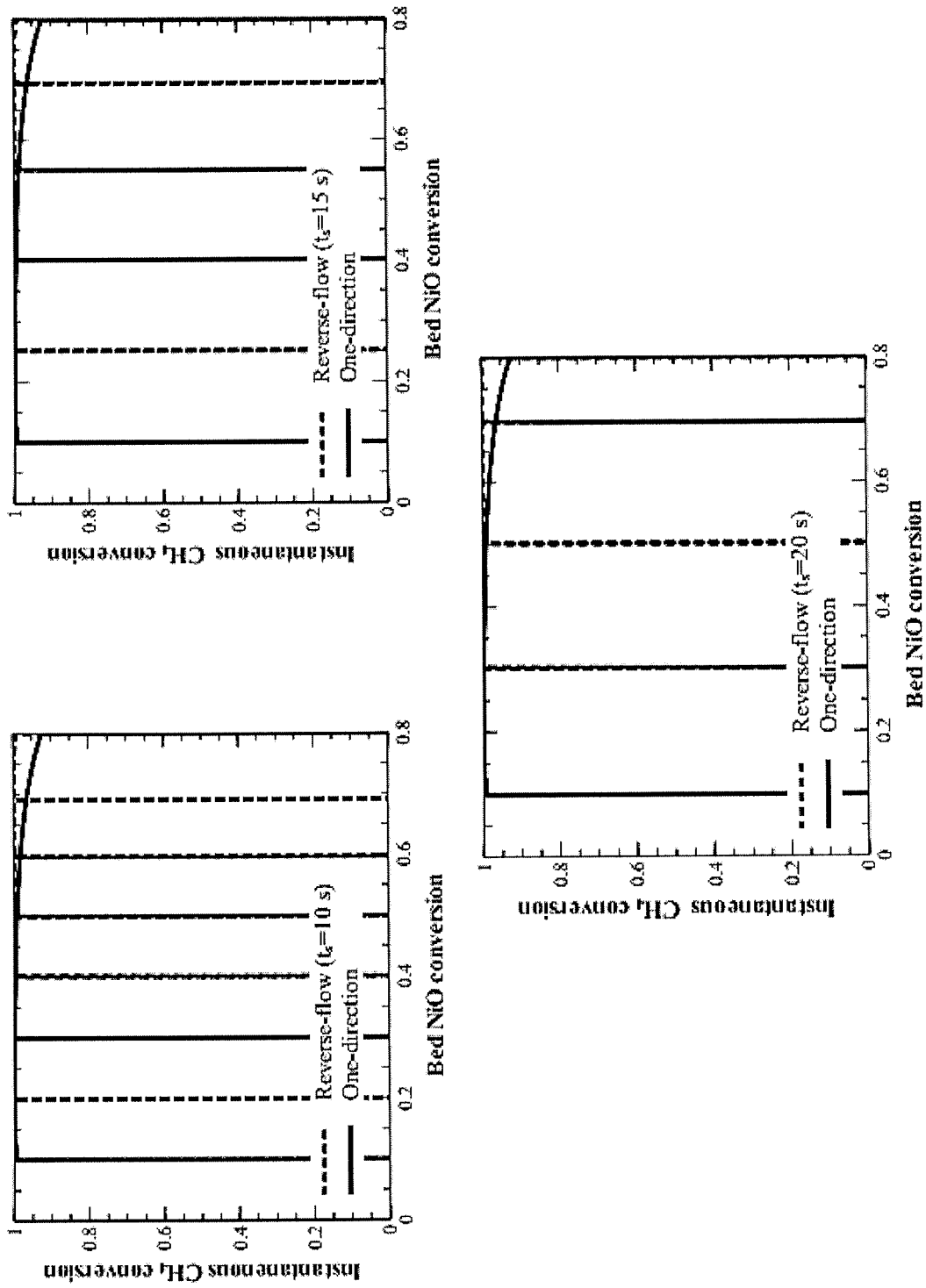
FIG. 13(b) shows the effect of flow reversal on $CH_4$ conversion during reduction for an exemplary bench-scale fixed-bed reactor at different switch intervals.

The impact of flow reversal on the instantaneous $CO_2$ selectivity and $CH_4$ conversion is shown in FIGS. 13(a) and 13(b) for different switch intervals, within the simulated range of NiO conversion of 10-80%. By periodically switching the flow direction between the inlet and the exit during the same reduction cycle according to the present disclosure, fuel will be in contact with more unconverted NiO upon entering the reactor, which will lead to less carbon formation and higher $CO_2$ selectivity.

In all cases, the reverse-flow reactor achieves a higher $CO_2$ selectivity than the one-directional reactor (FIG. 13(a)). Operating at longer switch intervals (or fewer switches), limits the efficiency of the reverse-flow reactor, because the bed is appreciably converted (~25%) by the fuel, prior to the first flow reversal. Hence, a sharp rise in the $CO_2$ profile is exhibited when the gas direction is reversed and the fuel contacts the fresh oxygen carrier. More frequently reversing the flow can enhance the uniformity of the conversion profile inside the bed, thus producing an overall higher $CO_2$ selectivity (FIG. 13(a)). In regards to $CH_4$ conversion (FIG. 13(b)), both reactors exhibit no observable initial $CH_4$ slip at the beginning of reduction, due to the presence of metallic Ni, which activates the $CH_4$ conversion reactions [14, 74, 75]. The reverse-flow reactor achieves always higher fuel conversions (FIG. 13(b)). The steep drops and jumps shown in FIG. 13(a) and FIG. 13(b) are the result of instantly pushing the gaseous contents to the opposite direction of the reactor when the flow is reversed. They correspond to practically negligible fuel slip, with no impact on the process under consideration.

From the analysis of FIGS. 13(a) and 13(b), the optimal flow reversal scheme for the adiabatic bench-scale reactor corresponds to a switch interval of ~15 s, which can achieve $CO_2$ selectivity >90%, at higher NiO conversion, with the fewest number of total switches. The utilization of the oxygen carrier is substantially increased in the reverse-flow process.

For instance, the reduction cycle under one-directional flow must be terminated when the bed is ~20% converted to maintain 90% real time reduction $CO_2$ selectivity. To operate at the same selectivity in the reverse-flow reactor, with a 15 s switch interval, reduction can be continued until the bed is ~40% converted. These selectivity values refer to the instantaneous $CO_2$ selectivities, while time-averaged $CO_2$ selectivities for the entire reduction cycle are much higher. This is a significant improvement, addressing specifically one of the major bottlenecks of current CLC fixed-bed reactors. It also offers advantages in terms of mitigating carbon formation in the reactor.

Figures 14A, 14B:
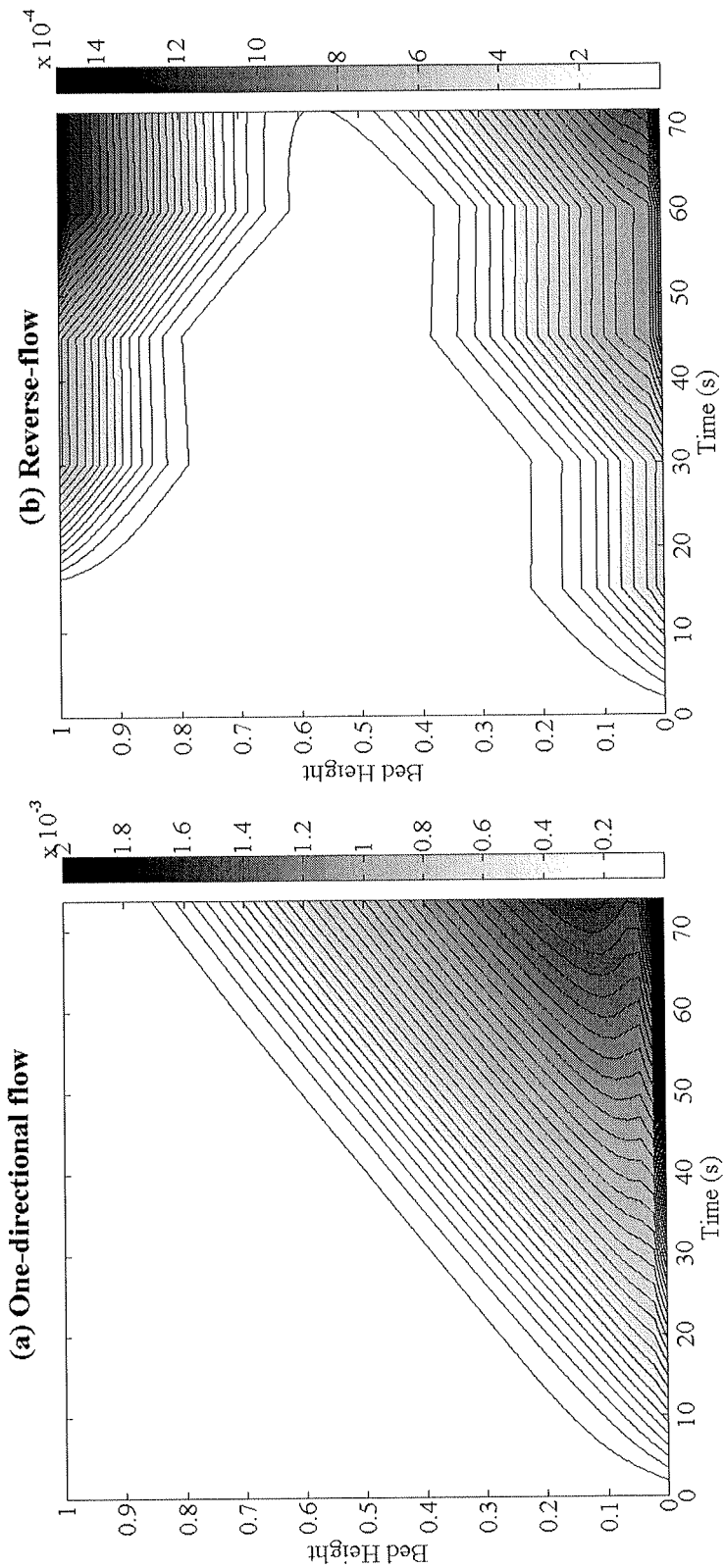
FIGS. 14(a) and (b) are plots showing the amount of carbon deposited (kg C/kg OC) during reduction for an exemplary bench-scale fixed-bed reactor without flow reversal (FIG. 14(a)) and with flow reversal (FIG. 14(b)).
Figure 15:
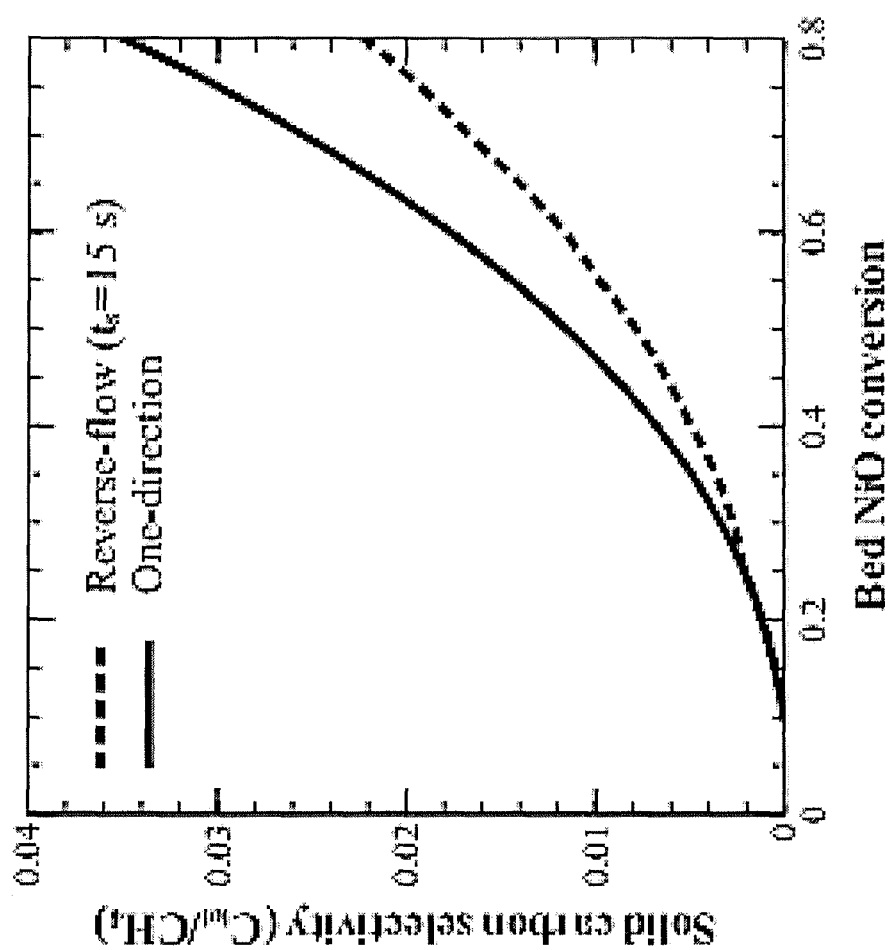
FIG. 15 is a plot showing the selectivity to solid carbon for an exemplary bench-scale fixed-bed reactor for normal flow and reverse flow implementations.

The extent of carbon formation is studied for an exemplary bench-scale reactor by evaluating the amount of solid carbon deposited in the bed and the efficiency of the total $CO_2$ capture ($\eta_{CO_2}$) of the process. Solid carbon deposits on the reduced surfaces that are devoid of oxygen sources. This phenomenon occurs at the inlet of the one-directional reactor and at both ends of the reverse-flow reactor (FIGS. 14(a) and 14(b)). Due to the improvement in fuel contacting patterns, the reverse-flow reactor achieves superior selectivity to solid carbon for all practical oxygen carrier conversions (FIG. 15).

This effect is strongly correlated with the cycle-averaged $CO_2$ capture efficiency of the process given in Eq. (1). The $CO_2$ capture efficiency $\eta_{CO_2}$ is different from the $CO_2$ selectivity: the former is the time-integral of the moles of $CO_2$ captured per moles of $CH_4$ fed into the system, while the latter is the instantaneous ratio of $CO_2$ per $CH_4$ fed. These two metrics provide an integrated understanding of the overall reactor performance. Table 8 presents the $\eta_{CO_2}$ values calculated at different times to meet a range of oxygen carrier conversions. For all the listed conversions, the $CO_2$ capture efficiency is higher in the reverse-flow reactor. Comparison of these results to a circulating fluidized-bed unit, which can achieve 94% $CO_2$ gas yield with negligible carbon build-up and a solid conversion of 0.6 [87], shows that a reverse-flow reactor according to the present disclosure is a potentially beneficial alternative to the commonly employed fluidized-bed processes. Moreover, the $CO_2$ capture efficiency shown in Table 8 is likely sub-optimal. The observed benefits of the reverse-flow process can be further improved by optimization of the reactor dimensions.

TABLE 8

$CO_2$ capture efficiency ($\eta_{CO_2}$) for various NiO conversions for the adiabatic bench-scale fixed-bed reactor under one-directional flow and reverse-flow with 15 s switch interval.

| NiO conversion | One-directional | Reverse-flow |
| --- | --- | --- |
| 20% | 95.1% | 95.1% |
| 30% | 93.5% | 94.2% |
| 40% | 91.1% | 93.3% |
| 50% | 88.6% | 91.7% |
| 60% | 85.8% | 90.0% |
| 70% | 82.8% | 87.5% |
| 80% | 79.3% | 85.2% |

As demonstrated, flow reversal allows for better utilization of the available oxygen sources in the bed. This effect is also evidenced in the temperature profiles. As most of the NiO—$CH_4$ reduction reactions are endothermic, the formation of cold spots inside the reactor always coincides with the conversion front (FIGS. 16(a) and 16(b)). The largest temperature drop for the one-directional reactor appears at the inlet (FIG. 16(a)) and for the reverse-flow reactor at both ends (FIG. 16(b)). Better heat utilization is achieved by reversing the fuel direction, whereby a larger volume of the bed can be used to provide conductive heat for the reduction reactions. This results in milder cold spots and faster conversion rates under the reverse-flow process. Approximately, a 25° C. improvement in the maximum temperature drop is achieved with the reverse-flow concept at the bench-scale (FIG. 17). The non-uniformities in the maximum temperature drop shown in FIG. 17 are due to the periodic flow reversal, which causes the position of the cold spot to vary from inlet to exit. The non-symmetrical temperature profiles in the reverse-flow reactor (FIG. 16(b)) are due to the temperature profile inherited by the previous oxidation cycle, in which exothermic Ni oxidation was highest at the reactor exit.

10. Additional Results for Exemplary Industrial-Scale Implementation

The reverse-flow concept is also demonstrated for a commercially realistic industrial-scale adiabatic fixed-bed reactor. To establish a basis for a realistic reactor size, a fixed-bed design previously investigated as part of an integrated IG-CLC plant by Hamers et al. (2014) is used [15]. A lower L/D ratio than the bench-scale reactor is used, which permits the process to operate at an increased fuel flow, lower pressure drop, and reduced number of total reactors needed to meet the same desired flow. The oxygen carrier for the small-scale reactor of Table 5 is modified to a particle size of 3.0 mm, consistent with the studies by Hamers et al. (2013) and Spallina et al. (2013) [7, 13]. While large particles limits the pressure drop, their utilization imposes intraparticle mass transport limitations which can disfavor product selectivity and conversion [36, 37]. Even so, these effects are adequately captured by the dusty-gas model used here (Appendix A).

The fuel gas flow rate is then calculated to match the Froude number of the bench-scale reactor (Table 4). The gas flows for the oxidation, heat removal, and purge steps are higher than the reducing flow according to the volumetric ratios of the bench-scale reactor. Following this rationale and procedure, the reactor size and operating conditions for the industrial-scale reactor are calculated as shown in Table 9. As each tube provides about 14 MWt of power, 30-50 tubes in an insulated vessel would be needed to meet the demands for large-scale operation. It should be noted that the strategy of reactor design (both for bench- and industrial-scale systems) is aimed at showcasing the advantages of reversing the flow in CLC reduction. These systems can be further optimized by studying different cycle strategies, oxygen carriers, particle sizes, and different geometries.

TABLE 9

Design and operating conditions for an exemplary industrial-scale fixed-bed reactor.

| Design | |
|---|---|
| L [m] | 6 |
| D [m] | 1.5 |
| ΔP [bar] | 2.0 |
| $d_p$ [mm] | 3.0 |
| Reduction | |
| Q (L min$^{-1}$) | 24,000 |
| Inlet $x_i$ | $CH_4$: 1 |
| Inlet T [° C.] | 700 |
| Purge | |
| Q (L min$^{-1}$) | 240,000 |
| Inlet $x_i$ | $N_2$: 1 |
| Inlet T [° C.] | 700 |
| Oxidation/Heat removal | |
| Q (L min$^{-1}$) | 960,000 |
| Inlet $x_i$ | $O_2$: 0.06, $N_2$: 0.94 |
| Inet T [° C.] | 700 |

During the reduction cycle, the effect of switching frequency on $CO_2$ selectivity and $CH_4$ conversion was analyzed in a fashion similar to that described for the adiabatic bench-scale reactor. Longer switch intervals can be used for the industrial-scale reactor in order to reach high $CO_2$ selectivities, because of the slower reaction rates. The optimal switch interval, providing $CO_2$ selectivity >90% over a range of oxygen carrier conversions, was estimated at ~40 s.

Figures 18A, 18B:
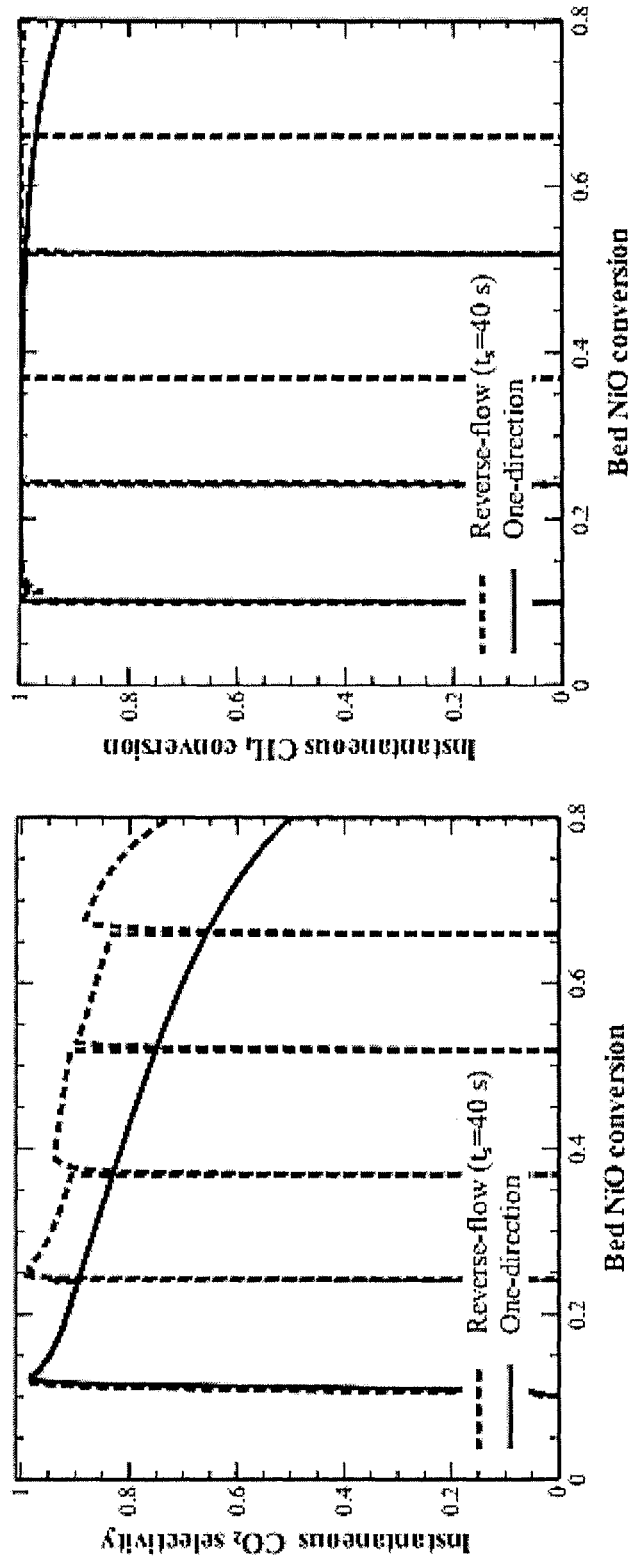
FIGS. 18(a) and 18(b) are plots showing the effect of flow reversal on $CO_2$ selectivity and $CH_4$ conversion during reduction for an exemplary industrial-scale fixed-bed reactor.
Figures 19A, 19B:
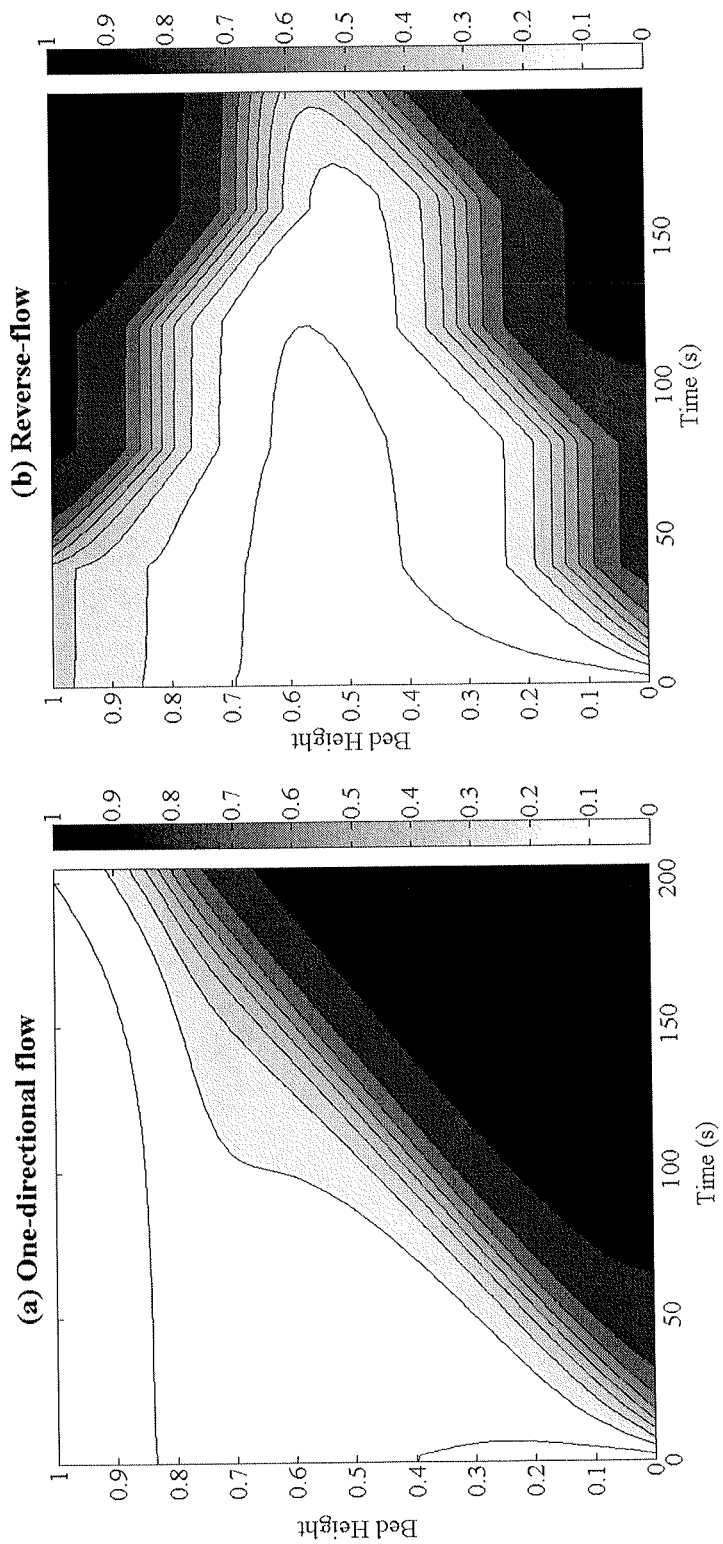
FIGS. 19(a) and 19(b) are plots showing NiO conversion profiles during reduction for an exemplary industrial-scale fixed-bed reactor without flow reversal (FIG. 19(a)) and with flow reversal (FIG. 19(b)).

FIGS. 18(a) and 18(b) present the results of the optimal industrial-scale reverse-flow operation in comparison to the one-directional flow system. The reverse-flow reactor achieves higher $CO_2$ selectivity for any NiO conversion below 80%, with the improvement being more profound in the range of conversions from 50% to 80% (FIG. 18(a)). The high $CO_2$ selectivity can be sustained for higher NiO conversions in the reverse-flow reactor. Assuming a 90% $CO_2$ selectivity as the benchmark, the one-directional flow reactor can operate until only 20% of the bed is reduced, whereas at optimal reverse-flow operation, the bed can be progressively reduced up to 50%. There is some improvement in the $CH_4$ conversion due to flow-reversal at oxygen carrier conversions above 60% (FIG. 18(b)). The oxygen carrier conversion in the bed (FIGS. 19(a) and 19(b)) exhibits similar patterns as the bench-scale case (FIGS. 12(a) and 12(b)), with the only difference being that complete conversion occurs later. Again, a large-scale reverse-flow reactor can be designed optimally for CLC, focusing on maximizing $CO_2$ selectivity and bed utilization.

Figures 20A, 20B:
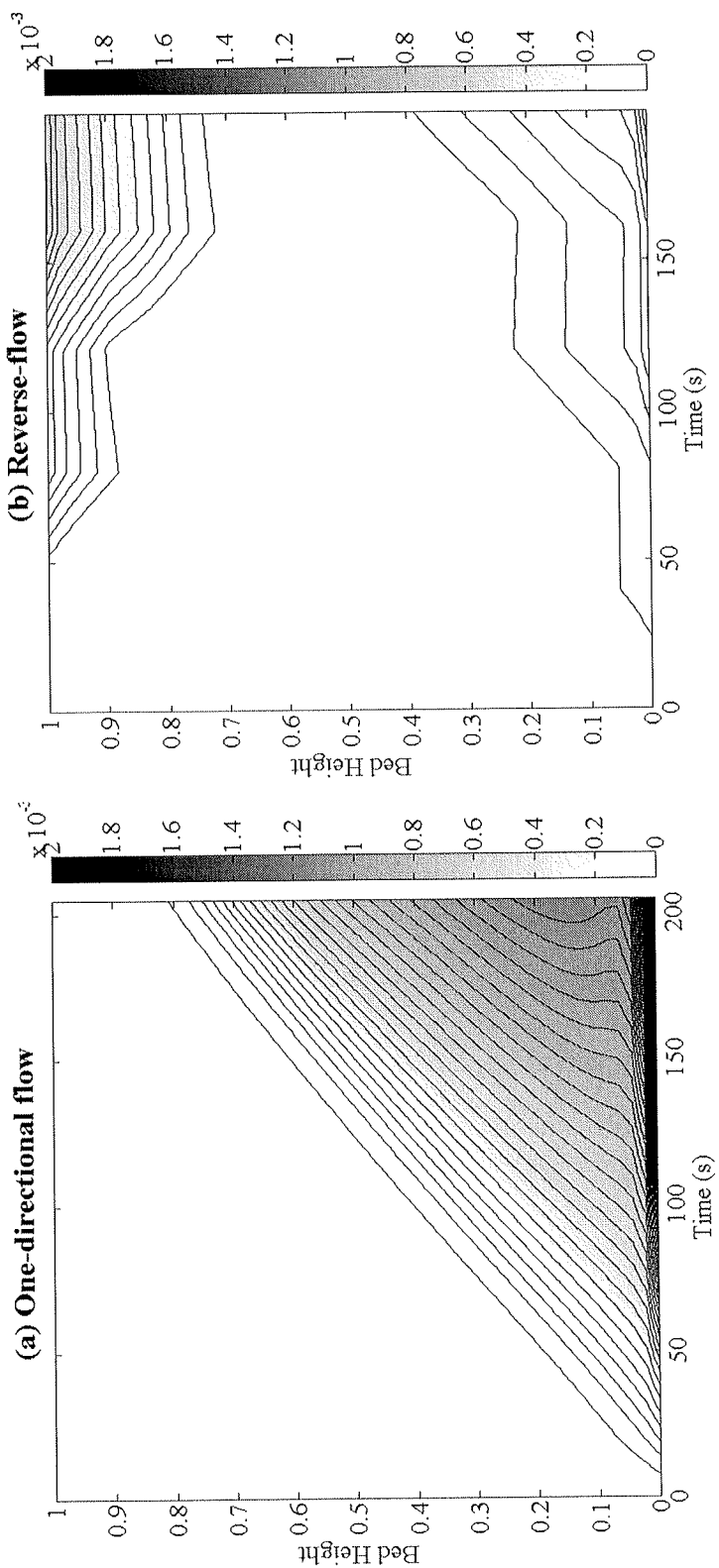
FIGS. 20(a) and 20(b) are plots showing the amount of carbon deposited (kg C/kg OC) as a function of reduction time and normalized bed height for an exemplary industrial-scale fixed-bed reactor without flow reversal (FIG. 20(a)) and with flow reversal (FIG. 21(b)).
Figure 21:
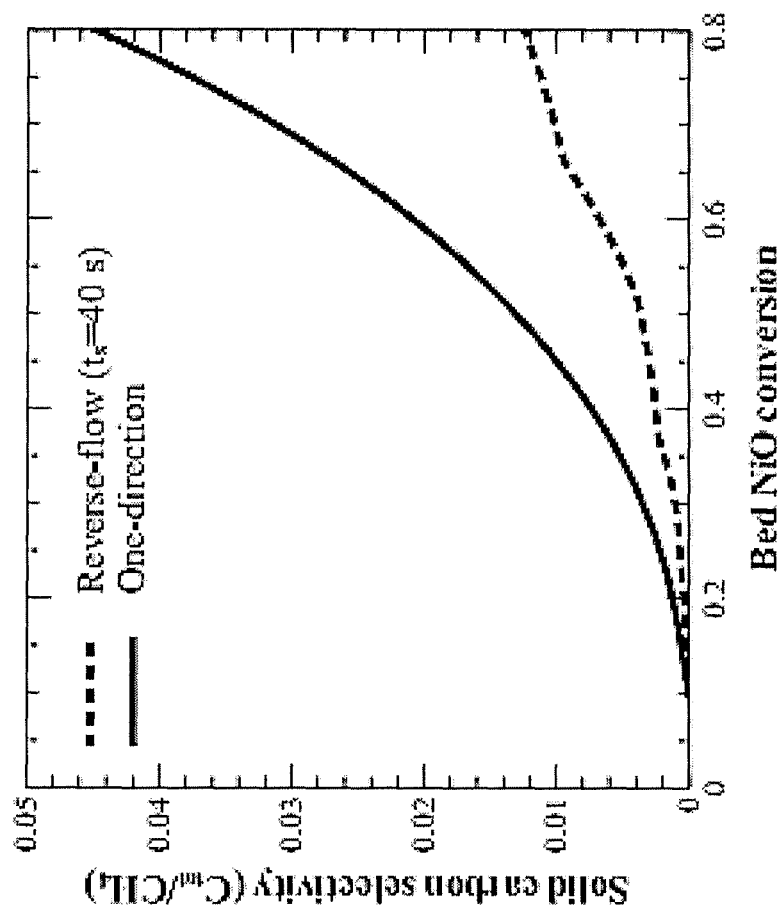
FIG. 21 shows selectivity to solid carbon for an exemplary industrial-scale fixed-bed reactor with flow reversal according to the present disclosure and with normal flow.

The $CO_2$ capture efficiency of the industrial-scale reactor depends on the amount of carbon deposited during reduction. As shown in FIGS. 20(a) and 20(b), the location of the highest carbon deposition in the fixed-bed is at the first point of contact between fuel and oxygen carrier. The reverse-flow reactor has less accumulated solid carbon (FIG. 20(b)), because of the better utilization of the oxygen carrier, as discussed previously. In total, the selectivity to solid carbon is lower in the reverse-flow reactor (FIG. 21). Another advantage of reversing the flow is the prevention of excess carbon build-up at the one end, which can eventually clog the reactor.

The improvement in $CO_2$ capture efficiency (Table 10) yields equally promising results compared to the adiabatic bench-scale reactor (Table 8). For all oxygen carrier conversions, $\eta_{CO_2}$ is higher in the reverse-flow reactor and the difference becomes noticeably larger at higher oxygen carrier conversions. Practically, the oxygen carrier utilization can be improved by 60% with the reverse-flow process operating at ~90% $CO_2$ capture efficiency.

TABLE 10

$CO_2$ capture efficiency ($\eta_{CO_2}$) for various NiO conversions for the adiabatic bench-scale fixed-bed reactor under one-directional flow and reverse-flow with 40 s switch interval.

| NiO conversion | One-directional | Reverse-flow |
|---|---|---|
| 20% | 95.0% | 95.0% |
| 30% | 93.7% | 94.1% |
| 40% | 91.6% | 93.2% |
| 50% | 89.1% | 92.9% |
| 60% | 86.4% | 91.1% |
| 70% | 83.2% | 88.8% |
| 80% | 79.3% | 87.8% |

Figures 16A, 16B:
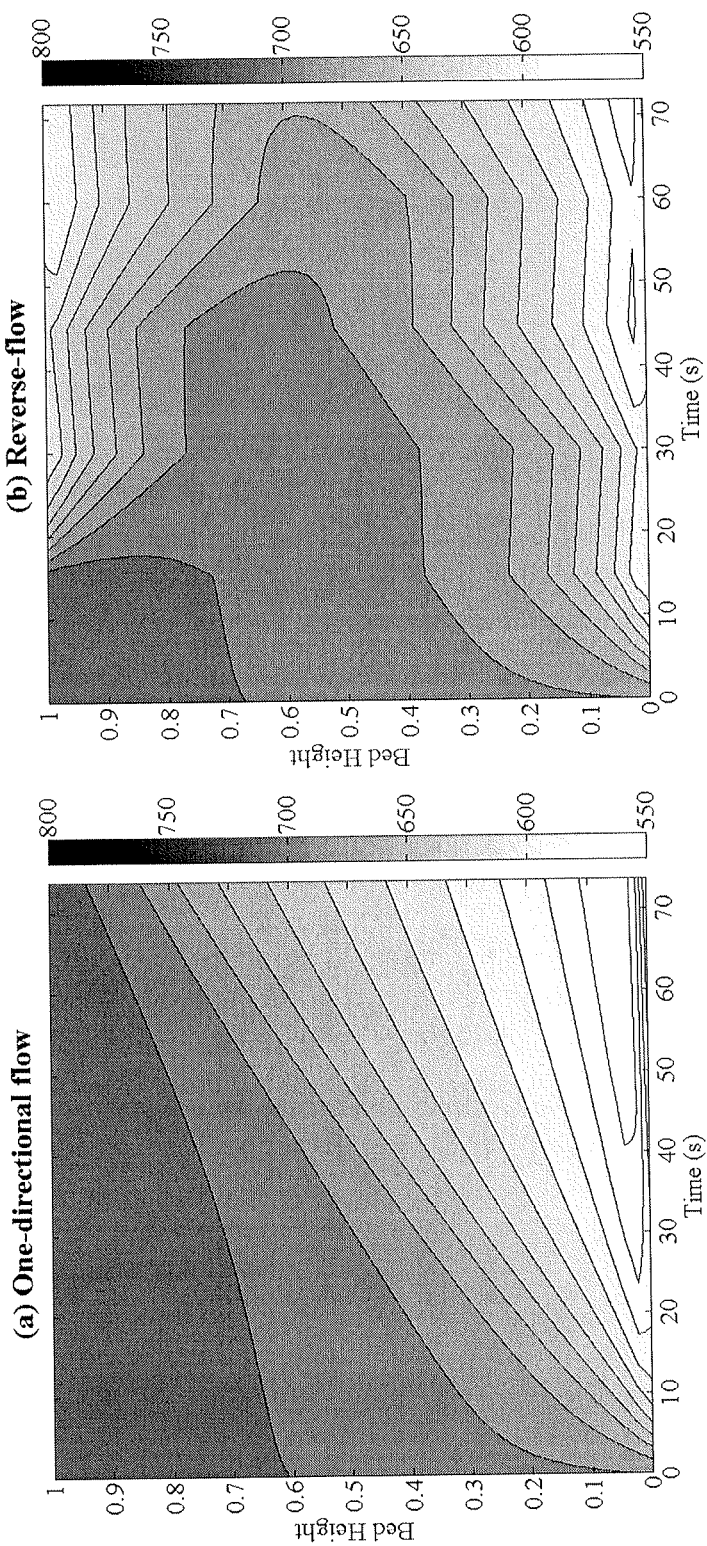
FIGS. 16(a) and 16(b) are plots showing temperature profiles during reduction for an exemplary bench-scale fixed-bed reactor without flow reversal (FIG. 16(a)) and with flow reversal (FIG. 16(b)).
Figure 17:
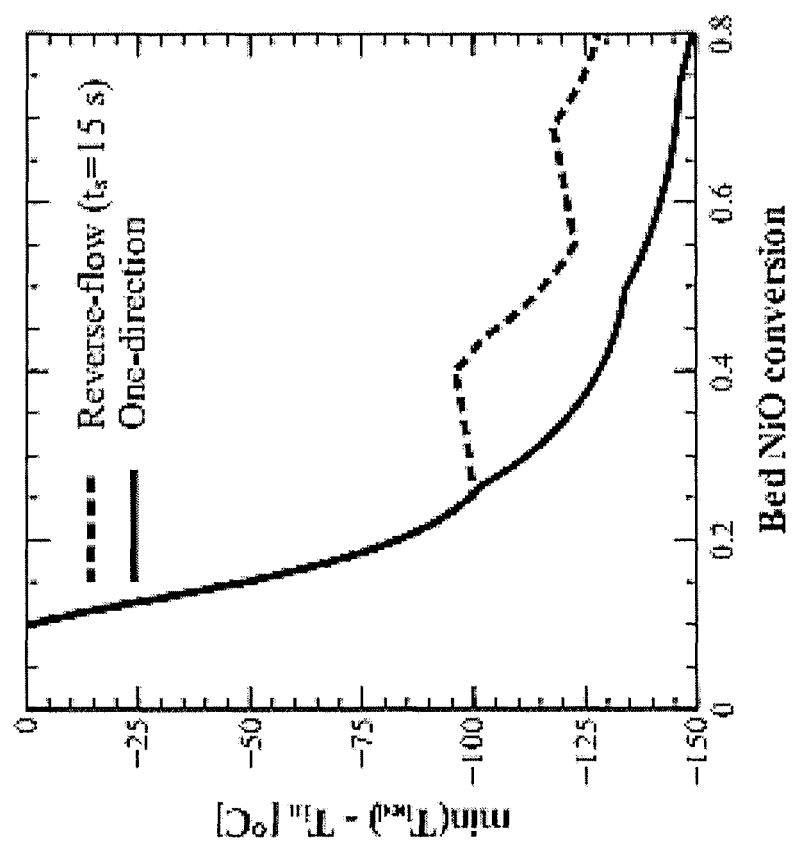
FIG. 17 is a plot showing a maximum temperature drop inside the reactor for an exemplary bench-scale fixed-bed reactor with flow reversal according to the present disclosure and with normal flow.
Figures 22A, 22B:
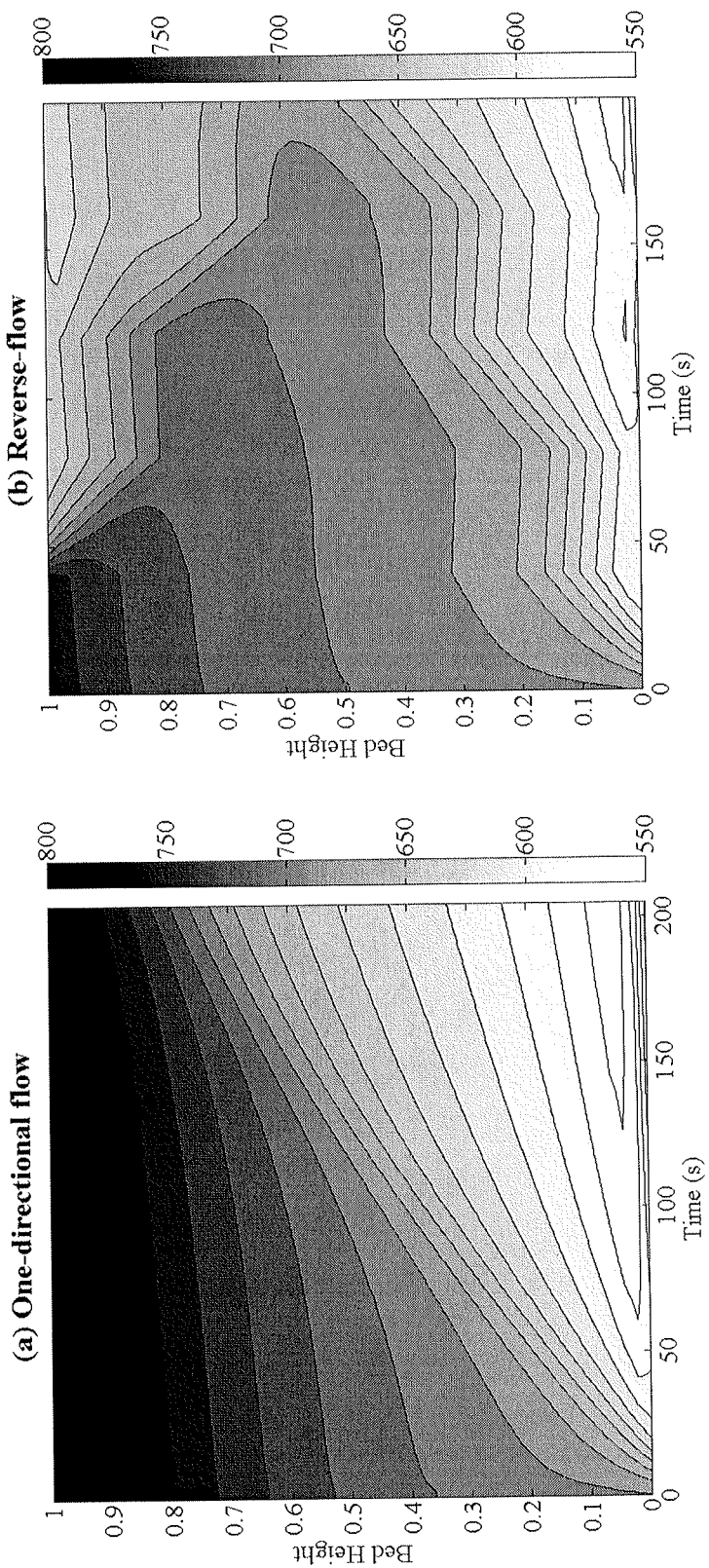
FIGS. 22(a) and 22(b) are plots showing temperature profiles during reduction for an exemplary industrial-scale fixed-bed reactor without flow reversal (FIG. 22(a)) and with flow reversal (FIG. 22(b)).
Figure 23:
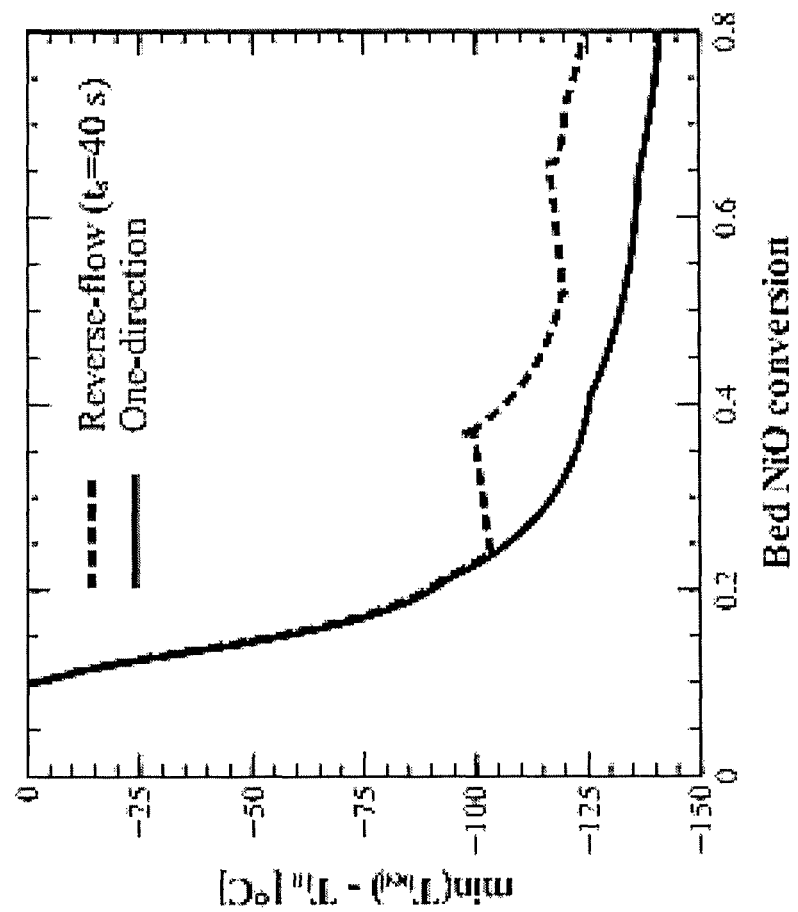
FIG. 23 is a plot showing maximum temperature drop inside an exemplary industrial-scale fixed-bed reactor with flow reversal according to the present disclosure and with normal flow.

The temperature profile inside the industrial-scale reactor (FIGS. 22(a) and 22(b)) is similar to that of the adiabatic bench-scale reactor (FIGS. 16(a) and 16(b)), despite the longer timescales for complete NiO conversion. A more uniform temperature profile can be achieved by reversing the fuel direction. The maximum temperature drop along the bed is reduced by 25° C. with the reverse-flow process (FIG. 23). By lowering the intensity of the cold spots during reduction, the reverse-flow operation improves the thermal management of the CLC reactor.

In this analysis, the advantages seen previously in the bench-scale reactor can also be obtained with this scaled-up system and particles. The main advantage of the reverse-flow process according to the present disclosure over a conventional fixed-bed reactor is the improved $CO_2$ capture efficiency and greater oxygen carrier utilization. The reverse-flow fixed-bed CLC reactor shows great potential for utilization of highly active materials in such a manner that capitalizes on the reactivity of the material while eliminating the attrition and gas/solid separation requirements of circulating systems.

11. Market and Industry Factors/Considerations

The systems and methods of the present disclosure address significant market and industry needs. For example, hydrogen generated according to the disclosed systems and methods has significant industrial applications, including (i) in the food industry to hydrogenate liquid oils, (ii) in the chemical industry, e.g., to manufacture ammonia and methanol, (iii) to hydrogenate inedible oils for soaps, insulation, plastics, ointments and other specialty, (iv) in the electronics industry in the production of semiconductor circuits, (v) in power generation as a heat-transfer medium to cool high-speed turbine generators, and (vi) as a fuel to power spacecraft, in space exploration and to fill weather balloons. For example, petrochemical refining has traditionally used on-site hydrogen generation equipment, often from natural gas. Trends show that purchase of supplier-generated gases is increasing. Moreover, the systems and methods of the present disclosure provide less expensive and/or more efficient approaches to generation of desired end products, e.g., hydrogen, while simultaneously reducing the $CO_2$ emissions and generating heat/power.

More generally, the systems and methods of the present disclosure have significant application in various industries and processes, e.g., in the power industry. Exemplary applications include combustion and/or gasification of carbon-based material, such as coal, natural gas, petroleum coke, and biomass, directly or indirectly for steam, syngas, hydrogen, chemicals, electricity and liquid fuels production. In view of industry needs and practices, the disclosed systems and methods may be used to address both large scale, centralized needs and small-scale point of use generation needs.

Although the systems and methods of the present disclosure have been described with reference to preferred and/or exemplary embodiments, it will be understood by those skilled in the art that various changes may be made and equivalents may be substituted for the elements thereof without departing from the spirit and/or scope of the invention. In addition, many modifications may be made to adapt the teaching of the invention to particular use, application, manufacturing conditions, use conditions, composition, medium, size, and/or materials without departing from the essential spirit and/or scope of the invention. Therefore, it is intended that the invention not be limited to the particular embodiments and best mode contemplated for carrying out this invention as described herein.

For example, among the starting materials for the systems and methods disclosed herein is syngas, or synthesis gas, which is a fuel gas mixture consisting primarily of hydrogen, carbon monoxide, and very often some carbon dioxide. The name comes from its use as intermediates in creating synthetic natural gas (SNG) and for producing ammonia or methanol. Syngas is combustible and often used as a fuel of internal combustion engines. It has less than half the energy density of natural gas.

In further embodiments of the system/reactor designs disclosed herein, a multiplicity of inlet/outlet ports may be provided to allow fuel or other gases to be introduced to or out-gassed from multiple locations to provide advantageous and/or desirable operations and/or results, e.g., more effective mixing of gases with reactor bed materials and more uniform temperatures throughout the reactor. Alternative designs may also be implemented that include one or more ports, connections, tubing, vessels and control and sensor mechanisms to carry out the disclosed processes and/or methods. In other embodiments, one or more of fuel gases and other gases as appropriate may be introduced into the reactor in a pulsed manner rather than in a continuous flow.

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and words of a similar nature in the context of describing the improvements disclosed herein (especially in the context of the following claims) are to be construed to cover both the singular and the plural, unless otherwise indicated herein or clearly contradicted by context. Further, it should further be noted that the terms "first," "second," and the like herein do not denote any order, quantity, or relative importance, but rather are used to distinguish one element from another. The modifier "about" used in connection with a quantity is inclusive of the stated value and has the meaning dictated by the context (e.g., it includes, at a minimum the degree of error associated with measurement of the particular quantity).

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed.

Chemical compounds are described using standard nomenclature. Unless defined otherwise, all technical and scientific terms used herein have the same meaning as is commonly understood by one of skill in the art to which this invention belongs. Structures and formulas include all sub-formulae thereof. For example, chemical formulas and compound structures include acceptable salts, hydrates, and isomers thereof.

Additional modifications, enhancements, refinements and variations may be implemented, as will be apparent to persons skilled in the art, and such modifications, enhancements, refinements and variations are encompassed within the scope of the present disclosure.

APPENDIX A

| Dusty gas fixed-bed reactor model | |
|---|---|
| Solid phase | |
| Mass balance: | $\frac{\partial(\varepsilon_c C_{j,c})}{\partial t} + \frac{1}{r_c^2}\frac{\partial}{\partial r_c}(r_c^2 J_j) = \rho_p \Sigma R_{j,c}$ (.0) |
| | $\frac{\partial(C_{i,c})}{\partial t} = \rho_p \Sigma R_{i,c}$ (.0) |
| Energy balance: | $((1-\varepsilon_c)\rho_p \Sigma C p_{s,i} C_{i,c}/M_i + \varepsilon_c C p_c C_{g,c})\frac{\partial T_c}{\partial t} =$ (.0) |
| | $\frac{1}{r_c^2}\frac{\partial}{\partial r}\left(r_c^2 \lambda_s \frac{\partial T_c}{\partial r_c}\right) + \rho_p \Sigma(-\Delta H_{q,c})(R_{q,c})$ |

Dusty gas fixed-bed reactor model

Diffusion flux:
$$-\frac{\partial C_{j,c}}{\partial r_c} = \sum_{k=1}^{N} \frac{1}{D_{jk}^e}(y_k J_j - y_j J_k) + \frac{J_j}{D_{jK}^e}$$
(.0)

Boundary conditions:
$$J_j|_{r_c=r_p} = k_{c,j}(C_{j,c}|_{r_c=r_p} - C_j); \; J_j|_{r_c=0} = 0$$
(.0)

$$-\lambda_s\left(\frac{\partial T_c}{\partial r_c}\right)\bigg|_{r_c=r_p} = h_f(T_c|_{r_c=r_p} - T); \; \frac{\partial T_c}{\partial r_c}\bigg|_{r_c=0} = 0$$
(.0)

Bulk phase

Mass balance:
$$\frac{\partial(\varepsilon_b C_j)}{\partial t} + \frac{\partial(uC_j)}{\partial z} = \varepsilon_b \frac{\partial}{\partial z}\left(D_{ax,j}\frac{\partial C_j}{\partial z}\right) + k_{c,j}a_v(C_{j,c}|_{r_c=r_p} - C_j)$$
(.0)

Energy balance:
$$\frac{\partial(\varepsilon_b Cp_g C_g T)}{\partial t} + \frac{\partial(C_g Cp_g uT)}{\partial z} = \varepsilon_b \frac{\partial}{\partial z}\left(\lambda_{ax}\frac{\partial T}{\partial z}\right) + h_f a_v(T_c|_{r_c=r_p} - T)$$
(.0)

Momentum balance:
$$\frac{dP}{dz} = -\left(\frac{1-\varepsilon_b}{\varepsilon_b^3}\right)\left(\frac{\rho u_0^2}{d_p}\right)\left(\frac{150}{Re_p} + 1.75\right)$$
(.0)

Boundary conditions:
$$\varepsilon_b D_{ax,j}\frac{\partial C_i}{\partial z}\bigg|_{z=0} = [u(C_j - C_{j,in})]|_{z=0}; \; \frac{\partial C_j}{\partial z}\bigg|_{z=H} = 0$$
(.0)

$$\varepsilon_g \lambda_{ax}\frac{\partial T}{\partial z}\bigg|_{z=0} = [(uC_g Cp_g)(T-T_{in})]|_{z=0}; \; \frac{\partial T}{\partial z}\bigg|_{z=H} = 0$$
(.0)

$$P|_{z=H} = P_{out}$$
(.0)

In reverse-flow operation, the gas velocity, U, changes in sign for every $t_s$ seconds, with $t_s$ being the switch time, or time interval between subsequent switches of the flow direction. When the flow is entering at z=0, the gas velocity is defined as a positive number, and when flow is entering at z=L, it is defined as a negative number. The changes in velocity due to dynamic flow reversal are shown in Eqs. (0.0)-(0.0), where n is the number of switches [88]. To differentiate the gas velocities, U refers to the reverse-flow process, while u refers to the one-directional process.

$$U(t) = \kappa(t)u,$$
(.0)

$$\kappa(t) = \begin{cases} 1, & t \in [(n-1)t_s, (n-1/2)t_s] \\ -1, & t \in [(n-1/2)t_s, nt_s] \end{cases}$$
(.0)

The boundary conditions in the revere-flow operation are:

$$\varepsilon_b D_{ax,i}\frac{\partial C_i}{\partial z} = \begin{cases} \frac{1+\kappa(t)}{2}u(C_i - C_{i,in}), & z=0 \\ -\frac{1-\kappa(t)}{2}u(C_i - C_{i,in}), & z=L \end{cases}$$
(.0)

$$\varepsilon_b \lambda_{ax}\frac{\partial T}{\partial z} = \begin{cases} \frac{1+\kappa(t)}{2}u(T - T_{in})C_T Cp_f, & z=0 \\ -\frac{1-\kappa(t)}{2}u(T - T_{in})C_T Cp_f, & z=L \end{cases}$$
(.0)

APPENDIX B

Fluidized-bed reactor model

Mass balance

Bubble:
$$(\delta + \alpha\delta\varepsilon_{mf})\frac{\partial C_{j,b}}{\partial t} + \frac{\partial(u_b(\delta + \alpha\delta\varepsilon_{mf})C_{j,b})}{\partial z} =$$
$$K_{j,be}(C_{j,e} - C_{j,b})(\delta + \alpha\delta\varepsilon_{mf}) +$$
$$(\lambda_1 C_{j,b} + \lambda_2 C_{j,e})\frac{\partial(u_b(\delta + \alpha\delta\varepsilon_{mf}))}{\partial z} + R_{j,b}(C_{j,b})\rho_p\alpha\delta(1-\varepsilon_{mf})$$
(B.0)

$$\alpha\delta(1-\varepsilon_{mf})\rho_p\frac{\partial C_{i,w}}{\partial t} + \frac{\partial(u_b\alpha\delta(1-\varepsilon_{mf})\rho_p C_{i,w})}{\partial z} =$$
$$K_{i,we}(C_{i,e} - C_{i,w})\rho_p\alpha\delta(1-\varepsilon_{mf}) +$$
$$(\lambda_1 C_{i,w} + \lambda_2 C_{i,e})\frac{\partial(u_b\alpha\delta(1-\varepsilon_{mf})\rho_p)}{\partial z} + R_{i,w}M_i\rho_p\alpha\delta(1-\varepsilon_{mf})$$
(B.0)

Emulsion:
$$(1-\delta-\alpha\delta)\varepsilon_{mf}\frac{\partial C_{j,e}}{\partial t} + \frac{\partial(u_e(1-\delta-\alpha\delta)\varepsilon_{mf}C_{j,e})}{\partial z} =$$
$$K_{j,eb}(C_{j,b} - C_{j,e})(1-\delta-\alpha\delta)\varepsilon_{mf} -$$
$$(\lambda_1 C_{j,b} + \lambda_2 C_{j,e})\frac{\partial(u_b(\delta + \alpha\delta\varepsilon_{mf}))}{\partial z} +$$
$$R_{j,e}(C_{j,e})\rho_p(1-\delta-\alpha\delta)(1-\varepsilon_{mf})$$
(B.0)

$$(1-\delta-\alpha\delta)(1-\varepsilon_{mf})\rho_p\frac{\partial C_{i,e}}{\partial t} +$$
$$\frac{\partial(u_s(1-\delta-\alpha\delta)(1-\varepsilon_{mf})\rho_p C_{i,e})}{\partial z} =$$
$$K_{i,ew}(C_{i,w} - C_{i,e})(1-\delta-\alpha\delta)(1-\varepsilon_{mf})\rho_p -$$
$$(\lambda_1 C_{i,w} + \lambda_2 C_{i,e})\frac{\partial(u_b\alpha\delta(1-\varepsilon_{mf})\rho_p)}{\partial z} +$$
$$R_{i,w}M_i\rho_p(1-\delta-\alpha\delta)(1-\varepsilon_{mf})$$
(B.0)

Energy balance

Bubble:
$$((\delta + \alpha\delta\varepsilon_{mf})Cp_b C_{g,b} +$$
$$\alpha\delta(1-\varepsilon_{mf})\rho_p \Sigma Cp_{i,w}C_{i,w}/M_i)\frac{\partial T_b}{\partial t} +$$
$$((\delta + \alpha\delta\varepsilon_{mf})C_{g,b}Cp_b u_b +$$
$$\alpha\delta(1-\varepsilon_{mf})u_b\rho_p \Sigma Cp_{i,w}C_{i,w}/M_i)\frac{\partial T_b}{\partial z} =$$
$$(\delta + \alpha\delta\varepsilon_{mf})H_{be}(T_e - T_b) +$$
$$\alpha\delta(1-\varepsilon_{mf})\Sigma(-\Delta H_{q,b})(-R_{q,b})\rho_p +$$
$$(\lambda_1 T_b Cp_b C_{g,b} + \lambda_2 T_e Cp_e C_{g,e} +$$
$$\Sigma(\lambda_1 T_b Cp_{i,w}C_{i,w}/M_i + \lambda_2 T_e Cp_{i,e}C_{i,e}/M_i)) \times$$
$$\frac{\partial}{\partial z}(u_b(\delta + \alpha\delta\varepsilon_{mf}))$$
(B.0)

Emulsion:
$$\left((1-\delta-\alpha\delta)\varepsilon_{mf}Cp_e C_{g,e} +\right.$$
$$\left.\frac{\rho_p(1-\delta-\alpha\delta)(1-\varepsilon_{mf})\Sigma C_{i,e}Cp_{i,e}}{M_i}\right)\frac{\partial T_e}{\partial t} +$$
$$\left((1-\delta-\alpha\delta)\varepsilon_{mf}C_{g,e}Cp_e u_e +\right.$$
$$\left.\frac{\rho_p(1-\delta-\alpha\delta)(1-\varepsilon_{mf})u_s\Sigma C_{i,e}Cp_{i,e}}{M_i}\right)\frac{\partial T_e}{\partial z} =$$
$$(1-\delta-\alpha\delta)\varepsilon_{mf}H_{eb}(T_b - T_e) +$$
(B.0)

| Fluidized-bed reactor model |
|---|
| $(1-\delta-\alpha\delta)(1-\varepsilon_{mf})\Sigma(-\Delta H_{q,e})(-R_{q,e})\rho_p -$ |
| $\left(\lambda_1 T_b Cp_b C_{g,b} + \lambda_2 T_e Cp_e C_{g,e} + \right.$ |
| $\left.\Sigma\left(\lambda_1 T_b Cp_{i,w}\dfrac{C_{i,w}}{M_i} + \dfrac{\lambda_2 T_e Cp_{i,e} C_{i,e}}{M_i}\right)\right)\times$ |
| $\dfrac{\partial}{\partial z}(u_b(\delta+\alpha\delta\varepsilon_{mf}))$ |

Momentum balance $$-\frac{dP}{dz} = \frac{2f_s G_s^2}{D\rho_p(1-\varepsilon_{bed})} + (1-\varepsilon_{bed})\rho_p g + \varepsilon_{bed}\rho_g g \quad (B.0)$$

Boundary conditions

| | | |
|---|---|---|
| z = 0 | $C_{g,b} = C_{g,e} = C_{j,in}$; $T_b = T_e = T_{in}$; $C_{i,w} = C_{i,e}$ | (B.0) |
| z = H | $C_{i,e} = C_{i,w}$ | (B.0) |
| | $P = P_{out}$ | (B.0) |

REFERENCES

All documents cited herein and the following list of documents, all referenced publications cited therein, and the descriptions and information contained therein are expressly incorporated herein in their entirety to the same extent as if each document or cited publication was individually and expressly incorporated herein. However, if a term in the present application contradicts or conflicts with a term in an incorporated reference, the term from the present application takes precedence over the conflicting term from the incorporated reference.

References: The descriptions and information contained in the below documents are expressly incorporated herein in their entirety: Patent applications and publications of chemical-looping using fluidized-bed reactors are numerous. Only those pertaining to non-fluidized bed reactors are included in the list immediately below:

Rotating or Rotary Bed Reactors:

[1] S. F. Håkonsen, C. A. Grande, R. Blom, Rotating bed reactor for CLC: Bed characteristics dependencies on internal gas mixing, Appl. Energy. 113 (2014) 1952-1957.

[2] S. F. Håkonsen, R. Blom, Chemical looping combustion in a rotating bed reactor-Finding Optimal Process Conditions for Prototype Reactor, Environ. Sci. Technol. 45 (2011) 9619-26.

[3] F. Paviet, F. Chazarenc, M. Tazerout, Thermo Chemical Equilibrium Modelling of a Biomass Gasifying Process Using ASPEN PLUS, Int. J. of Chemical Reactor Engineering. 7 (2009) A40.

[4] Z. Zhao, T. Chen, A. Ghoniem, Rotary Bed Reactor for Chemical-Looping Combustion with Carbon Capture. Part 1: Reactor Design and Model Development, Energy & Fuels. 27 (2013) 327-343.

[5] Z. Zhao, T. Chen, A. Ghoniem, Rotary Bed Reactor for Chemical-Looping Combustion with Carbon Capture. Part 2: Base Case and Sensitivity Analysis, Energy & Fuels. 27 (2013) 344-359.

Moving Bed Reactors:

[7] Y. Ku, H.-C. Wu, P.-C. Chiu, Y.-H. Tseng, Y.-L. Kuo, Methane combustion by moving bed fuel reactor with $Fe_2O_3/Al_2O_3$ oxygen carriers, Appl. Energy. 113 (2014) 1909-1915.

[8] Q. Zhou, L. Zeng, L. S. Fan, Syngas Chemical Looping Process: Dynamic Modeling of a Moving-bed Reducer, AIChE J. 59 (2013) 3432-3443.

[9] D. Sridhar, A. Tong, H. Kim, L. Zeng, F. Li, L. S. Fan, Syngas Chemical Looping Process: Design and Construction of a 25 $kW_{th}$ Subpilot Unit, Energy & Fuels. 26 (2012) 2292-2302.

[10] F. Li, L. Zeng, L. G. Velazquez-Vargas, Z. Yoscovits, L. S. Fan, Syngas Chemical Looping Gasification Process: Bench-Scale Studies and Reactor Simulations, AIChE J. 56 (2010) 2186-2199.

Additional References: The descriptions and information contained in the below numbered documents are expressly incorporated herein in their entirety. The below references correspond to the numbered citations in the specification above. Inclusion of a reference in the below list is not intended to imply that such reference is deemed by the inventor or applicant to be "material" to the patentability of the compositions, methods, apparatuses and uses disclosed herein. The inventor and applicant reserve the right to determine at a later time which of the listed documents are of sufficient materiality to be disclosed in their entirety with an Information Disclosure Statement submitted at such time to the USPTO.

References

[1a] J. Adánez, A. Abad, F. Garcia-Labiano, P. Gayán, L. F. De Diego, Progress in chemical-looping combustion and reforming technologies, Prog. Energy Combust. Sci. 38 (2012) 215-282.

[2a] M. M. Hossain, H. I. de Lasa, Chemical-looping combustion (CLC) for inherent separations—a review, Chem. Eng. Sci. 63 (2008) 4433-4451.

[3a] M. E. Boot-Handford, J. C. Abanades, E. J. Anthony, M. J. Blunt, S. Brandani, N. Mac Dowell, et al., Carbon capture and storage update, Energy Environ. Sci. 7 (2014) 130.

[4a] T. D C, B. S M., Carbon dioxide capture for storage in deep geologic formationse-results from the $CO_2$ capture project, Vol 1-2, Elsevier, Oxkford, Uk, 2005.

[1] L.-S. Fan, Chemical Looping Systems for Fossil Energy Conversions, 2011.

[2] J. Wolf, M. Anheden, J. Yan, Comparison of nickel- and iron-based oxygen carriers in chemical looping combustion for $CO_2$ capture in power generation, Fuel. 84 (2005) 993-1006.

[3] J. Wolf, J. Yan, Parametric study of chemical looping combustion for tri-generation of hydrogen, heat, and electrical power with $CO_2$ capture, Int. J. Energy Res. 29 (2005) 739-753.

[4] M. Rydén, A. Lyngfelt, T. Mattisson, Chemical-looping combustion and chemical-looping reforming in a circulating fluidized-bed reactor using Ni-based oxygen carriers, Energy and Fuels. 22 (2008) 2585-2597.

[5] C. Linderholm, A. Abad, T. Mattisson, A. Lyngfelt, 160 h of chemical-looping combustion in a 10 kW reactor system with a NiO-based oxygen carrier, Int. J. Greenh. Gas Control. 2 (2008) 520-530.

[6] S. Noorman, M. van Sint Annaland, Packed Bed Reactor Technology for Chemical-Looping Combustion, Ind. Eng. Chem. Res. 46 (2007) 4212-4220.

[7] H. P. Hamers, F. Gallucci, P. D. Cobden, E. Kimball, M. van Sint Annaland, A novel reactor configuration for packed bed chemical-looping combustion of syngas, Int. J. Greenh. Gas Control. 16 (2013) 1-12.

[8] A. Lyngfelt, B. Leckner, T. Mattisson, A fluidized-bed combustion process with inherent $CO_2$ separation; application of chemical-looping combustion, Chem. Eng. Sci. 56 (2001) 3101-3113.

[9] J. Adánez, P. Gayán, J. Celaya, L. F. de Diego, F. Garcia-Labiano, A. Abad, Chemical Looping Combustion in a 10 kW th Prototype Using a $CuO/Al_2O_3$ Oxygen Carrier: Effect of Operating Conditions on Methane Combustion, Ind. Eng. Chem. Res. 45 (2006) 6075-6080.

[10] E. Jerndal, T. Mattisson, A. Lyngfelt, Investigation of Different $NiO/NiAl_2O_4$ Particles as Oxygen Carriers for Chemical-Looping Combustion, Energy & Fuels. 94 (2009) 665-676.

[11] S. Noorman, F. Gallucci, M. van Sint Annaland, J. A. M. Kuipers, A theoretical investigation of CLC in packed beds. Part 1: Particle model, Chem. Eng. J. 167 (2011) 297-307.

[12] S. Noorman, F. Gallucci, M. M. van Sint Annaland, J. a M. Kuipers, A theoretical investigation of CLC in packed beds. Part 2: Reactor model, Chem. Eng. J. 167 (2011) 369-376.

[13] V. Spallina, F. Gallucci, M. C. Romano, P. Chiesa, G. Lozza, M. Van Sint Annaland, Investigation of heat management for CLC of syngas in packed bed reactors, Chem. Eng. J. 225 (2013) 174-191.

[14] Z. Zhou, L. Han, G. M. Bollas, Overview of Chemical-Looping Reduction in Fixed Bed and Fluidized Bed Reactors Focused on Oxygen Carrier Utilization and Reactor Efficiency, Aerosol Air Qual. Res. 14 (2014) 559-571.

[15] H. P. Hamers, M. C. Romano, V. Spallina, P. Chiesa, F. Gallucci, M. V. S. Annaland, Comparison on process efficiency for CLC of syngas operated in packed bed and fluidized bed reactors, Int. J. Greenh. Gas Control. 28 (2014) 65-78.

[16] V. Spallina, M. C. Romano, P. Chiesa, F. Gallucci, M. van Sint Annaland, G. Lozza, Integration of coal gasification and packed bed CLC for high efficiency and near-zero emission power generation, Int. J. Greenh. Gas Control. 27 (2014) 28-41.

[26] A. Lyngfelt, M. Johansson, T. Mattisson, Chemical-Looping Combustion-Status of Development, in: 9th Int. Conf. Circ. Fluid. Beds, Hamburg, Germany, 2008.

[27] E. Johansson, T. Mattisson, A. Lyngfelt, H. Thunman, A 300 W laboratory reactor system for chemical-looping combustion with particle circulation, Fuel. 85 (2006) 1428-1438.

[28] H.-. J. Ryu, G. Jin, C. Yi, Demonstration of inherent $CO_2$ separation and no $NO_x$ emission in a 50 kW chemical-looping combustor: Continuous reduction and oxidation experiment, in: Conf. Greenh. Gas Control Technol., Vancouver, Canada, 2004.

[29] E. Johansson, T. Mattisson, A. Lyngfelt, H. Thunman, Combustion of syngas and natural gas in a 300 W chemical-looping combustor, Chem. Eng. Res. Des. 84 (2006) 819-827.

[30] A. Abad, T. Mattisson, A. Lyngfelt, M. Rydén, Chemical-looping combustion in a 300 W continuously operating reactor system using a manganese-based oxygen carrier, Fuel. 85 (2006) 1174-1185.

[31] A. Lyngfelt, Oxygen carriers for chemical looping combustion –4000 h of operational experience, Oil Gas Sci. Technol.—Rev. IFP Energies Nouv. 66 (2011) 161-172.

[32] F. Li, L.-S. Fan, Clean coal conversion processes—progress and challenges, Energy Environ. Sci. 1 (2008) 248.

[33] D. Sridhar, A. Tong, H. Kim, L. Zeng, F. Li, L. Fan, Syngas Chemical Looping Process: Design and Construction of a 25 $kW_{th}$ Subpilot Unit, Energy & Fuels. 26 (2012) 2292-2302.

[34] A. Tong, D. Sridhar, Z. Sun, H. R. Kim, L. Zeng, F. Wang, et al., Continuous high purity hydrogen generation from a syngas chemical looping 25 $kW_{th}$ sub-pilot unit with 100% carbon capture, Fuel. 103 (2013) 495-505.

[35] Q. Zhou, L. Zeng, L. Fan, M. Reducer, Syngas Chemical Looping Process: Dynamic Modeling of a Moving-Bed Reducer, AIChE J. 59 (2013) 3432-3443.

[36] L. Han, Z. Zhou, G. M. Bollas, Heterogeneous modeling of chemical-looping combustion. Part 2: Particle model, Chem. Eng. Sci. 113 (2014) 116-128.

[37] L. Han, Z. Zhou, G. M. Bollas, Heterogeneous modeling of chemical-looping combustion. Part 1: Reactor model, Chem. Eng. Sci. 104 (2013) 233-249.

[38] I. M. Dahl, E. Bakken, Y. Larring, A. I. Spjelkavik, S. F. Håkonsen, R. Blom, On the development of novel reactor concepts for chemical looping combustion, Energy Procedia. 1 (2009) 1513-1519.

[39] S. F. Håkonsen, R. Blom, Chemical looping combustion in a rotating bed reactor—finding optimal process conditions for prototype reactor, Environ. Sci. Technol. 45 (2011) 9619-26.

[40] S. F. Håkonsen, C. A. Grande, R. Blom, Rotating bed reactor for CLC: Bed characteristics dependencies on internal gas mixing, Appl. Energy. 113 (2014) 1952-1957.

[41] Z. Zhao, T. Chen, A. F. Ghoniem, Rotary Bed Reactor for Chemical-Looping Combustion with Carbon Capture. Part 1: Reactor Design and Model Development, Energy & Fuels. 27 (2013) 327-343.

[42] Z. Zhao, T. Chen, A. F. Ghoniem, Rotary Bed Reactor for Chemical-looping Combustion with Carbon Capture. Part II: Base Case and Sensitivity Analysis, Energy & Fuels. 27 (2012) 344-359.

[43] R. K. Shah, T. Skiepko, Influence of leakage distribution on the thermal performance of a rotary regenerator, Appl. Therm. Eng. 19 (1999) 685-705.

[44] M. S. Kulkarni, M. P. Duduković, A bidirectional fixed-bed reactor for coupling of exothermic and endothermic reactions, AIChE J. 42 (1996) 2897-2910.

[45] G. Kolios, G. Eigenberger, Styrene synthesis in a reverse-flow reactor, Chem. Eng. Sci. 54 (1999) 2637-2646.

[46] M. S. Kulkarni, M. P. Duduković, Periodic Operation of Asymmetric Bidirectional Fixed-Bed Reactors with Temperature Limitations, Ind. Eng. Chem. Res. 37 (1998) 770-781.

[47] M. S. Kulkarni, M. P. Duduković, A robust algorithm for fixed-bed reactors with steep moving temperature and reaction fronts, Chem. Eng. Sci. 51 (1996) 571-585.

[48] M. S. Kulkarni, M. P. Duduković, Dynamics of gas phase and solid phase reactions in fixed bed reactors, Chem. Eng. Sci. 51 (1996) 3083-3088.

[49] G. Kolios, J. Frauhammer, G. Eigenberger, Autothermal fixed-bed reactor concepts, Chem. Eng. Sci. 55 (2000) 5945-5967.

[50] M. P. Duduković, Frontiers in reactor engineering, Science. 325 (2009) 698-701.

[51] B. Glockler, G. Kolios, C. Tellaeche, U. Nieken, A Heat-Integrated Reverse-Flow Reactor Concept for Endothermic High-Temperature Syntheses. Part I: Fundamentals—Short-Cut Theory and Experimental Verification of a Traveling Endothermic Reaction Zone, Chem. Eng. Technol. 32 (2009) 1339-1347.

[52] M. V. S. Annaland, H. A. R. Scholts, J. A. M. Kuipers, W. P. M. Van Swaaij, A novel reverse flow reactor coupling endothermic and exothermic reactions Part II: Sequential reactor configurations for reversible endothermic reactions, Chem. Eng. Sci. 57 (2002) 855-872.

[53] R. F. Blanks, T. S. Wittrig, D. A. Peterson, Bidirectional adiabatic synthesis gas generator, Chem. Eng. Sci. 45 (1990) 2407-2413.

[54] A. M. De Groote, G. F. Froment, T. Kobylinski, Synthesis gas production from natural gas in a fixed bed reactor with reversed flow, Can. J. Chem. Eng. 74 (1996) 735-742.

[55] R. Hong, X. Li, H. Li, W. Yuan, Modeling and simulation of $SO_2$ oxidation in a fixed-bed reactor with periodic flow reversal, Catal. Today. 38 (1997) 47-58.

[56] W. Xiao, H. Wang, W. Yuan, A N $SO_2$ Converter with flow reversal and interstage heat removal: from laboratory to industry, Chem. Eng. Sci. 54 (1999) 1307-1311.

[57] K. M. Vanden Bussche, S. N. Neophytides, I. A. Zolotarskii, G. F. Froment, Modelling and simulation of the reversed flow operation of a fixed-bed reactor for methanol synthesis, Chem. Eng. Sci. 48 (1993) 3335-3345.

[58] G. Eigenberger, U. Niecken, Catalytic Combustion with Periodic Flow Reversal, Chem. Eng. Sci. 43 (1988) 2109-2155.

[59] C. Sapundzhiev, J. Chaouki, C. Guy, D. Klvana, Catalytic combustion of natural gas in a fixed bed reactor with flow reversal, Chem. Eng. Commun. 125 (1993) 171-186.

[60] J. Chaouki, C. Sapundzhiev, D. Kusohorsky, D. Klvana, Combustion of Methane in a Cyclic Catalytic Reactor, Ind. Eng. Chem. Res. 33 (1994) 2957-2963.

[61] B. van de Beld, R. A. Borman, O. R. Derkx, B. A. A. van Woezik, K. R. Westerterp, Removal of Volatile Organic Compounds from Polluted Air in a Reverse Flow Reactor: An Experimental Study, Ind. Eng. Chem. Res. 33 (1994) 2946-2956.

[62] L. van de Beld, K. R. Westerterp, Air purification in a reverse-flow reactor: Model simulations vs. experiments, AIChE J. 42 (1996) 1139-1148.

[63] L. van de Beld, K. R. Westerterp, Operation of a Catalytic Reverse Flow Reactor for the Purification of Air Contaiminated with Volatile Organic Compounds, Can. J. Chem. Eng. 75 (1997) 975-983.

[64] H. Ziifle, T. Turek, Catalytic combustion in a reactor with periodic flow reversal. Part 1. Experimental results, Chem. Eng. Process. 36 (1997) 327-340.

[65] H. Ziifle, T. Turek, Catalytic combustion in a reactor with periodic flow reversal. Part 2. Steady-state reactor model, Chem. Eng. Process. 36 (1997) 341-352.

[66] J. L. Nijdam, C. W. M. Van Der Geld, A comparison of hybrid and numerical techniques to model heat transfer in reverse flow reactors, Appl. Therm. Eng. 19 (1999) 1045-1070.

[67] J. L. Nijdam, C. W. M. van der Geld, Experiments with a large-scale reverse flow reactor, Chem. Eng. Sci. 52 (1997) 2729-2741.

[68] M. Cittadini, M. Vanni, A. a. Barresi, G. Baldi, Simplified procedure for design of catalytic combustors with periodic flow reversal, Chem. Eng. Process. Process Intensif. 40 (2001) 255-262.

[69] S. Salomons, R. E. Hayes, M. Poirier, H. Sapoundjiev, Modelling a reverse flow reactor for the catalytic combustion of fugitive methane emissions, Comput. Chem. Eng. 28 (2004) 1599-1610.

[70] A. Kushwaha, M. Poirier, H. Sapoundjiev, R. E. Hayes, Effect of reactor internal properties on the performance of a flow reversal catalytic reactor for methane combustion, Chem. Eng. Sci. 59 (2004) 4081-4093.

[71] R. Q. Ferreira, C. A. Costa, S. Masetti, Reverse-flow reactor for a selective oxidation process, Chem. Eng. Sci. 54 (1999) 4615-4627.

[72] F. Larachi, P. L. Mills, M. P. Duduković, Multiphase catalytic reactors: a perspective on current knowledge and future trends, Catal. Rev. Sci. Eng. 44 (2002) 123-246.

[73] Y. S. Matros, Catalytic processes under unsteady state conditions, Elsvier, 1988.

[74] Z. Zhou, L. Han, G. M. Bollas, Model-based analysis of bench-scale fixed-bed units for chemical-looping combustion, Chem. Eng. J. 233 (2013) 331-348.

[75] Z. Zhou, L. Han, G. M. Bollas, Kinetics of NiO reduction by $H_2$ and Ni oxidation at conditions relevant to chemical-looping combustion and reforming, Int. J. Hydrogen Energy. 39 (2014) 8535-8556.

[76] Z. Zhou, L. Han, G. M. Bollas, Modeling chemical-looping combustion in bubbling fluidized bed reactors, Chem. Eng. Sci. (2015) in review.

[77] T. J. Keskitalo, K. J. T. Lipiainen, A. O. I. Krause, Kinetic Modeling of Coke Oxidation of a Ferrierite Catalyst, Ind. Eng. Chem. Res. 45 (2006) 6458-6467.

[78] B. Subramaniam, A. Varma, Reaction kinetics on a commercial three-way catalyst: the carbon monoxide-nitrogen monoxide-oxygen-water system, Ind. Eng. Chem. Prod. Res. Dev. 24 (1985) 512-516.

[79] M. Rydén, A. Lyngfelt, T. Mattisson, D. Chen, A. Holmen, E. Bjorgum, et al., Novel oxygen-carrier materials for chemical-looping combustion and chemical-looping reforming; $La_x$—$Sr_{1-x}Fe_yCo_{1-y}O_{3-\delta}$ perovskites and mixed-metal oxides of NiO, $Fe_2O_3$ and $Mn_3O_4$, Int. J. Greenh. Gas Control. 2 (2008) 21-36.

[80] M. Ishida, H. Jin, T. Okamoto, A Fundamental Study of a New Kind of Medium Material for Chemical-Looping Combustion, Energy & Fuels. 10 (1996) 958-963.

[81] M. K. Chandel, A. Hoteit, A. Delebarre, Experimental investigation of some metal oxides for chemical looping combustion in a fluidized bed reactor, Fuel. 88 (2009) 898-908.

[82] Process Systems Enterprise. gPROMS (2014).

[83] H. Jin, M. Ishida, Reactivity Study on Natural-Gas-Fueled Chemical-Looping Combustion by a Fixed-Bed Reactor, Ind. Eng. Chem. Res. 41 (2002) 4004-4007.

[84] I. Iliuta, R. Tahoces, G. S. Patience, S. Rifflart, F. Luck, Chemical-looping combustion process: Kinetics and mathematical modeling, AIChE J. 56 (2010) 1063-1079.

[85] A. Abad, J. Adánez, F. Garcia-Labiano, L. F. de Diego, P. Gayán, J. Celaya, Mapping of the range of operational conditions for Cu-, Fe-, and Ni-based oxygen carriers in chemical-looping combustion, Chem. Eng. Sci. 62 (2007) 533-549.

[86] T. Mattisson, F. Garcia-Labiano, B. Kronberger, A. Lyngfelt, J. Adánez, H. Hofbauer, Chemical-looping combustion using syngas as fuel, Int. J. Greenh. Gas Control. 1 (2007) 158-169.

[87] C. Linderholm, T. Mattisson, A. Lyngfelt, Long-term integrity testing of spray-dried particles in a 10-kW chemical-looping combustor using natural gas as fuel, Fuel 88 (2009) 2083-2096.

[88] Y. S. Matros, G. A. Bunimovich, Reverse-Flow Operation in Fixed Bed Catalytic Reactors, Catal. Rev. 38 (1996) 1-68.

The invention claimed is:

1. A chemical-looping process, comprising:
   (a) delivering fuel gas to a fixed-bed reactor in a first fuel gas flow direction relative to the fixed-bed reactor, the fixed bed reactor including a metal oxygen carrier that oxidizes the fuel gas;
   (b) intermittently reversing flow direction of the fuel gas to a second fuel gas flow direction that is opposite to the first fuel gas flow direction based at least in part on real-time analysis of gas exiting the fixed-bed reactor, thereby reducing the metal oxygen carrier from both sides of the fixed-bed reactor so as to improve utilization of the metal oxygen carrier, mitigate cold zones within the fixed-bed reactor, and reduce carbon deposition;
   (c) regenerating the metal oxygen carrier within the fixed-bed reactor in an oxidation cycle by delivering an oxygen source to the fixed-bed reactor in a first oxygen source flow direction relative to the fixed-bed reactor;
   (d) intermittently reversing flow direction of the oxygen source to a second oxygen source flow direction that is opposite to the first oxygen source flow direction, thereby increasing heat extraction in the oxidation cycle;
   wherein the intermittent reversal of flow direction of the fuel gas and the oxygen source is effectuated at an interval and with a frequency to achieve a predetermined metal oxygen carrier utilization of at least sixty percent (60%), a fuel conversion of at least ninety five percent (95%), and a reduction product capture of at least ninety percent (90%).

2. The chemical-looping process of claim 1, further comprising separating a pure stream of carbon dioxide after condensing water vapor from the fuel oxidation step.

3. The chemical-looping process of claim 1, wherein autothermal reforming is accomplished without a need for oxygen or carbon dioxide separation.

4. The chemical-looping process of claim 1, wherein the flow direction of the fuel gas is reversed at controlled time intervals during a single fuel oxidation step.

5. The chemical-looping process of claim 4, wherein the controlled time intervals are between about 0.5 seconds and 60 seconds.

6. The chemical-looping process of claim 4, wherein the controlled time interval is about 2 seconds.

7. The chemical-looping process of claim 1, wherein the fuel oxidation step is a chemical-looping combustion (CLC) process.

8. The chemical-looping process of claim 1, wherein the metal oxygen carrier is selected from the group consisting of a nickel oxide, a copper oxide, a manganese oxide, a NiAl oxide, a Mg—Al oxides, an iron oxide, and mixtures and combinations thereof.

9. The chemical-looping process of claim 1, wherein the metal oxygen carrier is nickel oxide.

10. The chemical-looping process of claim 1, wherein the fixed-bed reactor includes one or more ports, valves and control systems to allow the direction of the fuel gas flow to be switched intermittently during the fuel oxidation step.

11. The chemical-looping process of claim 1, wherein the fuel gas is selected from the group consisting of methane, natural gas, syngas and bio-syngas.

12. The chemical-looping process of claim 1, wherein oxygen carrier reduction reactions associated with the fuel oxidation step are displaced over ends of the fixed-bed reactor, thereby increasing contact between fuel and oxidized solids.

* * * * *